United States Patent
Park et al.

(10) Patent No.: US 10,964,310 B2
(45) Date of Patent: *Mar. 30, 2021

(54) METHOD AND DEVICE FOR PERFORMING VOICE RECOGNITION USING GRAMMAR MODEL

(71) Applicant: SAMSUNG ELECTRONICS CO., LTD., Suwon-si (KR)

(72) Inventors: Chi-youn Park, Suwon-si (KR);
Il-hwan Kim, Yeongcheon-si (KR);
Kyung-min Lee, Suwon-si (KR);
Nam-hoon Kim, Seongnam-si (KR);
Jae-won Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/820,353

(22) Filed: Mar. 16, 2020

(65) Prior Publication Data

US 2020/0219483 A1 Jul. 9, 2020

Related U.S. Application Data

(63) Continuation of application No. 16/523,263, filed on Jul. 26, 2019, now Pat. No. 10,706,838, which is a
(Continued)

(51) Int. Cl.
*G10L 15/22* (2006.01)
*G10L 15/06* (2013.01)
(Continued)

(52) U.S. Cl.
CPC ............ *G10L 15/063* (2013.01); *G10L 15/02* (2013.01); *G10L 15/14* (2013.01); *G10L 15/187* (2013.01);
(Continued)

(58) Field of Classification Search
CPC ................................. G10L 15/28; G10L 17/22
See application file for complete search history.

(56) References Cited

U.S. PATENT DOCUMENTS 5,960,395 A 9/1999 Tzirkel-Hancock
5,963,903 A 10/1999 Hon et al.
(Continued)

FOREIGN PATENT DOCUMENTS

CN 1223739 A 7/1999
CN 1409842 A 4/2003
(Continued)

OTHER PUBLICATIONS

Electronics and Telecommunications Research Institute, "Conversion Technology of Korean/English Test—Pronunciation Variants for Voice Recognition", Apr. 30, 2013, 9 pages.
(Continued)

*Primary Examiner* — Shreyans A Patel
(74) *Attorney, Agent, or Firm* — Sughrue Mion, PLLC

(57) ABSTRACT

A method of updating speech recognition data including a language model used for speech recognition, the method including obtaining language data including at least one word; detecting a word that does not exist in the language model from among the at least one word; obtaining at least one phoneme sequence regarding the detected word; obtaining components constituting the at least one phoneme sequence by dividing the at least one phoneme sequence into predetermined unit components; determining information regarding probabilities that the respective components constituting each of the at least one phoneme sequence appear during speech recognition; and updating the language model based on the determined probability information.

16 Claims, 31 Drawing Sheets

Related U.S. Application Data continuation of application No. 15/544,198, filed as application No. PCT/KR2015/000486 on Jan. 16, 2015, now Pat. No. 10,403,267.

(51) Int. Cl.
*G10L 15/197* (2013.01)
*G10L 15/02* (2006.01)
*G10L 15/14* (2006.01)
*G10L 15/187* (2013.01)

(52) U.S. Cl.
CPC ...... *G10L 15/197* (2013.01); *G10L 2015/025* (2013.01); *G10L 2015/0633* (2013.01); *G10L 2015/0635* (2013.01)

(56) References Cited

U.S. PATENT DOCUMENTS

| | | |
|---|---|---|
| 6,415,257 B1 | 7/2002 | Junqua et al. |
| 6,952,675 B1 | 10/2005 | Tahara et al. |
| 7,139,715 B2 | 11/2006 | Dragosh et al. |
| 7,310,600 B1 | 12/2007 | Garner et al. |
| 7,505,905 B1 | 3/2009 | Zimmerman et al. |
| 7,720,678 B2 | 5/2010 | Falcon et al. |
| 7,822,608 B2 | 10/2010 | Cross et al. |
| 7,899,673 B2 | 3/2011 | Brown |
| 8,296,142 B2 | 10/2012 | Lloyd et al. |
| 8,504,367 B2 | 8/2013 | Shi et al. |
| 8,595,008 B2 | 11/2013 | Cho |
| 8,645,139 B2 | 2/2014 | Lee |
| 9,484,012 B2 | 11/2016 | Morita |
| 2002/0077816 A1 | 6/2002 | Shen et al. |
| 2002/0082831 A1 | 6/2002 | Hwang et al. |
| 2002/0193989 A1 | 12/2002 | Geilhufe et al. |
| 2004/0054533 A1 | 3/2004 | Bellegarda |
| 2008/0130699 A1 | 6/2008 | Ma et al. |
| 2008/0249770 A1 | 10/2008 | Kim et al. |
| 2010/0049514 A1 | 2/2010 | Kennewick et al. |
| 2010/0211397 A1 | 8/2010 | Park et al. |
| 2011/0060592 A1 | 3/2011 | Kang et al. |
| 2011/0231183 A1 | 9/2011 | Yamamoto et al. |
| 2012/0258437 A1 | 10/2012 | Sadeh-Koniecpol et al. |
| 2013/0238326 A1 | 9/2013 | Kim et al. |
| 2014/0343935 A1 | 11/2014 | Jung et al. |
| 2015/0228274 A1* | 8/2015 | Leppanen ............... G10L 15/28 704/243 |
| 2016/0180853 A1* | 6/2016 | VanLund ................ G10L 17/22 704/275 |
| 2017/0083285 A1* | 3/2017 | Meyers ............... G10L 15/1815 |
| 2017/0300831 A1 | 10/2017 | Gelfenbeyn et al. |
| 2018/0011842 A1 | 1/2018 | Waibel et al. |
| 2020/0219483 A1* | 7/2020 | Park ................... G10L 15/14 |

FOREIGN PATENT DOCUMENTS

| | | |
|---|---|---|
| CN | 101558442 A | 10/2009 |
| CN | 102023995 A | 4/2011 |
| CN | 102084417 A | 6/2011 |
| CN | 102968989 A | 3/2013 |
| CN | 104835493 A | 8/2015 |
| JP | 2002-290859 | 10/2002 |
| JP | 2003-202890 | 7/2003 |
| JP | 2007-286174 | 11/2007 |
| JP | 2008-129318 | 6/2008 |
| JP | 2006-308848 | 11/2010 |
| KR | 1020070030451 | 3/2007 |
| KR | 1020090004216 | 1/2009 |
| KR | 10-0883657 | 2/2009 |
| KR | 1020090060631 | 6/2009 |
| KR | 1020100120740 | 11/2010 |
| KR | 1020100130263 | 12/2010 |
| KR | 10-1289081 | 7/2013 |
| KR | 102013014766 | 9/2013 |

OTHER PUBLICATIONS

International Search Report dated Nov. 18, 2015 issued in counterpart application No. PCT/KR2015/000486, 21 pages.
European Search Report dated Nov. 6, 2017 issued in counterpart application No. 15878074.2-1901, 10 pages.
Charles C.H. Jie, "Generation of Adaptive Vocabulary Lexicon for Japanese LVCSR", XP055414600, PACLIC 14: 14th Pacific Asia Conference on Language, Information and Computation: Proceedings, Feb. 17, 2000, 10 pages.
Mathis Creutz et al., "Morph-Based Speech Recognition and Modeling of Out-of-Vocabulary Words Accross Languages", CP058232088, ACM Transactions on Speech and Language Processing (TSLP), vol. 5, No. 1, Dec. 12, 2007, 29 pages.
P. Geutner et al., "Adaptive Vocabularies for Transcribing Multilingual Broadcast News", XP010279219, IEEE International Conference, vol. 2, May 12-15, 1998, 4 pages.
Oh-Wook Kwon et al., "Korean Large Vocabulary Continuous Speech Recognition with Morpheme-based Recognition Units", XP055414123, Speech Communication, vol. 39, No. 3-4, Feb. 1, 2003, 14 pages.
Sara E. Schwarm et al., "Adaptive Language Modeling with Varied Sources to Cover New Vocabulary Items", XP011111122, IEEE Transaction on Speech and Audio Processing, vol. 12, No. 3, May 1, 2004, 9 pages.
Communication dated Apr. 2, 2020, issued by the State Intellectual Property Office of People's Republic of China in counterpart Chinese Application No. 201580073696.3.
European Search Report dated May 13, 2020 issued by the European Patent Office in counterpart European Application No. 15878074.2.

* cited by examiner

| ONE WORD | PROBABILITY |
|---|---|
| ONEUL | 0.143 |
| GI | 0.143 |
| JEO | 0.071 |
| -- | |

| TWO WORDS | PROBABILITY |
|---|---|
| ONEUL GI | 0.166 |
| GI MYEO | 0.166 |
| YEO JYO | 0.083 |
| -- | |

METHOD AND DEVICE FOR PERFORMING VOICE RECOGNITION USING GRAMMAR MODEL

This application is a Continuation of U.S. application Ser. No. 16/523,263 filed with the U.S. Patent and Trademark Office on Jul. 26, 2019, which is a Continuation of U.S. application Ser. No. 15/544,198 filed with the U.S. Patent and Trademark Office on Jul. 17, 2017, now U.S. Pat. No. 10,403,267 issued Sep. 3, 2019, as a National Phase Entry of PCT International Application No. PCT/KR2015/000486, which was filed on Jan. 16, 2015, the contents of each of which are herein incorporated by reference.

BACKGROUND

1. Field of the Disclosure

The present invention relates to a method and device for performing speech recognition using a language model.

2. Description of the Related Art

Speech recognition is a technique for receiving an input of speech from a user, automatically converting the speech into text, and recognizing the text. Recently, speech recognition is used as an interfacing technique for replacing a keyboard input for a smart phone or a TV.

A speech recognition system may include a client for receiving voice signals and an automatic speech recognition (ASR) engine for recognizing a speech from voice signals, where the client and the ASR engine may be independently designed.

Generally, a speech recognition system may perform speech recognition by using an acoustic model, a language model, and a pronunciation dictionary. It is necessary to establish a language model and a pronunciation dictionary regarding a predetermined word in advance for a speech recognition system to speech-recognize the predetermined word from voice signals.

SUMMARY

The present invention provides a method and a device for performing speech recognition using a language model, and more particularly, a method and apparatus for establishing a language model for speech recognition of new words and performing speech recognition with respect to a speech including the new words.

According to an aspect of the present invention, there is provided a method of updating speech recognition data including a language model used for speech recognition, the method including obtaining language data including at least one word; detecting a word that does not exist in the language model from among the at least one word; obtaining at least one phoneme sequence regarding the detected word; obtaining components constituting the at least one phoneme sequence by dividing the at least one phoneme sequence into predetermined unit components; determining information regarding probabilities that the respective components constituting each of the at least one phoneme sequence appear during speech recognition; and updating the language model based on the determined probability information.

Furthermore, the language model includes a first language model and a second language model including at least one language model, and the updating of the language model includes updating the second language model based on the determined probability information.

Furthermore, the method further includes updating the first language model based on at least one appearance probability information included in the second language model; and updating a pronunciation dictionary including information regarding phoneme sequences of words based on the phoneme sequence of the detected word.

Furthermore, the appearance probability information includes information regarding appearance probability of each of the components under a condition that a word or another component appears before the corresponding component.

Furthermore, the determining the appearance probability information includes obtaining situation information regarding a surrounding situation corresponding to the detected word; and selecting a language model to add appearance probability information regarding the detected word based on the situation information.

Furthermore, the updating of the language model includes updating a second language model regarding a module corresponding to the situation information based on the determined appearance probability information.

According to another aspect of the present invention, there is provided a method of performing speech recognition, the method including obtaining speech data for performing speech recognition; obtaining at least one phoneme sequence from the speech data; obtaining information regarding probabilities that predetermined unit components constituting the at least one phoneme sequence appear; determining one of the at least one phoneme sequence based on the information regarding probabilities that the predetermined unit components appear; and obtaining a word corresponding to the determined phoneme sequence based on segment information for converting predetermined unit components included in the determined phoneme sequence to a word.

Furthermore, the obtaining of the at least one phoneme sequence includes obtaining a phoneme sequence, regarding which information about a word corresponding to the phoneme sequence exists in a pronunciation dictionary including information regarding phoneme sequences of words, and a phoneme sequence, regarding which information about a word corresponding to the phoneme sequence does not exist in the pronunciation dictionary.

Furthermore, the obtaining of the appearance probability information regarding the components includes determining a plurality of language models including appearance probability information regarding the components; determining weights with respect to the plurality of determined language models; obtaining at least one appearance probability information regarding the components from the plurality of language models; and obtaining appearance probability information regarding the components by applying the determined weights to the obtained appearance probability information according to language models to which the respective appearance probability information belongs.

Furthermore, the obtaining of the appearance probability information regarding the components includes obtaining situation information regarding the speech data; determining at least one second language model based on the situation information; and obtaining appearance probability information regarding the components from the at least one determined second language model.

Furthermore, the at least one second language model corresponds to a module or a group including at least one module, and the determining of the at least one second language model includes, if the obtained situation information includes an identifier of a module, determining the at least one second language model corresponding to the identifier.

Furthermore, the situation information includes a personalized model information including at least one of acoustic information by classes and information regarding preferred languages by classes, and the determining of the second language model includes determining a class regarding the speech data based on the at least one of the acoustic information and the information regarding preferred languages by classes; and determining the second language model based on the determined class.

Furthermore, the method further includes obtaining the speech data and a text, which is a result of speech recognition of the speech data; detecting information regarding content from the text or the situation information; detecting acoustic information from the speech data; determining a class corresponding to information regarding the content and the acoustic information; and updating information regarding a language model corresponding to the determined class based on at least one of the information regarding the content and the situation information.

According to another aspect of the present invention, there is provided a device for updating a language model including appearance probability information regarding respective words during speech recognition, the device including a controller, which obtains language data including at least one word, detects a word that does not exist in the language model from among the at least one word, obtains at least one phoneme sequence regarding the detected word, obtains components constituting the at least one phoneme sequence by dividing the at least one phoneme sequence into predetermined unit components, determines information regarding probabilities that the respective components constituting each of the at least one phoneme sequence appear during speech recognition, and updates the language model based on the determined probability information; and a memory, which stores the updated language model.

According to another aspect of the present invention, there is provided a device for performing speech recognition, the device including a user inputter, which obtains speech data for performing speech recognition; and a controller, which obtains at least one phoneme sequence from the speech data, obtains information regarding probabilities that predetermined unit components constituting the at least one phoneme sequence appear, determines one of the at least one phoneme sequence based on the information regarding probabilities that the predetermined unit components appear, and obtains a word corresponding to the determined phoneme sequence based on segment information for converting predetermined unit components included in the determined phoneme sequence to a word.

Another object of the present disclosure provides a method, performed by an electronic device, of performing speech recognition, with the method including, from a first device and a second device receiving a user's voice, receiving first audio data and second audio data comprising the voice; determining sound quality of each of the first audio data and the second audio data; selecting at least one audio data from among the first audio data and the second audio data, based on the determined sound quality; performing speech recognition with respect to the voice, based on the selected audio data; determining a command corresponding to the voice, based on a result of the voice speech; selecting an application for performing the command, from among at least one application executable in the electronic device, based on the result of the speech recognition; and transmitting the command to the selected application.

A further object of the present disclosure provides an electronic device including a communication unit configured to, from a first device and a second device receive a user's voice, receive first audio data and second audio data comprising the voice; and at least one processor configured to determine sound quality of each of the first audio data and the second audio data, select at least one audio data from among the first audio data and the second audio data, based on the determined sound quality, perform speech recognition with respect to the voice, based on the selected audio data, determine a command corresponding to the voice, based on a result of the speech recognition, select an application for performing the command, from among at least one application executable in the electronic device, based on the result of the speech recognition, and transmit the command to the selected application.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
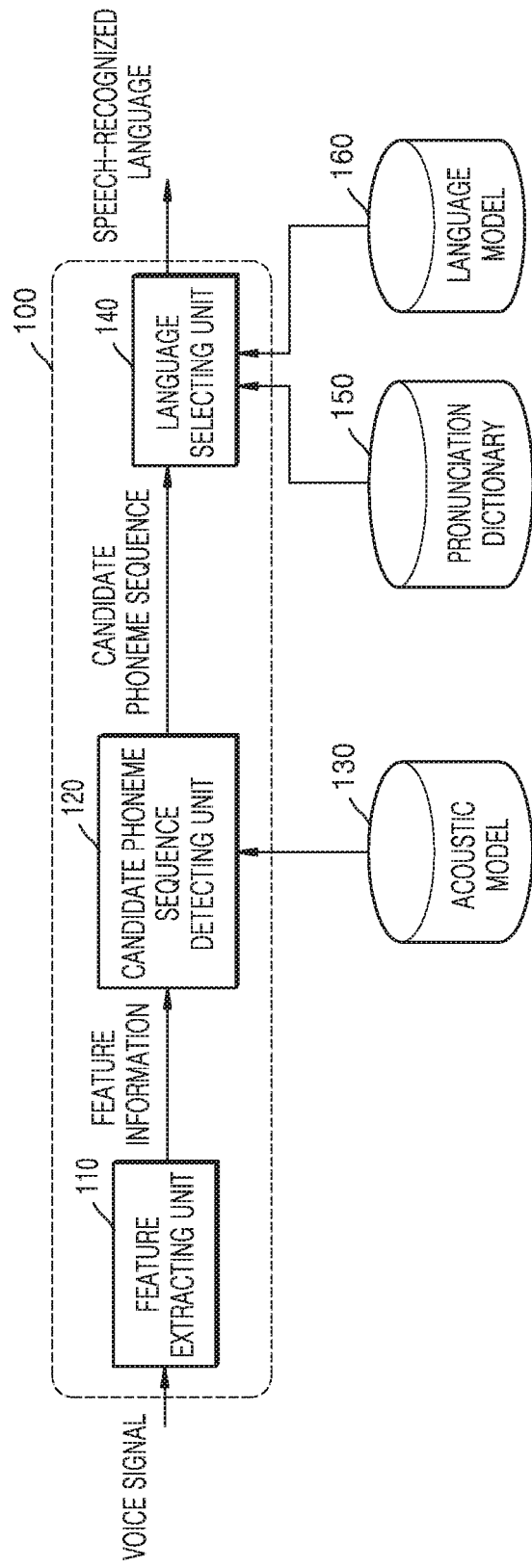
FIG. 1 is a block diagram exemplifying a device that performs speech recognition according to an embodiment.

The present invention will now be described more fully with reference to the accompanying drawings, in which exemplary embodiments of the invention are shown. In the description of the present invention, certain detailed explanations of related art are omitted when it is deemed that they may unnecessarily obscure the essence of the invention. Like reference numerals in the drawings denote like elements throughout.

Preferred embodiments of the present invention are described hereafter in detail with reference to the accompanying drawings. Before describing the embodiments, the words and terminologies used in the specification and claims should not be construed with common or dictionary meanings, but construed as meanings and conception coinciding the spirit of the invention under a principle that the inventor(s) can appropriately define the conception of the terminologies to explain the invention in the optimum method. Therefore, embodiments described in the specification and the configurations shown in the drawings are not more than the most preferred embodiments of the present invention and do not fully cover the spirit of the present invention. Accordingly, it should be understood that there may be various equivalents and modifications that can replace those when this application is filed.

In the attached drawings, some elements are exaggerated, omitted, or simplified, and sizes of the respective elements do not fully represent actual sizes thereof. The present invention is not limited to relative sizes or distances shown in the attached drawings.

In addition, unless explicitly described to the contrary, the word "comprise" and variations such as "comprises" or "comprising" will be understood to imply the inclusion of stated elements but not the exclusion of any other elements. In addition, the term "units" described in the specification mean units for processing at least one function and operation and can be implemented by software components or hardware components, such as FPGA or ASIC. However, the "units" are not limited to software components or hardware components. The "units" may be embodied on a recording medium and may be configured to operate one or more processors.

Therefore, for example, the "units" may include components, such as software components, object-oriented software components, class components, and task components, processes, functions, properties, procedures, subroutines, program code segments, drivers, firmware, micro codes, circuits, data, databases, data structures, tables, arrays, and variables. Components and functions provided in the "units" may be combined to smaller numbers of components and "units" or may be further divided into larger numbers of components and "units."

The present invention will now be described more fully with reference to the accompanying drawings, in which exemplary embodiments of the invention are shown. The present invention may, however, be embodied in many different forms and should not be construed as being limited to the embodiments set forth herein; rather, these embodiments are provided so that this disclosure will be thorough and complete, and will fully convey the concept of the present invention to those skilled in the art. In the description of the present invention, certain detailed explanations of related art are omitted when it is deemed that they may unnecessarily obscure the essence of the present invention. Like reference numerals in the drawings denote like elements, and thus their description will be omitted.

Hereinafter, the present invention will be described in detail by explaining preferred embodiments of the invention with reference to the attached drawings.

FIG. 1 is a block diagram exemplifying a device 100 that performs speech recognition according to an embodiment.

Referring to FIG. 1, the device 100 may include a feature extracting unit 110, a candidate phoneme sequence detecting unit 120, and a language selecting unit 140 as components for performing speech recognition. The feature extracting unit 110 extracts feature information regarding input voice signals. The candidate phoneme sequence detecting unit 120 detects at least one candidate phoneme sequence from the extracted feature information. The word selecting unit 140 selects a final speech-recognized word based on appearance probability information regarding respective candidate phoneme sequences. Appearance probability information regarding a word refers to information indicating a probability that the word appears in a speech-recognized word during speech recognition. Hereinafter, components of the device 100 will be described in detail.

When a voice signal is received, the device 100 may detect a speech portion actually spoken by a speaker and extract information indicating features of the voice signal. Information indicating features of a voice signal may include information indicating a shape of a mouth or a location of a tongue based on a waveform corresponding to the voice signal.

The candidate phoneme sequence detecting unit 120 may detect at least one candidate phoneme sequence that may be matched with a voice signal by using the extracted feature information regarding the voice signal and an acoustic model 130. A plurality of candidate phoneme sequences may be extracted according to voice signals. For example, since pronunciations 'jyeo' and 'jeo' are similar to each other, a plurality of candidate phoneme sequences including pronunciations 'jyeo' and 'jeo' may be detected with respect to a same voice signal. Candidate phoneme sequences may be detected word-by-word. However, the present invention is not limited thereto, and candidate phoneme sequences may be detected in any of various units, such as in units of phonemes.

The acoustic model 130 may include information for detecting candidate phoneme sequences from feature information regarding a voice signal. Furthermore, the acoustic model 130 may be generated based on a large amount of speech data by using a statistical method, may be generated based on articulation data regarding unspecified speakers, or may be generated based on articulation data regarding a particular speaker. Therefore, the acoustic model 130 may be independently applied for speech recognition according to the particular speaker. The word selecting unit 140 may obtain appearance probability information regarding respective candidate phoneme sequences detected by the candidate phoneme sequence detecting unit 120 by using a pronunciation dictionary 150 and a language model 160. Next, the word selecting unit 140 selects a final speech-recognized word based on the appearance probability information regarding the respective candidate phoneme sequences. In detail, the word selecting unit 140 may determine words corresponding to the respective candidate phoneme sequences by using the pronunciation dictionary 150 and obtain respective appearance probabilities regarding the determined words by using the language model 160.

The pronunciation dictionary 150 may include information for obtaining words corresponding to candidate phoneme sequences detected by the candidate phoneme sequence detecting unit 120. The pronunciation dictionary 150 may be established based on candidate phoneme sequences obtained based on changes of phonemes of respective words.

Pronunciation of a word is not consistent, because the pronunciation of the word may vary based on words before and after the word, a location of the word in a sentence, or characteristics of a speaker. Furthermore, an appearance probability regarding a word refers to a probability that the word may appear or a probability that the word may appear together with a particular word. The device 100 may perform speech recognition in consideration of context based on appearance probabilities. The device 100 may perform speech recognition by obtaining words corresponding to candidate phoneme sequences by using the pronunciation dictionary 150 and obtaining information regarding appearance probabilities of respective words by using the language model 160. However, the present invention is not limited thereto, and the device 100 may obtain appearance probabilities from the language model 160 by using candidate phoneme sequences without obtaining words corresponding to candidate phoneme sequences.

For example, in the case of Korean, when a candidate phoneme sequence 'hakkkcyo' is detected, the word selecting unit 140 may obtain a word 'hakgyo' as a word corresponding to the detected candidate phoneme sequence 'hakkkyo' by using the pronunciation dictionary 150. In another example, in the case of English, when a candidate phoneme sequence 'skul' is detected, the word selecting unit 140 may obtain a word 'school' as a word corresponding to the detected candidate phoneme sequence 'skul' by using the pronunciation dictionary 150.

The language model 160 may include appearance probability information regarding words. There may be information about an appearance probability regarding each word. The device 100 may obtain appearance probability information regarding words included in respective candidate phoneme sequences from the language model 160.

For example, if a word A appears before a current word B appears, the language model 160 may include information regarding an appearance probability P(B|A), which is a probability that the current word B may appear. In other words, the appearance probability P(B|A) regarding the word B may be subject to appearance of the word A before appearance of the word B. In another example, the language model 160 may include an appearance probability P(B|A C) that is subject to appearance of the word A and a word C, that is, appearance of a plurality of words before appearance of the word B. In other words, the appearance probability P(B|A C) may be subject to appearance of both the words A and C before appearance of the word B. In another example, instead of a conditional probability, the language model 160 may include an appearance probability P(B) regarding the word B. The appearance probability P(B) refers to a probability that the word B may appear during speech recognition.

The device 100 may finally determine a speech-recognized word based on an appearance probability regarding words corresponding to respective candidate phoneme sequences determined by the word selecting unit 140 by using the language model 160. In other words, the device 100 may finally determine a word corresponding to the highest appearance probability as a speech-recognized word. The word selecting unit 140 may output the speech-recognized word as text.

Although the present invention is not limited to updating a language model or performing speech recognition word-by-word and such operations may be performed sequence-by-sequence, a method of updating a language model or performing speech recognition word-by-word will be described below for convenience of explanation.

Hereinafter, referring to FIGS. 2 through 9, a method of updating speech recognition data for speech recognition of new words will be described in detail.

Figure 2:
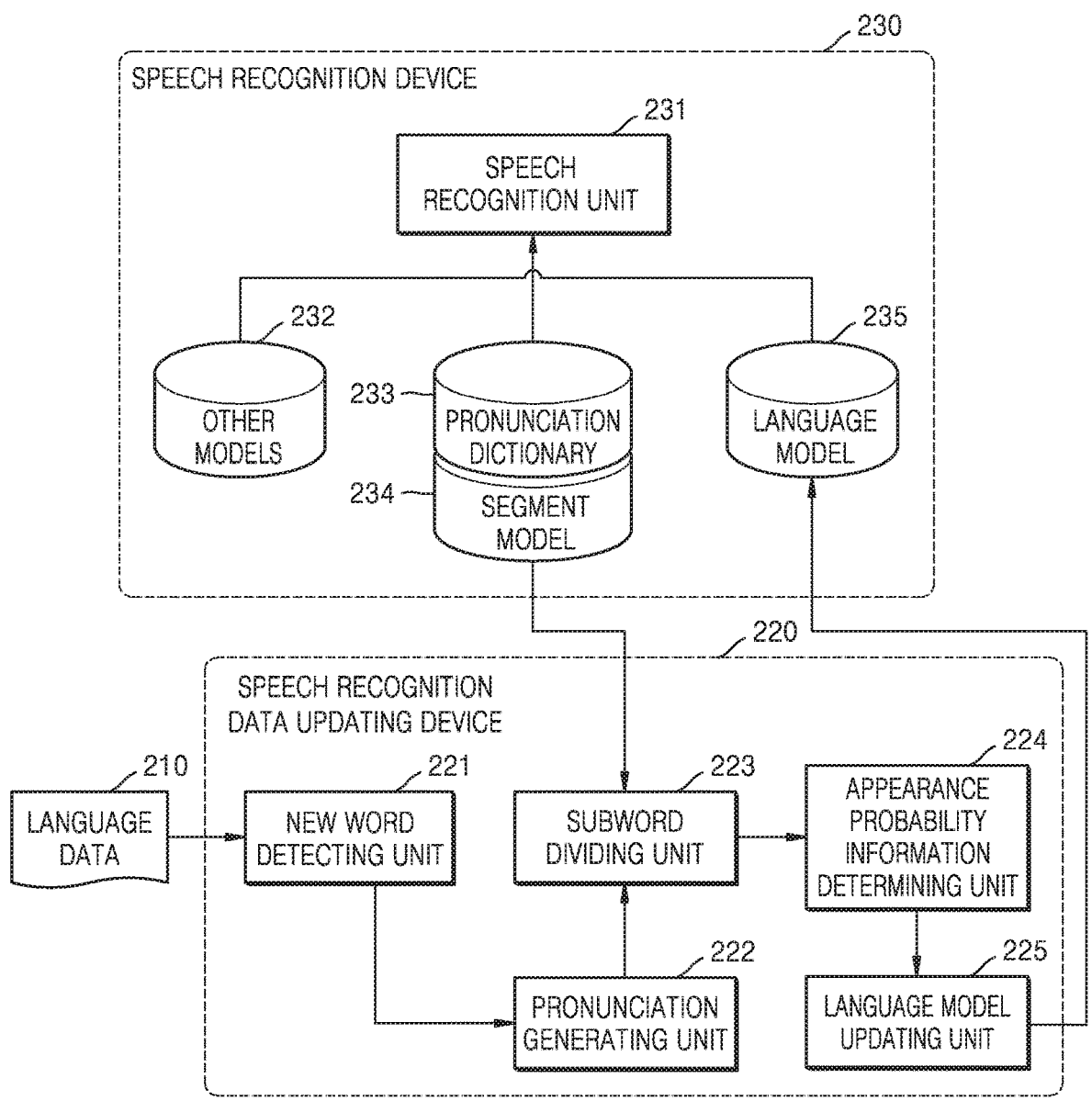
FIG. 2 is a block diagram showing a speech recognition device and a speech recognition data updating device for updating speech recognition data, according to an embodiment.

FIG. 2 is a block diagram showing a speech recognition device 230 and a speech recognition data updating device 220 for updating speech recognition data, according to an embodiment.

Although FIG. 2 shows that the speech recognition data updating device 220 and the speech recognition device 230 are separate devices, it is merely an embodiment, and the speech recognition data updating device 220 and the speech recognition device 230 may be embodied as a single device, e.g., the speech recognition data updating device 220 may be included in the speech recognition device 230. In the drawings and the embodiments described below, components included in the speech recognition data updating device 220 and the speech recognition device 230 may be physically or logically distributed or integrated with one another.

The speech recognition device 230 may be an automatic speech recognition (ASR) server that performs speech recognition by using speech data received from a device and outputs a speech-recognized word.

The speech recognition device 230 may include a speech recognition unit 231 that performs speech recognition and speech recognition data 232, 233, and 235 that are used for performing speech recognition. The speech recognition data 232, 233, and 235 may include other models 232, a pronunciation dictionary 233, and a language model 235. Furthermore, the speech recognition device 230 according to an embodiment may further include a segment model 234 for updating speech recognition data 232, 233, and 235.

The device 100 of FIG. 1 may correspond to the speech recognition unit 231 of FIG. 2, and the speech recognition data 232, 233, and 235 of FIG. 2 may correspond to the acoustic model 130, the pronunciation dictionary 150, and the language model 160 of FIG. 1, respectively.

The pronunciation dictionary 233 may include information regarding at least correspondences between a candidate phoneme sequence and at least one word. The language model 235 may include appearance probability information regarding words. The other models 232 may include other models that may be used for speech recognition. For example, the other models 232 may include an acoustic model for detecting a candidate phoneme sequence from feature information regarding a voice signal.

The speech recognition device 230 according to an embodiment may further include the segment model 234 for updating the language model 235 by reflecting new words. The segment model 234 includes information that may be used for updating speech recognition data by using a new word according to an embodiment. In detail, the segment model 234 may include information for dividing a new word included in collected language data into predetermined unit components. For example, if a new word is divided into units of subwords, the segment model 234 may include subword texts, such as 'ga gya ah re pl tam.' However, the present invention is not limited thereto, and the segment model 234 may include words divided into predetermined unit components and a new word may be divided according to the predetermined unit components. A subword refers to a voice unit that may be independently articulated.

The segment model 234 of FIG. 2 is included in the speech recognition device 230. However, the present invention is not limited thereto, and the segment model 234 may be included in the speech recognition data updating device 220 or may be included in another external device.

The speech recognition data updating device 220 may update at least one of the speech recognition data 232, 233, and 235 used for speech recognition. The speech recognition data updating device 220 may include a new word detecting unit 221, a pronunciation generating unit 222, a subword dividing unit 223, an appearance probability information determining unit 224, and a language model updating unit 225 as components for updating speech recognition data.

The speech recognition data updating device 220 may collect language data 210 including at least one word and update at least one of the speech recognition data 232, 233, and 235 by using a new word included in the language data 210.

The speech recognition data updating device 220 may collect the language data 210 and update speech recognition data periodically or when an event occurs. For example, when a screen image on a display unit of a user device is switched to another screen image, the speech recognition data updating device 220 may collect the language data 210 included in the switched screen image and update speech recognition data based on the collected language data 210. The speech recognition data updating device 220 may collect the language data 210 by receiving the language data 210 included in the screen image on the display unit from the user device.

Alternatively, if the speech recognition data updating device 220 is a user device, the language data 210 included in a screen image on a display unit may be obtained according to an internal algorithm. The user device may be a device identical to the speech recognition device 230 or the speech recognition data updating device 220 or an external device.

When speech recognition data is updated by the speech recognition data updating device 220, the speech recognition device 230 may perform speech recognition with respect to a voice signal corresponding to the new word.

The language data 210 may be collected in the form of texts. For example, the language data 210 may include text included in contents or web pages. If a text is included in an image file, the text may be obtained via optical character recognition (OCR). The language data 210 may include a text in the form of a sentence or a paragraph including a plurality of words.

The new word detecting unit 221 may detect a new word, which is not included in the language model 235, from the collected language data 210. Information regarding an appearance probability cannot be obtained with respect to a word not included in the language model 235 when the speech recognition device 230 performs speech recognition, and thus the word not included in the language model 235 cannot be output as a speech-recognized word. The speech recognition data updating device 220 according to an embodiment may update speech recognition data by detecting a new word not included in the language model 235 and adding appearance probability information regarding the new word to the language model 235. Next, the speech recognition device 230 may output the new word as a speech-recognized word based on the appearance probability regarding the new word.

The speech recognition data updating device 220 may divide a new word into subwords and add appearance probability information regarding the respective subwords of the new word to the language model 235. Since the speech recognition data updating device 220 according to an embodiment may update speech recognition data for recognizing a new word only by updating the language model 235 and without updating the pronunciation dictionary 233 and the other models 232, speech recognition data may be quickly updated.

The pronunciation generating unit 222 may convert a new word detected by the new word detecting unit 221 into at least one phoneme sequence according to a standard pronunciation rule or a pronunciation rule reflecting characteristics of a speaker.

In another example, instead of generating a phoneme sequence via the pronunciation generating unit 222, a phoneme sequence regarding a new word may be determined based on a user input. Furthermore, it is not limited to the pronunciation rule of the above-stated embodiment, and a phoneme sequence may be determined based on conditions corresponding to various situations, such as characteristics of a speaker regarding a new word or time and location characteristics. For example, a phoneme sequence may be determined based on the fact that a same character may be pronounced differently according to situations of a speaker, e.g., different voices in the morning and the evening or a change of language behavior of the speaker.

The subword dividing unit 223 may divide a phoneme sequence converted by the pronunciation generating unit 222 into predetermined unit components based on the segment model 234.

For example, in the case of Korean, the pronunciation generating unit 222 may convert a new word 'gim yeon a' into a phoneme sequence 'gi myeo na.' Next, the subword dividing unit 223 may refer to subword information included in the segment model 234 and divide the phoneme sequence 'gi myeo na' into subword components 'gi,' 'myeo,' and 'na.' In detail, the subword dividing unit 223 may extract 'gi,' 'myeo,' and 'na' corresponding to subword components of the phoneme sequence 'gi myeo na' from among subwords included in the segment model 234. The subword dividing unit 223 may divide the phoneme sequence 'gi myeo na' into the subword components 'gi,' 'myeo,' and 'na' by using the detected subwords.

In the case of English, the pronunciation generating unit 222 may convert a word 'texas' recognized as a new word into a phoneme sequence 'tekss' Next, refefring to subword information included in the segment model 234, the subword dividing unit 223 may divide 'tekss' into subwords 'teks' and 's,' according to an embodiment, a predetermined unit for division based on the segment model 234 may include not only a subword, but also other voice units, such as a segment.

In the case of the Korean, a subword may include four types: a vowel only, a combination of a vowel and a consonant, a combination of a consonant and a vowel, and a combination of a consonant, a vowel, and a consonant. If a phoneme sequence is divided into subwords, the segment model 234 may include thousands of subword information, e.g., ga, gya, gan, gal, nam, nan, un, hu, etc.

The subword dividing unit 223 may convert a new word, which may be a Japanese word or a Chinese word, into a phoneme sequence indicated by using a phonogram (e.g., Latin Alphabet, Katakana, Hangul, etc.), and the converted phoneme sequence may be divided into subwords.

In the case of languages other than the above-stated languages, the segment model 234 may include information for dividing a new word into predetermined unit components for each of the languages. Furthermore, the subword dividing unit 223 may divide a phoneme sequence of a new word into predetermined unit components based on the segment model 234.

The appearance probability information determining unit 224 may determine appearance probability information regarding predetermined unit components constituting a phoneme sequence of a new word. If a new word is included in a sentence of language data, the appearance probability information determining unit 224 may obtain appearance probabilities information by using words included in the sentence other than the new word.

For example, in a sentence 'oneul gim yeon a boyeojyo,' if the word 'gimyeona' is detected as a new word, the appearance probability information determining unit 224 may determine appearance probabilities regarding subwords 'myeo,' and 'na.' For example, the appearance probability information determining unit 224 may determine an appearance probability P(gi/oneul) by using appearance probability information regarding the word 'oneul' included in the sentence. Furthermore, if 'texas' is detected as a new word, appearance probability information may be determined with respect to respective subwords 'teks' and 's.'

If it is assumed that at least one particular subword or word appears before a current subword, appearance probability information regarding a subword may include information regarding a probability that the current subword may appear during speech recognition. Furthermore, appearance probability information regarding a subword may include information regarding an unconditional probability that a current subword may appear during speech recognition.

The language model updating unit 225 may update the segment model 234 by using appearance probability information determined with respect to respective subwords. The language model updating unit 225 may update the language model 235, such that a sum of all probabilities, under a condition that a particular subword or word appears before a current word or subword, is 1.

In detail, if one of appearance probability information determined with respect to respective subwords is P(B|A), the language model updating unit 225 may obtain probabilities P(C|A) and P(D|A) included in the language model 235 under a condition that A appears before a current word or subword. Next, the language model updating unit 225 may re-determine values of the probabilities P(B|A), P(C|A), and P(D|A), such that P(B|A)+P(C|A)+P(D|A) is 1.

When a language model is updated, the language model updating unit 225 may re-determine probabilities regarding other words or subwords included in the language model 235, and a time period elapsed for updating the language model may increase as a number of probabilities included in the language model 235 increases. Therefore, the language model updating unit 225 according to an embodiment may minimize a time period elapsed for updating a language model by updating a language model including a relatively small number of probabilities instead of updating a language model including a relatively large number of probabilities.

In the above-described speech recognition process, the speech recognition device 230 may use an acoustic model, a pronunciation dictionary, and a language model together to recognize a single word included in a voice signal. Therefore, when speech recognition data is updated, it is necessary to update the acoustic model, the pronunciation dictionary, and the language model together, such that a new word may be speech-recognized. However, to update an acoustic model, a pronunciation dictionary, and a language model together to speech-recognize a new word, it is also necessary to update information regarding words existed together and thus a time period of 1 hour or longer is necessary. Therefore, it is difficult for the speech recognition device 230 to perform speech recognition regarding a new word immediately as the new word is collected.

It is not necessary for the speech recognition data updating device 220 according to an embodiment to update the other models 232 and the pronunciation dictionary 233 based on characteristics of a new word. The speech recognition data updating device 220 may only update the language model 235 based on appearance probability information determined with respect to respective subword components constituting a new word. Therefore, in the method of updating a language model according to an embodiment, a language model may be updated with respect to a new word within a few seconds, and the speech recognition device 230 may reflect the new word in speech recognition in real time.

Figure 3:
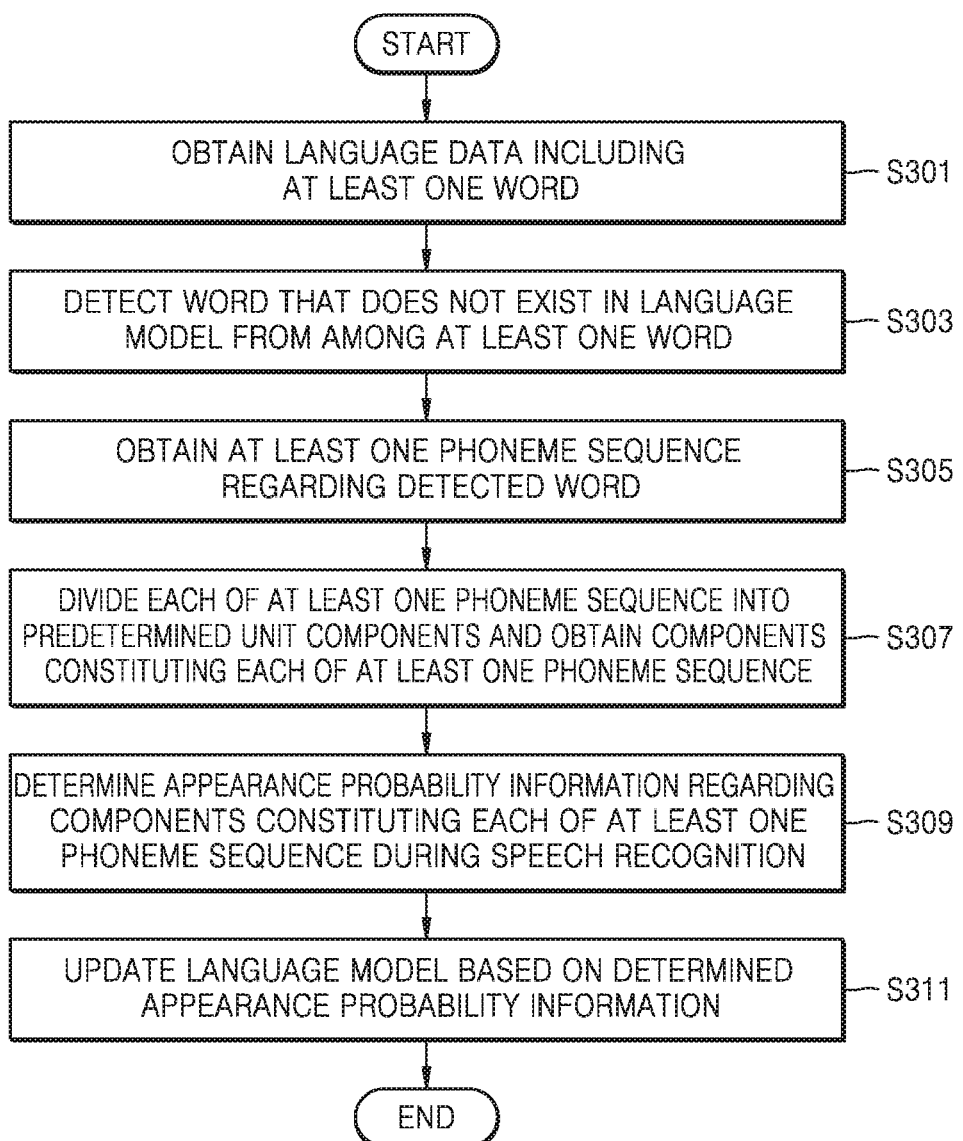
FIG. 3 is a flowchart showing a method of updating speech recognition data for recognition of a new word, according to an embodiment.

FIG. 3 is a flowchart showing a method of updating speech recognition data for recognition of a new word, according to an embodiment.

Referring to FIG. 3, in an operation S301, the speech recognition data updating device 220 may obtain language data including at least one word. The language data may include text included in content or a web page that is being displayed on a display screen of a device being used by a user or a module of the device.

In an operation S303, the speech recognition data updating device 220 may detect a word that does not exist in the language data from among at least one word. A word that does not exist in the language data is a word without information regarding an appearance probability thereof and cannot be detected as a speech-recognized word. Therefore, the speech recognition data updating device 220 may detect a word that does not exist in the language data as a new word for updating speech recognition data.

In an operation S305, the speech recognition data updating device 220 may obtain at least one phoneme sequence corresponding to the new word detected in the operation S303. A plurality of phoneme sequences corresponding to a word may exist based on various conditions including pronunciation rules or characteristics of a speaker. Furthermore, a number or a symbol may correspond to various pronunciation rules, and thus a plurality of corresponding phoneme sequences may exist with respect to a number of a symbol.

In an operation S307, the speech recognition data updating device 220 may divide each of at least one phoneme sequence obtained in the operation S305 into predetermined unit components and obtain components constituting each of the at least one phoneme sequence. In detail, the speech recognition data updating device 220 may divide each of phoneme sequence into subwords based on subword information included in the segment model 234, thereby obtaining components constituting each of phoneme sequences of a new word.

In an operation S309, the speech recognition data updating device 220 may determine information regarding an appearance probability of each of the components obtained in the operation S307 during speech recognition. Information regarding an appearance probability may include a conditional probability and may include information regarding an appearance probability of a current subword under a condition that a particular subword or word appears before the current subword. However, the present invention is not limited thereto, and information regarding an appearance probability may include an unconditional appearance probability regarding a current subword.

The speech recognition data updating device 220 may determine appearance probability information regarding predetermined components by using language data obtained in the operation S301. The speech recognition data updating device 220 may determine appearance probabilities regarding respective components by using a sentence or a paragraph to which subword components of a phoneme sequence of a new word belong and determine appearance probability information regarding the respective components. Furthermore, the speech recognition data updating device 220 may determine appearance probability information regarding respective components by using the at least one phoneme sequence obtained in the operation S305 together with a sentence or a paragraph to which the components belong. Detailed descriptions thereof will be given below with reference to FIGS. 16 and 17.

Information regarding an appearance probability that may be determined in an operation S309 may not only include a conditional probability, but also an unconditional probability.

In an operation S311, the speech recognition data updating device 220 may update a language model by using the appearance probability information determined in the operation S309. For example, the speech recognition data updating device 220 may update the language model 235 by using appearance probability information determined with respect to the respective subwords. In detail, the speech recognition data updating device 220 may update the language model 235, such that a sum of at least one probability included in the language model 235 under a condition that a particular subword or word appears before a current word or subword is 1.

Figure 4:
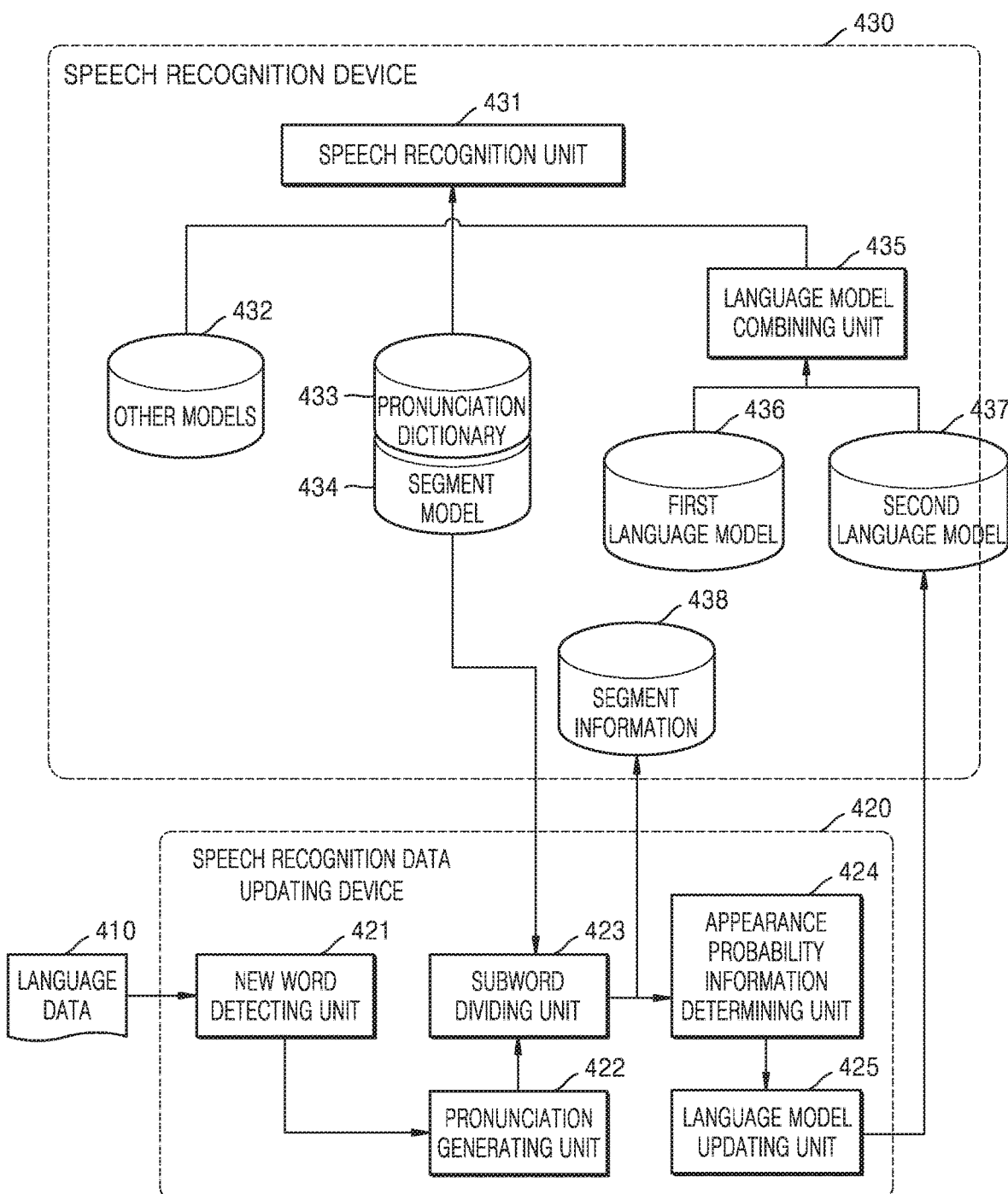
FIG. 4 is a block diagram showing an example of systems for adding a new word, according to an embodiment.

FIG. 4 is a block diagram showing an example of systems for adding a new word, according to an embodiment.

Referring to FIG. 4, the system may include a speech recognition data updating device 420 for adding a new word and a speech recognition device 430 for performing speech recognition, according to an embodiment. Unlike the speech recognition device 230 of FIG. 2, the speech recognition device 430 of FIG. 4 may further include segment information 438, a language model combining unit 435, a first language model 436, and a second language model 437. The speech recognition data updating device 420 and the speech recognition device 430 of FIG. 4 may correspond to the speech recognition data updating device 220 and the speech recognition device 230 of FIG. 2, and repeated descriptions thereof will be omitted.

When speech recognition is performed, the language model combining unit 435 of FIG. 4 may determine appearance probabilities regarding respective words by combining a plurality of language models, unlike the language model 235 of FIG. 2. In other words, the language model combining unit 435 may obtain appearance probabilities regarding a word included in a plurality of language models and obtain an appearance probability regarding the word by combining the plurality of obtained appearance probabilities regarding the word. Referring to FIG. 4, the language model combining unit 435 may obtain appearance probabilities regarding respective words by combining the first language model 436 and the second language model 437.

The first language model 436 is a language model included in the speech recognition device 430 in advance and may include a general-purpose language data that may be used in a general speech recognition system. The first language model 436 may include appearance probabilities regarding words or predetermined units determined based on a large amount of language data (e.g., thousands of sentences included in web pages, contents, etc.). Therefore, since the first language model 436 is obtained based on a large amount of sample data, speech recognition based on the first language model 436 may guarantee high efficiency and stability The second language model 437 is a language model including appearance probabilities regarding new words. Unlike the first language model 436, the second language model 437 may be selectively applied based on situations, and at least one second language model 437 that may be selectively applied based on situations may exist.

The second language model 437 is a language model that includes appearance probability information regarding a new word according to an embodiment. Unlike the first language model 436, the second language model 437 may be selectively applied according to different situations, and there may be at least one second language model 437 that may be selectively applied according to the situation.

The second language model 437 may be updated by the speech recognition data updating device 420 in real time. When language model is updated, the speech recognition data updating device 420 may re-determine appearance probabilities included in the language model by using an appearance probability regarding a new word. Since the second language model 437 includes a relatively small number of appearance probability information, a number of appearance probability information to be considered for updating the second language model 437 is relatively small. Therefore, updating of the second language model 437 for recognizing a new word may be performed more quickly.

Detailed descriptions of a method that the language model combining unit 435 obtains an appearance probability regarding a word or a subword by combining the first language model 436 and the second language model 437 during speech recognition will be given below with reference to FIGS. 11 and 12, in which a method of performing speech recognition according to an embodiment is shown.

Unlike the speech recognition device 230, the speech recognition device 430 of FIG. 4 may further include the segment information 438.

The segment information 438 may include information regarding a correspondence relationship between a new word and subword components obtained by dividing the new word. As shown in FIG. 4, the segment information 438 may be generated by the speech recognition data updating device 420 when a phoneme sequence of a new word is divided into subwords based on the segment model 434.

For example, if a new word is 'gim yeon a' and subwords thereof are 'gi,' 'myeo,' and 'na,' the segment information 426 may include information indicating that the new word 'gim yeon a' and the subwords 'gi,' 'myeo,' and 'na' correspond to each other. In another example, if a new word is 'texas' and subwords thereof are 'teks' and 's,' the segment information 426 may include information indicating that the new word 'texas' and the subwords 'teks' and 's' correspond to each other In a method of performing speech recognition, a word corresponding to a phoneme sequence determined based on an acoustic model may be obtained from a pronunciation dictionary 433. However, if the second language model 437 of the speech recognition device 430 is updated according to an embodiment, the pronunciation dictionary 433 is not updated, and thus the pronunciation dictionary 433 does not include information regarding a new word.

Therefore, the speech recognition device 430 may obtain information regarding a word corresponding to predetermined unit components divided by using the segment information 438 and output a final speech recognition result in the form of text.

Detailed descriptions of a method of performing speech recognition by using the segment information 426 will be given below with reference to FIGS. 12 through 14 related to a method of performing speech recognition.

Figure 5:
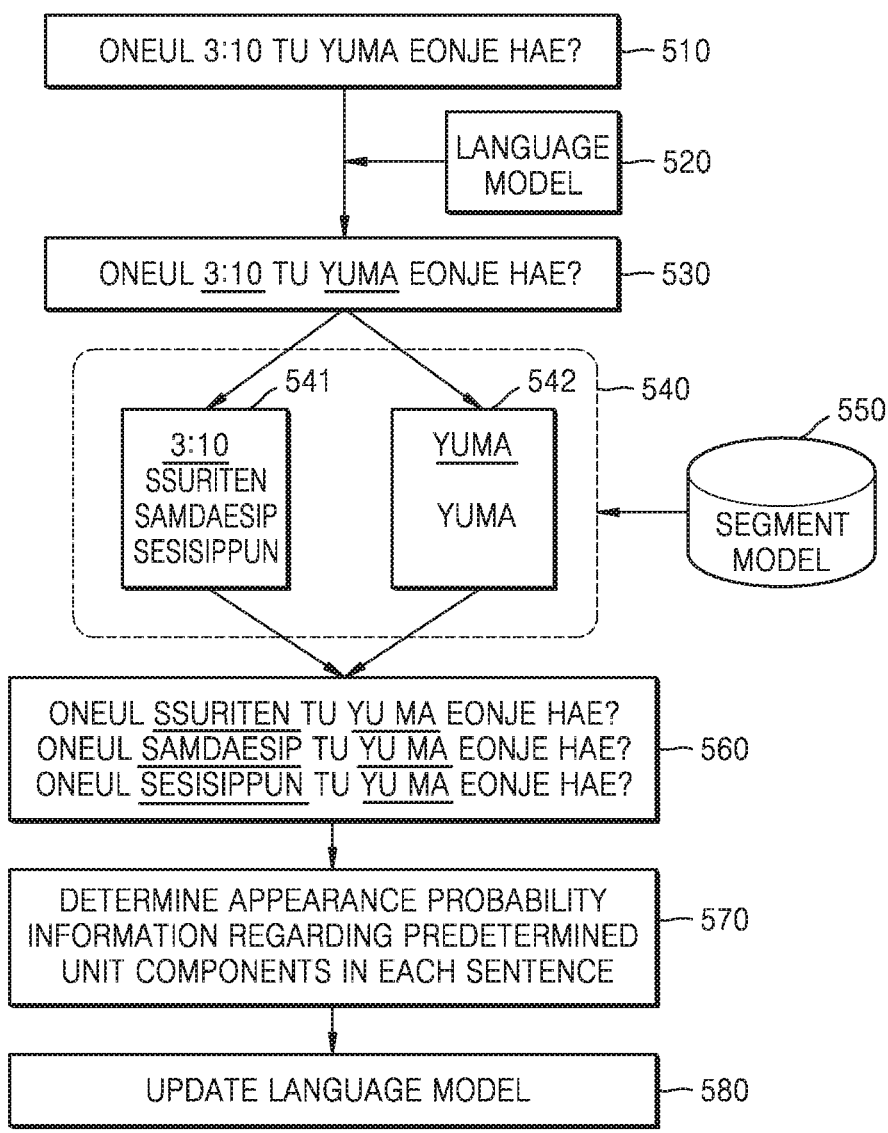
FIGS. 5 and 6 are flowcharts showing an example of adding a new word according to an embodiment.
Figure 6:
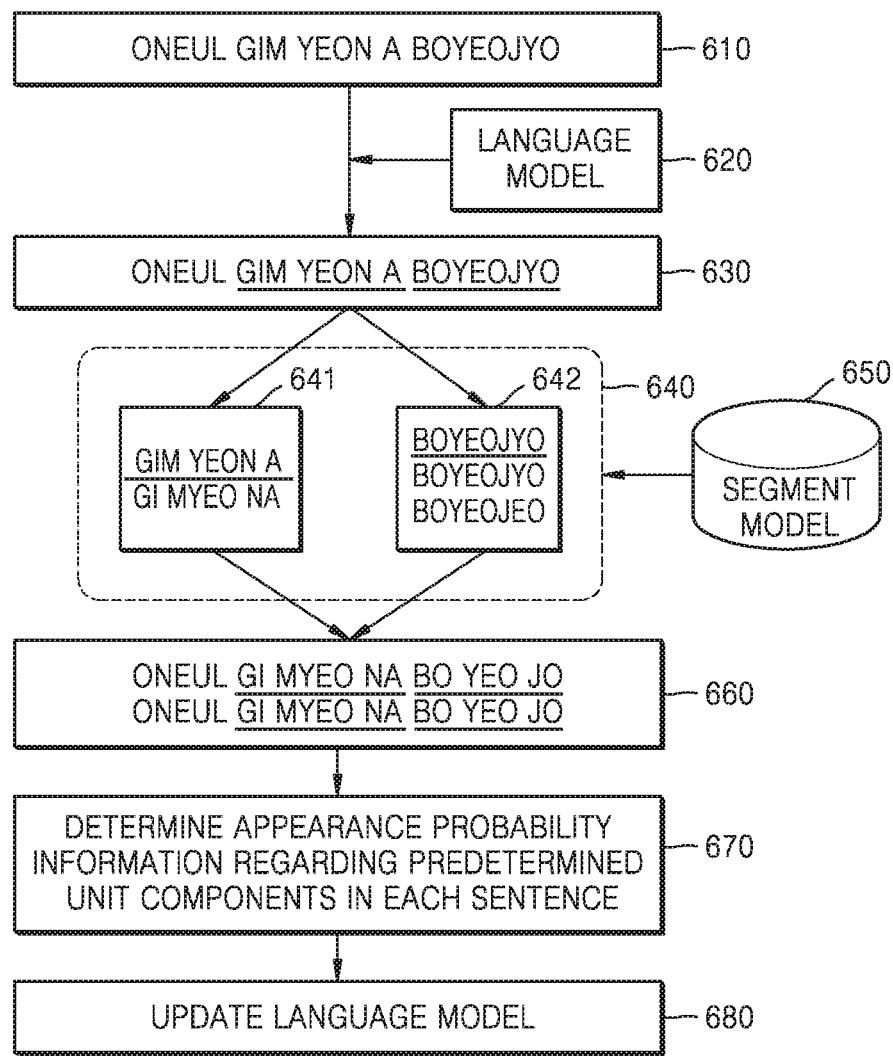

FIGS. 5 and 6 are flowcharts showing an example of adding a new word according to an embodiment.

Referring to FIG. 5, in an operation S10, the speech recognition data updating device 220 may obtain language data including a sentence 'oneul 3:10 to yuma eonj e hae?' in the form of text data.

In an operation S30, the speech recognition data updating device 220 may detect words '3:10' and 'yuma,' which do not exist in a language model 520, by using the language model 520 including at least one of a first language model and a second language model.

In an operation S40, the speech recognition data updating device 220 may obtain phoneme sequences corresponding to the detected words by using a segment model 550 and a pronunciation generating unit 422 and divide each of the phoneme sequence into predetermined unit components. In operations 541 and 542, the speech recognition data updating device 220 may obtain phoneme sequences 'ssuriten,' 'samdaesip,' and 'sesisippun' corresponding to the word '3:10' and a phoneme sequence 'yuma' corresponding to the word 'yuma.' Next, the speech recognition data updating device 220 may divide each of the phoneme sequences into subword components.

In an operation S60, the speech recognition data updating device 220 may compose sentences including the phoneme sequences obtained in the operations 541 and 542. Since the three phoneme sequences corresponding to the word '3:10' are obtained, three sentences may be composed.

In an operation S70, the speech recognition data updating device 220 may determine appearance probability information regarding the predetermined unit components in each of sentences composed in the operation S60.

For example, a probability P(ssu|oneul) regarding 'ssu' of a first sentence may have a value of ⅓, because, when 'oneul' appears, 'ssu,' 'sam' of a second sentence, or 'se' of a third sentence may follow. In the same regard, a probability P(sam|oneul) and a probability P(se|oneul) may have a value of ⅓. Since a probability P(ri|ssu) regarding 'ri' exists only if 'ri' appears after 'ssu' appears in the three sentences, the probability P(ri|ssu) may have a value of 1. In the same regard, a probability P(ten|ri), a probability P(yu|tu), a probability P(ma|yu), a probability P(dae|sam), a probability P(sip|dae), a probability P(s|se), and a probability P(sip|si) may have a value of 1. In the case of a probability P(ppun|sip), 'tu' or 'ppun' may appear when 'sip' appears, and thus the probability P(ppun|sip) may have a value of ½.

In an operation S80, the speech recognition data updating device 220 may update one or more of a first language model and at least one second language model based on the appearance probability information determined in the operation S70. In the case of updating a language model for speech recognition of a new word, the speech recognition data updating device 220 may update the language model based on appearance probabilities regarding other words or subwords already included in the language model.

For example, in consideration of a probability already included in a language model under a condition that 'oneul' appears first, e.g. the probability P(X|oneul), a probability P(ssu|oneul), a probability P(sam|oneul), and a probability P(se|oneul) and the probability P(X|oneul), the probability P(X|oneul) that is already included in the language model may be re-determined. For example, if a probability of P(du|oneul)=P(tu-oneul)=½ exists in probabilities already included in the language model, the speech recognition data updating device 220 may re-determine the probability P(X|oneul) based on the probability already existing in the language model and the probability obtained in the operation S70. In detail, since there are total five cases in which 'oneul' appears, each of appearance probabilities regarding respective subwords is ⅕, and thus each of probabilities P(X|oneul) may have a value of ⅕. Therefore, the speech recognition data updating device 220 may re-determine conditional appearance probabilities based on a same condition included in a same language model, such that a sum of values of the appearance probabilities is 1.

Referring to FIG. 6, in an operation 610, the speech recognition data updating device 220 may obtain language data including a sentence 'oneul gim yeon a boyeojyo' in the form of text data.

In an operation 630, the speech recognition data updating device 220 may detect words gim yeon a and 'boyeojyo,' which do not exist in a language model 620, by using at least one of a first language model and a second language model.

In an operation 640, the speech recognition data updating device 220 may obtain phoneme sequences corresponding to the detected words by using a segment model 650 and a pronunciation generating unit 622 and divide each of the phoneme sequence into predetermined unit components. In operations 641 and 642, the speech recognition data updating device 220 may obtain phoneme sequences 'gi myeo na' corresponding to the word 'gim yeon a' and phoneme sequences 'boyeojyo' and 'boyeojeo' corresponding to the word 'boyeojyo.' Next, the speech recognition data updating device 220 may divide each of the phoneme sequences into subword components.

In an operation 660, the speech recognition data updating device 220 may compose sentences including the phoneme sequences obtained in the operations 641 and 642. Since the two phoneme sequences corresponding to the word 'boyeojyo' are obtained, two sentences may be composed.

In an operation 670, the speech recognition data updating device 220 may determine appearance probability information regarding the predetermined unit components in each of sentences composed in the operation 660.

For example, a probability P(gi|oneul) regarding 'gi' of a first sentence may have a value of 1, because 'gi' follows in two sentences in which 'oneul' appears. In the same regard, a probability P(myeo|gi), a probability P(na|myeo), a probability P(bo|na), and a probability P(yeo|bo) may have a value of 1, because only once case exists in each condition. In the case of a probability P(jyo|yeo) and a probability P(jeo|yeo), 'jyo' or 'jeo' may appear when 'yeo' appears in two sentences, and thus the both probability P(jyo|yeo) and the probability P(jeo|yeo) may have a value of ½.

In an operation 680, the speech recognition data updating device 220 may update one or more of a first language model and at least one second language model based on the appearance probability information determined in the operation 670.

Figures 7, 8:
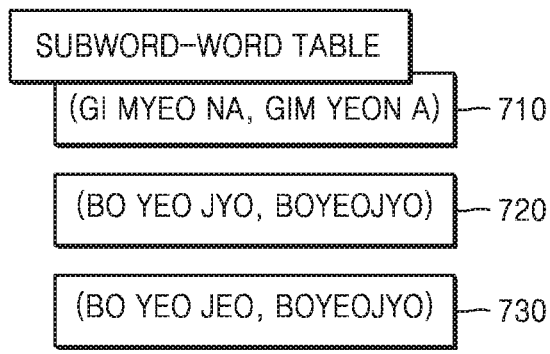
FIG. 7 is a table showing an example of correspondence relationships between new words and subwords, according to an embodiment.
FIG. 8 is a table showing an example of appearance probability information regarding new words during speech recognition, according to an embodiment.

FIG. 7 is a table showing an example of correspondence relationships between new words and subwords, according to an embodiment.

Referring to FIG. 7, if a word gim yeon a is detected as a new word, 'gi,' 'myeo,' and 'na' may be determined as subwords corresponding to the word 'grim yeon a' as shown in 710. In the same regard, if a word 'boyeojyo' is detected as a new word, 'bo,' 'yeo,' and 'jyo', and 'bo', 'yeo', and 'jeo' may be determined as subwords corresponding to the word 'boyeojyo' as shown in 720 and 730.

Information regarding a correspondence relationship between a new word and subwords as shown in FIG. 7 may be stored as the segment information 426 and utilized during speech recognition.

FIG. 8 is a table showing an example of appearance probability information regarding new words during speech recognition, according to an embodiment.

Referring to FIG. 8, information regarding an appearance probability may include at least one of information regarding an unconditional appearance probability and information regarding an appearance probability under a condition of a previously appeared word.

Information regarding an unconditional appearance probability 810 may include information regarding unconditional appearance probabilities regarding words or subwords, such as a probability P(oneul), a probability P(gi), and a probability P(jeo).

Information regarding an appearance probability under a condition of a previously appeared word 820 may include appearance probability information regarding words or subwords under a condition of a previously appeared word, such as a probability P(gi|oneul), a probability P(myeo|gi), and a probability P(jyo|yeo). The appearance probabilities regarding 'oneul g,' 'gi myeo,' and 'yeo jyo' as shown in FIG. 8 may correspond to the probability P(gi|oneul), the probability P(myeo|gi), and the probability P(jyo|yeo), respectively.

Figure 9:
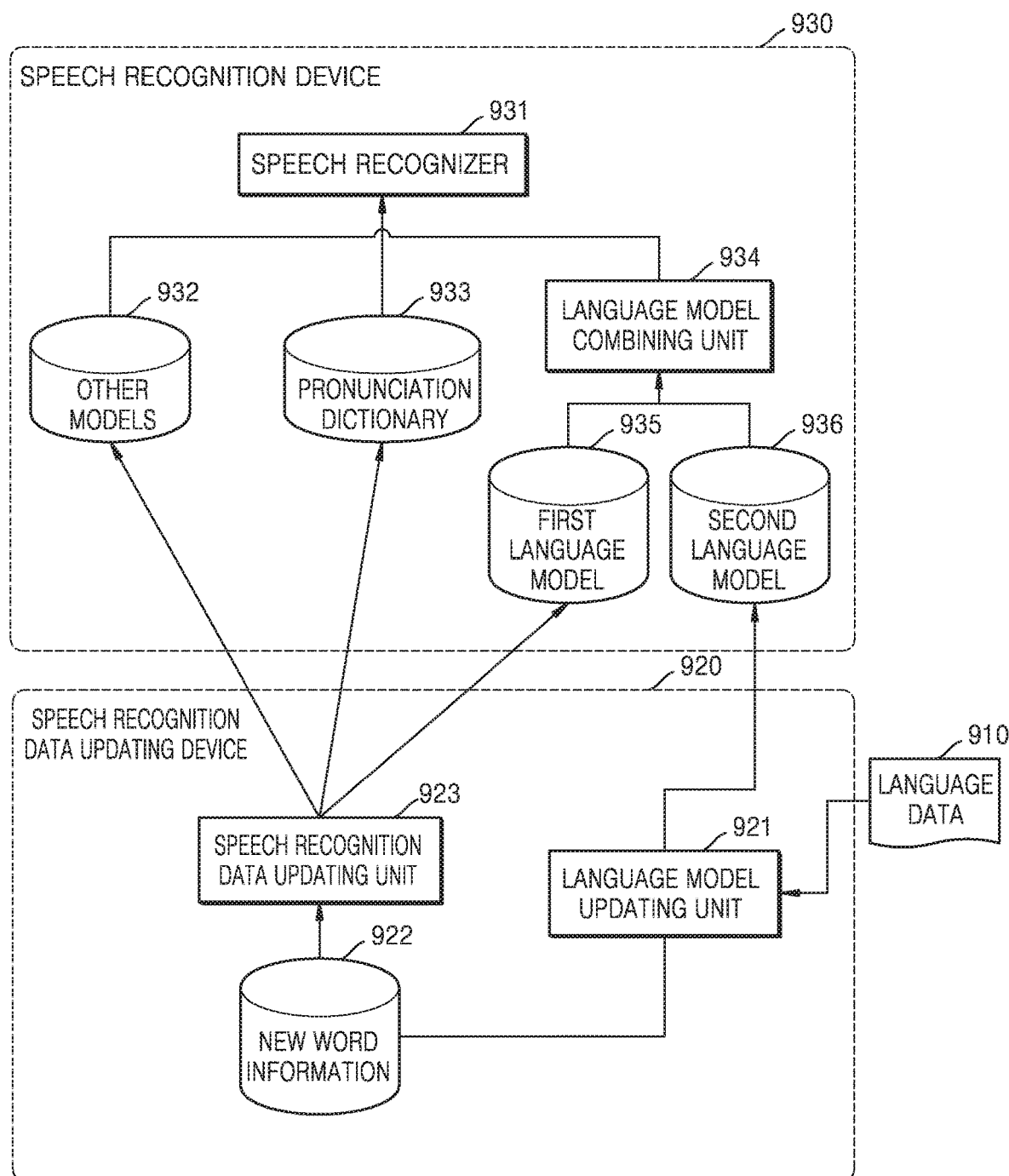
FIG. 9 is a block diagram showing a system for updating speech recognition data for recognizing a new word, according to an embodiment.

FIG. 9 is a block diagram showing a system for updating speech recognition data for recognizing a new word, according to an embodiment.

A speech recognition data updating device 920 shown in FIG. 9 may include new word information 922 for updating at least one of other models 932, a pronunciation dictionary 933, and a first language model 935 and a speech recognition data updating unit 923.

The speech recognition data updating device 920 and the speech recognition device 930 of FIG. 9 may correspond to the speech recognition data updating devices 220 and 420 and the speech recognition device 230 and 430 of FIGS. 2 and 4, and repeated descriptions thereof will be omitted. Furthermore, the language model updating unit 921 of FIG. 9 may correspond to the components 221 through 225 and 421 through 425 included in the speech recognition data updating devices 220 and 420 shown in FIGS. 2 and 4, and repeated descriptions thereof will be omitted.

The new word information 922 of FIG. 9 may include information regarding a word that is recognized by the speech recognition data updating device 920 as a new word. The new word information 922 may include information regarding a new word for updating at least one of the other models 932, the pronunciation dictionary 933 and the first language model 935. In detail, the new word information 922 may include information about a word corresponding to an appearance probability added to a second language model 936 by the speech recognition data updating device 920. For example, the new word information 922 may include at least one of a phoneme sequence of a new word, information regarding predetermined unit components obtained by dividing the phoneme sequence of the new word, and appearance probability information regarding the respective components of the new word.

The speech recognition data updating unit 923 may update at least one of the other models 932, the pronunciation dictionary 933, and the first language model 935 of the speech recognition device 930 by using the new word information 922. In detail, the speech recognition data updating unit 923 may update an acoustic model and the pronunciation dictionary 933 of the other models 932 by using information regarding a phoneme sequence of a new word. Furthermore, the speech recognition data updating unit 923 may update the first language model 935 by using information regarding predetermined unit components obtained by dividing the phoneme sequence of the new word and appearance probability information regarding the respective components of the new word.

Unlike information regarding an appearance probability included in the second language model 936, appearance probability information regarding a new word included in the first language model 935 updated by the speech recognition data updating unit 923 may include appearance probability information regarding a new word that is not divided into predetermined unit components.

For example, if the new word information 922 includes information regarding 'grim yeon a,' the speech recognition data updating unit 923 may update an acoustic model and the pronunciation dictionary 933 by using a phoneme sequence 'gi myeo na' corresponding to 'gim yeon a.' The acoustic model may include feature information regarding a voice signal corresponding to 'gi myeo na.' The pronunciation dictionary 933 may include a phoneme sequence information 'gi myeo na' corresponding to ' gim yeon a.' Furthermore, the speech recognition data updating unit 923 may update the first language model 935 by re-determining appearance probability information included in the first language model 935 by using appearance probability information regarding 'gim yeon a.'

Appearance probability information included in the first language model 935 are obtained based on a large amount of information regarding sentences, thus including a large number of appearance probability information. Therefore, since it is necessary to re-determine appearance probability information included in the first language model 935 based on information regarding a new word to update the first language model 935, it may take significantly longer to update the first language model 935 than to update the second language model 936. The speech recognition data updating device 920 may update the second language model 936 by collecting language data in real time, whereas the speech recognition data updating device 920 may update the first language model 935 periodically at intervals of a long period of time (e.g., once a week or once a month).

If the speech recognition device 930 performs speech recognition by using the second language model 936, it is necessary to further perform restoration of a text corresponding to a predetermined unit component by using segment information after finally selecting a speech-recognized language. The reason thereof is that, since appearance probability information regarding predetermined unit components is used, a finally selected speech-recognized language includes phoneme sequences obtained by dividing a new word into unit components. Furthermore, appearance probability information included in the second language model 936 are not obtained based on a large amount of information regarding sentences, but obtained based on a sentence including a new word or a limited amount of appearance probability information included in the second language model 936. Therefore, appearance probability information included in the first language model 934 may be more accurate than appearance probability information included in the second language model 936.

In other words, it may be more efficient for the speech recognition device 930 to perform a speech recognition by using the first language model 935 than by using the second language model 936 in terms of efficiency and stability. Therefore, the speech recognition data updating unit 923 according to an embodiment may periodically update the first language model 935, the pronunciation dictionary 933, and the acoustic model.

Figure 10:
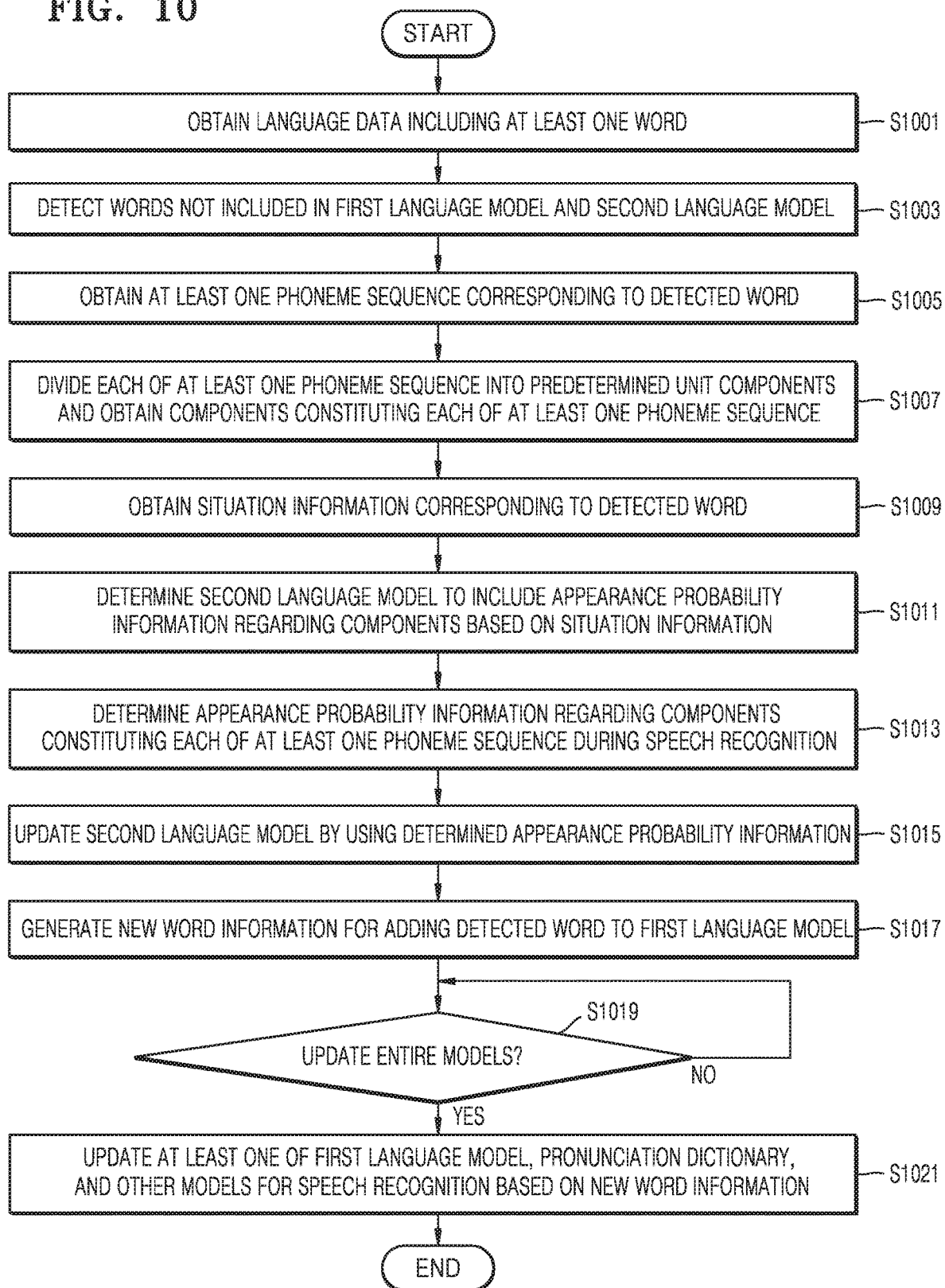
FIG. 10 is a flowchart showing a method of updating language data for recognizing a new word, according to an embodiment.

FIG. 10 is a flowchart showing a method of updating language data for recognizing a new word, according to an embodiment.

Unlike the method shown in FIG. 3, the method shown in FIG. 10 may further include an operation for selecting one of at least one or more second language model based on situation information and updating the selected second language model. Furthermore, the method shown in FIG. 10 may further include an operation for updating a first language model based on information regarding a new word, which is used for updating the second language model.

Referring to FIG. 10, in an operation S1001, the speech recognition data updating device 420 may obtain language data including words. The operation S1001 may correspond to the operation S301 of FIG. 3. The language data may include texts included in content or a web page that is being displayed on a display screen of a device being used by a user or a module of the device.

In an operation S1003, the speech recognition data updating device 420 may detect a word that does not exist in the language data. In other words, the speech recognition data updating device 420 may detect a word, regarding which information regarding an appearance probability does not exist in a first language model or a second language model, from among at least one word included in the language data. The operation S1003 may correspond to the operation S303 of FIG. 3.

Since the second language model includes appearance probability information regarding respective components obtained by dividing a word into predetermined unit components, the second language data according to an embodiment does not include appearance probability information regarding a whole word. The speech recognition data updating device 420 may detect a word, with respect to which information regarding an appearance probability does not exist in the second language model, by using segment information including information regarding correspondence relationships between words and respective components obtained by dividing the words into predetermined unit components.

In an operation S1005, the speech recognition data updating device 420 may obtain at least one phoneme sequence corresponding to the new word detected in the operation S1003. A plurality of phoneme sequences corresponding to a word may exist based on various conditions including pronunciation rules or characteristics of a speaker. The operation S1005 may correspond to the operation S305 of FIG. 3.

In an operation S1007, the speech recognition data updating device 420 may divide each of at least phoneme sequence obtained in the operation S1005 into predetermined unit components and obtain components constituting each of the at least one phoneme sequence. In detail, the speech recognition data updating device 420 may divide each of phoneme sequence into subwords based on subword information included in the segment model 434, thereby obtaining components constituting each of phoneme sequences of a new word. The operation S1007 may correspond to the operation S307 of FIG. 3.

In an operation S1009, the speech recognition data updating device 420 may obtain situation information corresponding to the word detected in the operation S1003. Situation information may include situation information regarding a detected new word.

Situation information according to an embodiment may include at least one of information regarding a user, module identification information, information regarding location of a device, and information regarding a location at which a new word is obtained. For example, when a new word is obtained at a particular module or while a module is being executed, situation information may include the particular module or information regarding the module being executed. If the new word is obtained while a particular speaker is using the speech recognition data updating device 420 or the new word is related to the particular speaker, situation information regarding the new word may include information regarding the particular speaker.

In an operation S1011, the speech recognition data updating device 420 may select the second language model based on the situation information obtained in the operation S1009. The speech recognition data updating device 420 may update the second language model by adding appearance probability information regarding components of the new word to the selected second language model.

According to an embodiment, the speech recognition device 430 may include a plurality of independent second language models. In detail, a second language model may include a plurality of independent language models that may be selectively applied based on particular modules, modules, or speakers. In the operation S1011, the speech recognition data updating device 420 may select a second language model corresponding to the situation information from among a plurality of independent language models. During speech recognition, the speech recognition device 430 may collect situation information and perform speech recognition by using a second language model corresponding to the situation information. Therefore, according to an embodiment, adaptive speech recognition may be performed based on situation information, and thus speech recognition efficiency may be improved.

In an operation S1013, the speech recognition data updating device 420 may determine information regarding an appearance probability of each of the components obtained in the operation S1007 during speech recognition. For example, the speech recognition data updating device 420 may determine appearance probabilities regarding respective subword components by using a sentence or a paragraph to which components of a word included in the language data belong. The operation S1013 may correspond to the operation S309 of FIG. 3.

In an operation S1015, the speech recognition data updating device 420 may update the second language model by using the appearance probability information determined in the operation S1013. The speech recognition data updating device 420 may simply add appearance probability information regarding components of a new word to the second language model. Alternatively, the speech recognition data updating device 420 may add appearance probability information regarding components of a new word to the language model selected in the operation S1011 and re-determine appearance probability information included in the language model selected in the operation S1011, thereby updating the second language model. The operation S1015 may correspond to the operation S311 of FIG. 3.

In an operation S1017, the speech recognition data updating device 420 may generate new word information for adding the word detected in the operation S1003 to the first language model. In detail, new word information may include at least one of information regarding components obtained by dividing a new word used for updating the second language model, information regarding a phoneme sequence, situation information, and appearance probabilities regarding the respective components. If the second language model is repeatedly updated, new word information may include information regarding a plurality of new words.

In an operation S1019, the speech recognition data updating device 420 may determine whether to update at least one of other models, a pronunciation dictionary, and the first language model. Next, in the operation S1019, the speech recognition data updating device 420 may update at least one of the other models, the pronunciation dictionary, and the first language model by using the new word information generated in the operation S1017. The other models may include an acoustic model including information for obtaining phoneme sequences corresponding to voice signals. A significant time period may be elapsed for updating the at least one of the other models, the pronunciation dictionary, and the first language model, because it is necessary to re-determine data included in the respective models based on information regarding a new word. Therefore, the speech recognition data updating device 420 may update the entire model in an idle time slot or at weekly or monthly intervals.

The speech recognition data updating device 420 according to an embodiment may update a second language model in real time for speech recognition of a word that is detected as a new word. Since a small number of probability information are included in the second language model, the second language model may be updated quicker than updating the first language model, speech recognition data may be updated in real time.

However, compared to speech recognition by using a first language model, it is not preferable for performing speech recognition by using a second language model in terms of efficiency and stability of a recognition result. Therefore, the speech recognition data updating device 420 may periodically update the first language model by using appearance probability information included in the second language model, such that a new word may be recognized by using the first language model.

Hereinafter, a method of performing speech recognition based on updated speech recognition data according to an embodiment will be described in closer details.

Figure 11:
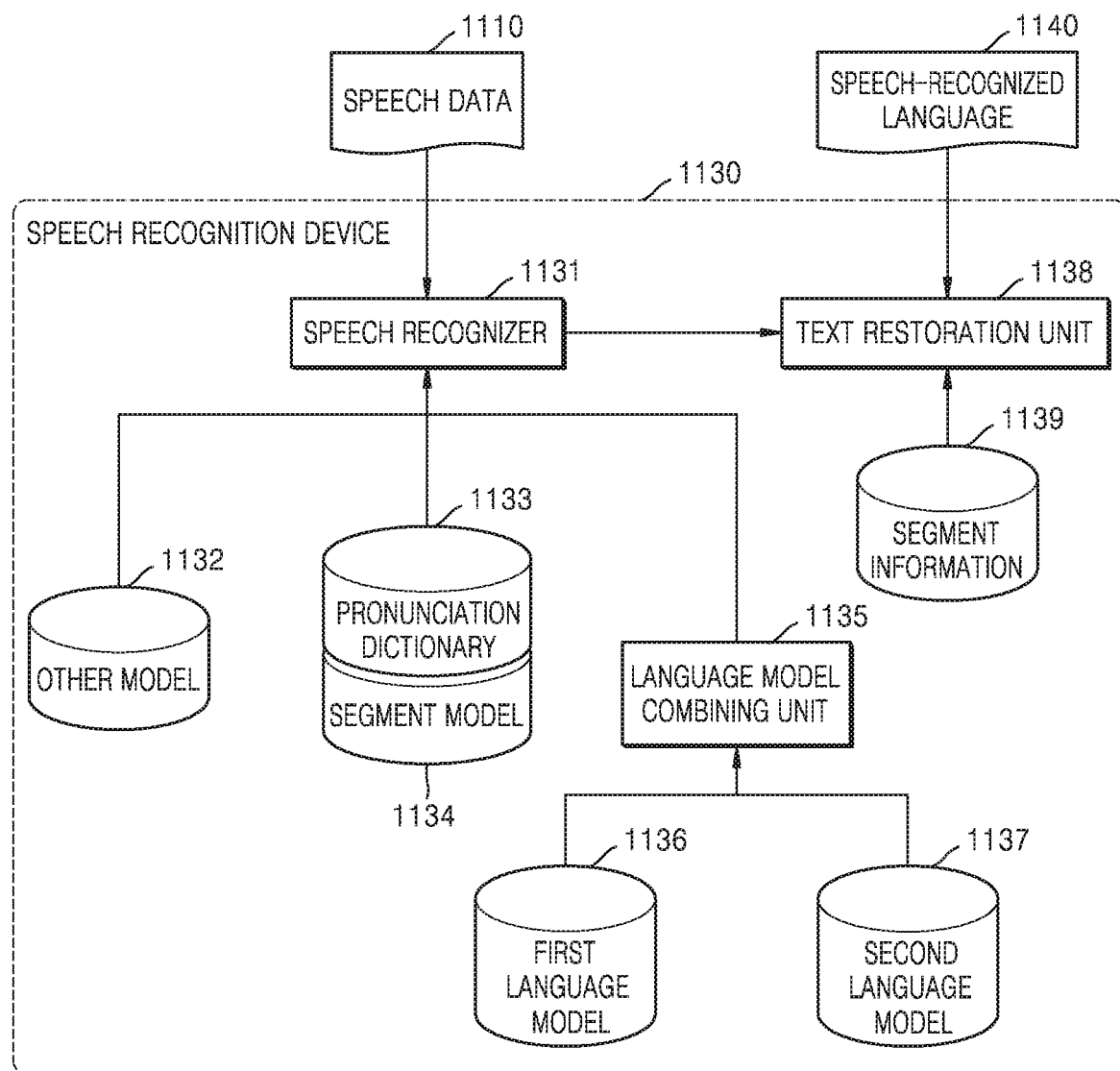
FIG. 11 is a block diagram showing a speech recognition device that performs speech recognition according to an embodiment.

FIG. 11 is a block diagram showing a speech recognition device that performs speech recognition according to an embodiment.

Referring to FIG. 11, a speech recognition device 1130 according to an embodiment may include a speech recognizer 1131, other model 1132, a pronunciation dictionary 1133, a language model combining unit 1135, a first language model 1136, a second language model 1137, and a text restoration unit 1138. The speech recognition device 1130 of FIG. 11 may correspond to the speech recognition devices 100, 230, 430, and 930 of FIGS. 1, 2, 4, and 9, where repeated descriptions will be omitted.

Furthermore, the speech recognizer 1131, the other model 1132, the pronunciation dictionary 1133, the language model combining unit 1135, the first language model 1136, and the second language model 1137 of FIG. 11 may correspond to the speech recognition units 100, 231, 431, and 931, the other models 232, 432, and 932, the pronunciation dictionaries 150, 233, 433, and 933, the language model combining units 435 and 935, the first language models 436 and 936, and the second language models 437 and 937 of FIGS. 1, 2, 4, and 9, where repeated descriptions will be omitted.

Unlike the speech recognition devices 100, 230, 430, and 930 of FIGS. 1, 2, 4, and 9, the speech recognition device 1130 shown in FIG. 11 further includes the text restoration unit 1138 and may perform text restoration during speech recognition.

The speech recognizer 1131 may obtain speech data 1110 for performing speech recognition. The speech recognizer 1131 may perform speech recognition by using the other model 1132, the pronunciation dictionary 1133, and the language model combining unit 1135. In detail, the speech recognizer 1131 may extract feature information regarding a voice data signal and obtain a candidate phoneme sequence corresponding to the extracted feature information by using an acoustic model. Next, the speech recognizer 1131 may obtain words corresponding to respective candidate phoneme sequences from the pronunciation dictionary 1133. The speech recognizer 1131 may finally select a word corresponding to the highest appearance probability based on appearance probabilities regarding the respective words obtained from the language model combining unit 1135 and output a speech-recognized language.

The text restoration unit 1138 may determine whether to perform text restoration based on whether appearance probabilities regarding respective components constituting a word are used for speech recognition. According to an embodiment, text restoration refers to converting characters of predetermined unit components included in a language speech-recognized by the speech recognizer 1131 to a corresponding word.

For example, it may be determined whether to perform text restoration based on information indicating that appearance probabilities are used with respect to respective subwords during speech recognition, the information generated by the speech recognizer 1131. In another example, the text restoration unit 1138 may determine whether to perform text restoration by detecting subword components from a speech-recognized language based on segment information 1126 or the pronunciation dictionary 1133. However, the present invention is not limited thereto, and the text restoration unit 1138 may determine whether to perform text restoration and a portion for performing text restoration with respect to a speech-recognized language.

In the case of performing text restoration, the text restoration unit 1138 may restore subword characters based on the segment information 1126. For example, if a sentence speech-recognized by the speech recognizer 1131 is 'oneul gi myeo na bo yeo jyo,' the text restoration unit 1138 may determine whether appearance probability information is used with respect to each of subwords for speech-recognizing the sentence. Furthermore, the text restoration unit 1138 may determine portions to which appearance probabilities are used for respective subwords in a speech-recognized sentence, that is, portions for text restoration. The text restoration unit 1138 may determine 'myeo,' 'na,' 'bo,' 'yeo,' and 'jyo' as portions to which appearance probability are used for respective subwords. Furthermore, the text restoration unit 1138 may refer to correspondence relationships between subwords and words stored in the segment information 1126 and perform text restoration by converting 'gi myeo na' to 'gim yeon a' and 'bo yeo jyo' into 'boyeojyo.' The text restoration unit 1138 may finally output a speech-recognized language 1140 including the restored texts.

Figure 12:
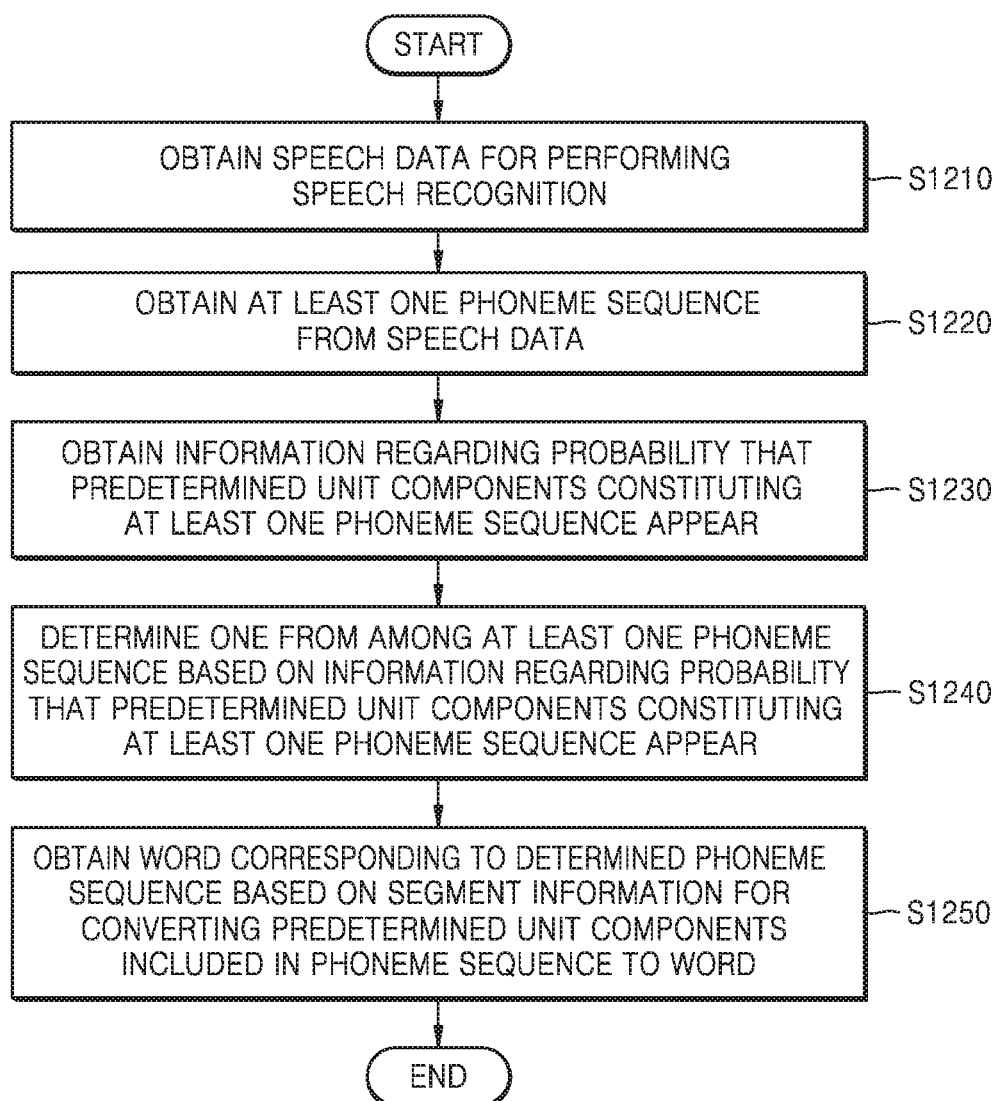
FIG. 12 is a flowchart showing a method of performing speech recognition according to an embodiment.

FIG. 12 is a flowchart showing a method of performing speech recognition according to an embodiment.

Referring to FIG. 12, in an operation S1210, the speech recognition device 100 may obtain speech data for performing speech recognition.

In an operation S1220, the speech recognition device 100 may obtain at least one phoneme sequence included in the speech data. In detail, the speech recognition device 100 may detect feature information regarding the speech data and obtain a phoneme sequence from the feature information by using an acoustic model. At least one or more phoneme sequences may be obtained from the feature information. If a plurality of phoneme sequences are obtained from same speech data based on an acoustic model, the speech recognition device 100 may finally determine a speech-recognized word by obtaining appearance probabilities regarding words corresponding to the plurality of phoneme sequences.

In an operation S1230, the speech recognition device 100 may obtain appearance probability information regarding predetermined unit components constituting at least one phoneme sequence. In detail, the speech recognition device 100 may obtain appearance probability information regarding predetermined unit components included in a language model.

If appearance probability information regarding predetermined unit components constituting a phoneme sequence cannot be obtained from a language model, the speech recognition device 100 is unable to obtain information regarding a word corresponding to the corresponding phoneme sequence. Therefore, the speech recognition device 100 may determine that the corresponding phoneme sequence cannot be speech-recognized and perform speech recognition with respect to other phoneme sequences regarding the same speech data obtained in the operation S1220. If speech recognition cannot be performed with respect to the other phoneme sequences, the speech recognition device 100 may determine that the speech data cannot be speech-recognized.

In an operation S1240, the speech recognition device 100 may select at least one of at least one phoneme sequence based on appearance probability information regarding predetermined unit components constituting phoneme sequences. For example, the speech recognition device 100 may select a phoneme sequence corresponding to the highest probability from among the at least one candidate phoneme sequences based on appearance probability information corresponding to subword components constituting the candidate phoneme sequences.

In an operation S1250, the speech recognition device 100 may obtain a word corresponding to the phoneme sequence selected in the operation S1240 based on segment information including information regarding a word corresponding to at least one predetermined unit component. Segment information according to an embodiment may include information regarding predetermined unit components corresponding to a word. Therefore, the speech recognition device 100 may convert subword components constituting a phoneme sequence to a corresponding word based on the segment information. The speech recognition device 100 may output a word converted based on the segment information as a speech-recognized result.

Figure 13:
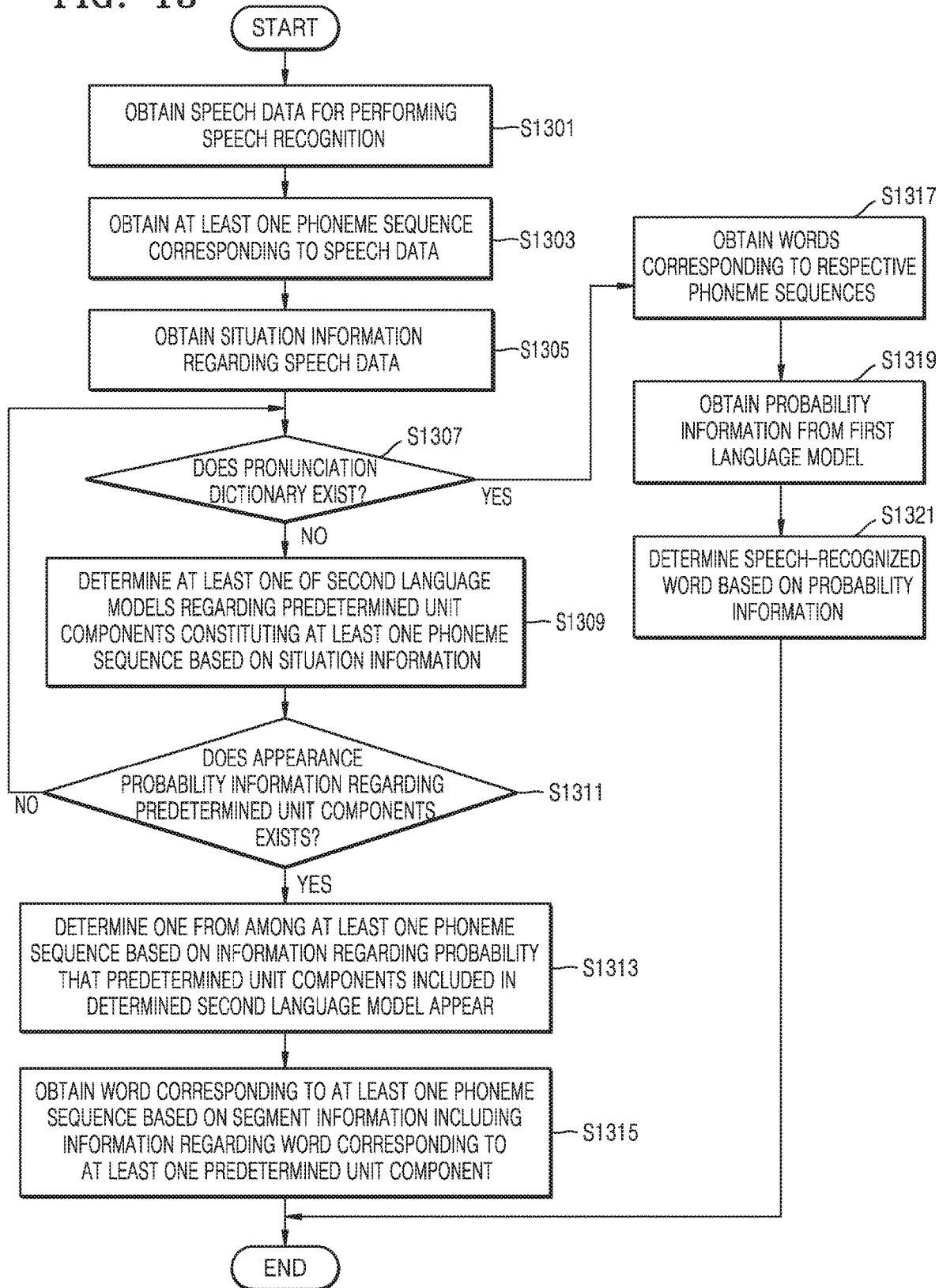
FIG. 13 is a flowchart showing a method of performing speech recognition according to an embodiment.

FIG. 13 is a flowchart showing a method of performing speech recognition according to an embodiment. Unlike the method shown in FIG. 12, the method of performing speech recognition shown in FIG. 13 may be used to perform speech recognition based on situation information regarding speech data. Some of operations of the method shown in FIG. 13 may correspond to some of the operations of the method shown in FIG. 12, where repeated descriptions will be omitted.

Referring to FIG. 13, in an operation S1301, the speech recognition device 430 may obtain speech data for performing speech recognition. The operation S1301 may correspond to the operation S1210 of FIG. 12.

In an operation S1303, the speech recognition device 430 may obtain at least one phoneme sequence corresponding to the speech data. In detail, the speech recognition device 430 may detect feature information regarding the speech data and obtain a phoneme sequence from the feature information by using an acoustic model. If a plurality of phoneme sequences are obtained, the speech recognition device 430 may perform speech recognition by finally determining one subword or word based on appearance probabilities regarding subwords or words corresponding to respective phoneme sequences.

In an operation S1305, the speech recognition device 430 may obtain situation information regarding the speech data. The speech recognition device 430 may perform speech recognition in consideration of the situation information regarding the speech data by selecting a language model to be applied during the speech recognition based on the situation information regarding the speech data.

According to an embodiment, situation information regarding speech data may include at least one of information regarding a user, module identification information, and information regarding location of a device. A language model that may be selected during speech recognition may include appearance probability information regarding words or subwords and may correspond to at least one situation information.

In an operation S1307, the speech recognition device 430 may determine whether information regarding a word corresponding to the respective phoneme sequences obtained in the operation S1303 exists in a pronunciation dictionary. In the case where information regarding a word corresponding to a phoneme sequence exists in the pronunciation dictionary, the speech recognition device 430 may perform speech recognition with respect to the corresponding phoneme sequence based on the word corresponding to the corresponding phoneme sequence. In the case where information regarding a word corresponding to a phoneme sequence does not exist in the pronunciation dictionary, the speech recognition device 430 may perform with respect to the corresponding phoneme sequence based on subword components constituting the corresponding phoneme sequence. A word that does not exist in the pronunciation dictionary may be either a word that cannot be speech-recognized or a new word added to a language model when speech recognition data is updated according to an embodiment.

In the case of a phoneme sequence corresponding to information existing in the pronunciation dictionary, the speech recognition device 100 may obtain a word corresponding to the phoneme sequence by using the pronunciation dictionary and finally determine a speech-recognized word based on appearance probability information regarding the word.

In the case of a phoneme sequence corresponding to information existing in the pronunciation dictionary, the speech recognition device 100 may also divide the phoneme sequence into predetermined unit components and determine appearance probability information regarding the components. In other words, all of the operations S1307 through S1311 and the operation S1317 through S1319 may be performed with respect to a phoneme sequence corresponding to information existing in the pronunciation dictionary. If a plurality of appearance probability information are obtained with respect to a phoneme sequence, the speech recognition device 100 may obtain an appearance probability regarding the phoneme sequence by combining appearance probabilities obtained from a plurality of language models as described below.

A method of performing speech recognition with respect to phoneme sequences in a case where a pronunciation dictionary includes information regarding words corresponding to the phoneme sequence will be described below in detail in descriptions of operations S1317 through S1321. Furthermore, a method of performing speech recognition with respect to phoneme sequences in a case where a pronunciation dictionary does not include information regarding words corresponding to the phoneme sequence will be described below in detail in descriptions of operations S1309 through S1315.

In the case of phoneme sequences where a pronunciation dictionary includes information regarding words corresponding to the phoneme sequence, the speech recognition device 430 may obtain words corresponding to the respective phoneme sequences from the pronunciation dictionary in the operation S1317. The pronunciation dictionary may include information regarding at least one phoneme sequence that may correspond to a word. A plurality of phoneme sequences corresponding to a word may exist. On the other hand, a plurality of words corresponding to a phoneme sequence may exist. Information regarding phoneme sequences that may correspond to words may be generally determined based on pronunciation rules. However, the present invention is not limited thereto, and information regarding phoneme sequences that may correspond to words may also be determined based on a user input or a result of learning a plurality of speech data.

In an operation S1319, the speech recognition device 430 may obtain appearance probability information regarding the words obtained in the operation S1317 from a first language model. The first language model may include a general-purpose language model that may be used for general speech recognition. Furthermore, the first language model may include appearance probability information regarding words included in the pronunciation dictionary.

If the first language model includes at least one language model corresponding to situation information, the speech recognition device 430 may determine at least one language model included in the first language model based on the situation information obtained in the operation S1305. Next, the speech recognition device 430 may obtain appearance probability information regarding the words obtained in the operation S1317 from the determined language model. Therefore, even in the case of applying a first language model, the speech recognition device 430 may perform adaptive speech recognition based on situation information by selecting a language model corresponding to the situation information.

If a plurality of language models are determined and appearance probability information regarding a word is included in two or more of the determined language models, the speech recognition device 430 may obtain appearance probability information regarding the word by combining the language models. Detailed descriptions thereof will be given below in the description of the operation S1313.

In an operation S1321, the speech recognition device 430 may finally determine a speech-recognized word based on the information regarding an appearance probability obtained in the operation S1319. If a plurality of words that may correspond to same speech data exist, the speech recognition device 430 may finally determine and output a speech-recognized word based on appearance probabilities regarding the respective words.

In the case of phoneme sequences where a pronunciation dictionary does not include information regarding words corresponding to the phoneme sequence, in the operation S1309, the speech recognition device 430 may determine at least one of second language models based on the situation information obtained in the operation S1305. The speech recognition device 430 may include at least one independent second language model that may be applied during speech recognition based on situation information. The speech recognition device 430 may determine a plurality of language models based on situation information. Furthermore, the second language model that may be determined in the operation S1309 may include appearance probability information regarding predetermined unit components constituting phoneme sequences.

In the operation S1311, the speech recognition device 430 may determine whether the second language model determined in the operation S1309 includes appearance probability information regarding predetermined unit components constituting phoneme sequences. If the second language model does not include the appearance probability information regarding the components, appearance probability information regarding phoneme sequences cannot be obtained, and thus speech recognition can no longer be performed. If a plurality of phoneme sequences corresponding to same speech data exist, the speech recognition device 430 may determine whether words corresponding to phoneme sequences other than the phoneme sequence, regarding which information regarding an appearance probability thereof cannot be obtained, exist in a pronunciation dictionary in the operation S1307.

In the operation S1313, the speech recognition device 430 may determine one of at least one phoneme sequence based on appearance probability information regarding predetermined unit components included in the second language model determined in the operation S1309. In detail, the speech recognition device 430 may obtain appearance probability information regarding predetermined unit components constituting phoneme sequences from the second language model. Next, the speech recognition device 430 may determine a phoneme sequence corresponding to the highest appearance probability based on the appearance probability information regarding the predetermined unit components.

When a plurality of language models are selected in the operation S1309 or the operation S1319, appearance probability information regarding a predetermined unit component or word may be included in two or more language models. The plurality of language models that may be selected may include at least one of a first language model and a second language model.

For example, if a new word is added to two or more language models based on situation information when speech recognition data is updated, appearance probability information regarding a same word or subword may be added to two or more language models. In another example, if a word that existed only in a second language model is added to a first language model when speech recognition data is periodically updated, appearance probability information regarding a same word or subword may be included in the first language model and the second language model. The speech recognition device 430 may obtain an appearance probability regarding a predetermined unit component or word by combining the language models.

When there are a plurality of appearance probability information regarding a single word or component as a plurality of language models are selected, the language model combining unit 435 of the speech recognition device 430 may obtain a single appearance probability.

For example, as shown in Equation 1 below, the language model combining unit 435 may obtain a single appearance probability by obtaining a sum of weights regarding respective appearance probabilities.

$$P(a|b)=\omega_1 P_1(a|b)+\omega_2 P_2(a|b)(\omega_1+\omega_2=1) \qquad \text{Equation 1}$$

In Equation 1, P(a|b) denotes an appearance probability regarding a under a condition that b appears before a. P1 and P2 denote an appearance probability regarding a included in a first language model and a second language model, respectively ω1 and ω2 denotes weights that may be applied to P1 and P2, respectively. A number of right-side components of Equation 1 may increase according to a number of language models including appearance probability information regarding a.

Weights that may be applied to respective appearance probabilities may be determined based on situation information or various other conditions, e.g., information regarding a user, a region, a command history, a module being executed, etc.

According to Equation 1, an appearance probability may increase as information regarding the appearance probability is included in more language models. On the contrary, an appearance probability may decrease as information regarding the appearance probability is included in less language models. Therefore, a preferable appearance probability may not be determined in the case of determining an appearance probability according to Equation 1.

The language model combining unit 435 may obtain an appearance probability regarding a word or a subword according to Equation 2 based on the Bayesian interpolation. In the case of determining an appearance probability according to Equation 2, the appearance probability may not increase or decrease according to a number of language models including appearance probability information. In the case of an appearance probability included only in a first language model or a second language model, the appearance probability may not decrease and may be maintained according to Equation 2.

$$P(a|b) = \frac{\omega_1 P_1(b) P_1(a|b) + \omega_2 P_2(b) P_2(a|b)}{\omega_1 P_1(b) + \omega_2 P_2(b)} \quad (\omega_1 + \omega_2 = 1) \qquad \text{Equation 2}$$

Furthermore, the language model combining unit 435 may obtain an appearance probability according to Equation 3. According to Equation 3, an appearance probability may be the largest one from among appearance probabilities included in the respective language models.

$$P(a|b)=\max\{P_1(a|b),P_2(a|b)\} \qquad \text{Equation 3:}$$

In the case of determining an appearance probability according to Equation 3, the appearance probability may be the largest one from among the appearance probabilities, and thus an appearance probability regarding a word or subword included one or more times in each of the language models may have a relatively large value. Therefore, according to Equation 3, an appearance probability regarding a word added to language models as a new word according to an embodiment may be falsely reduced.

In the operation S1315, the speech recognition device 430 may obtain a word corresponding to the phoneme sequence determine in the operation S1313 based on segment information. The segment information may include information regarding a correspondence relationship between at least one unit component constituting a phoneme sequence and a word. If a new word is detected according to a method of updating speech recognition data according to an embodiment, segment information regarding each word may be generated as information regarding a new word. If a phoneme sequence is determined as a result of speech recognition based on probability information, the speech recognition device 430 may convert a phoneme sequence to a word based on the segment information, and thus a result of the speech recognition may be output as the word.

Figure 14:
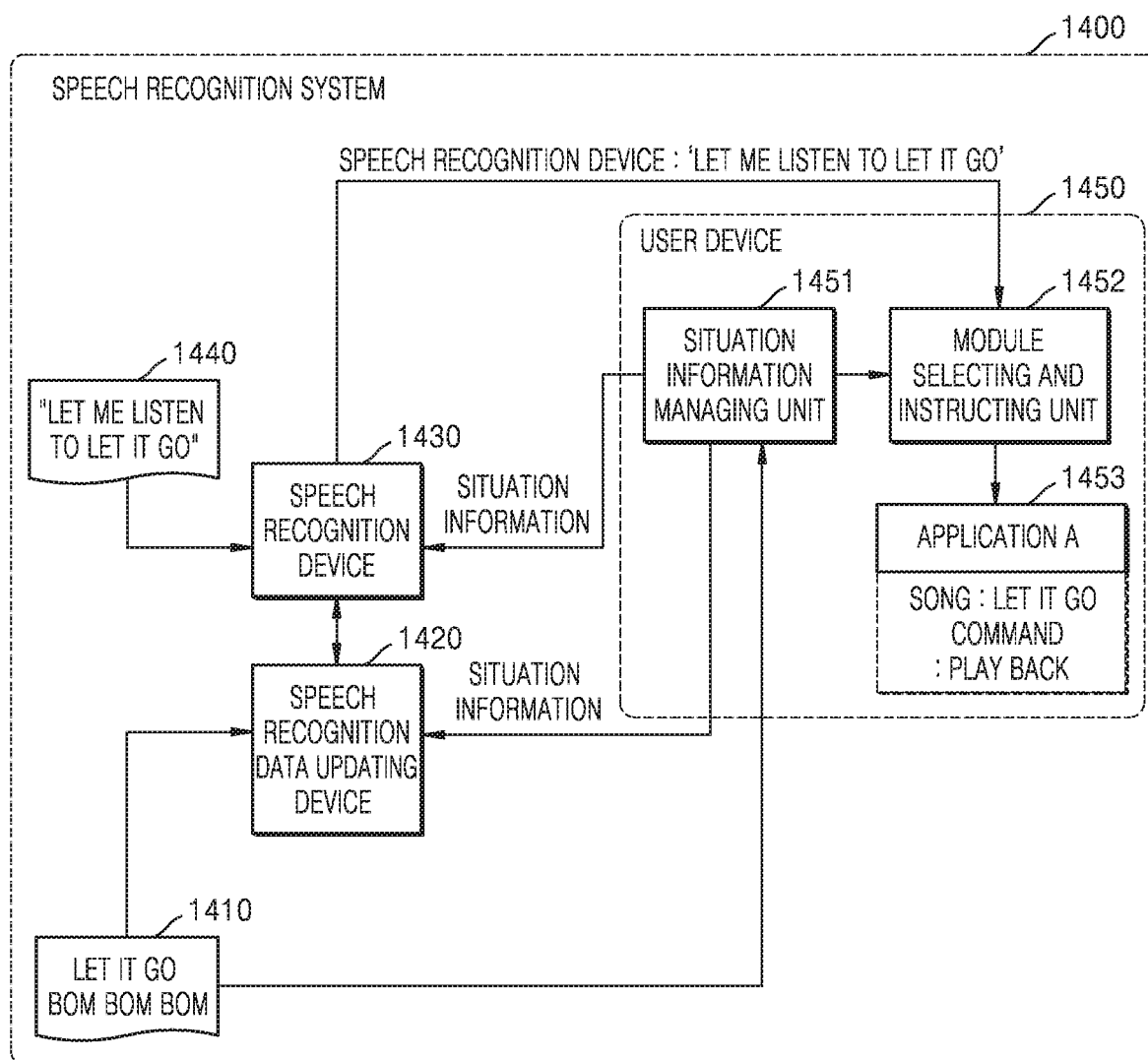
FIG. 14 is a block diagram showing a speech recognition system that executes a module based on a result of speech recognition performed based on situation information, according to an embodiment.

FIG. 14 is a block diagram showing a speech recognition system that executes a module based on a result of speech recognition performed based on situation information, according to an embodiment.

Referring to FIG. 14, a speech recognition system 1400 may include a speech recognition data updating device 1420, a speech recognition device 1430, and a user device 1450. The speech recognition data updating device 1420, the speech recognition device 1430, and the user device 1450 may exist as independent devices as shown in FIG. 14. However, the present invention is not limited thereto, and the speech recognition data updating device 1420, the speech recognition device 1430, and the user device 1450 may be included in a single device as components of the device. The speech recognition data updating device 1420 and the speech recognition device 1430 of FIG. 14 may correspond to the speech recognition data updating devices 220 and 420 and the speech recognition devices 230 and 430 described above with reference to FIG. 13, where repeated descriptions will be omitted.

First, a method of updating speech recognition data in consideration of situation information by using the speech recognition system 1400 shown in FIG. 14 will be described.

The speech recognition data updating device 1420 may obtain language data 1410 for updating speech recognition data. The language data 1410 may be obtained from various devices and transmitted to the speech recognition data updating device 1420. For example, the language data 1410 may be obtained by the user device 1450 and transmitted to the speech recognition data updating device 1420.

Furthermore, a situation information managing unit 1451 of the user device 1450 may obtain situation information corresponding to the language data 1410 and transmit the obtained situation information to the speech recognition data updating device 1420. The speech recognition data updating device 1420 may determine a language model to add a new word included in the language data 1410 based on the situation information received from the situation information managing unit 1451. If no language model corresponding to the situation information exists, the speech recognition data updating device 1420 may generate a new language model and add appearance probability information regarding a new word to the newly generated language model.

The speech recognition data updating device 1420 may detect new words 'Let it go,' and 'born born born' included in the language data 1410. Situation information corresponding to the language data 1410 may include an application A for music playback. Situation information may be determined with respect to the language data 1410 or may also be determined with respect to each of new words included in the language data 1410.

The speech recognition data updating device 1420 may add appearance probability information regarding 'Let it go' and 'born born born' to at least one language model corresponding to the application A. The speech recognition data updating device 1420 may update speech recognition data by adding appearance probability information regarding a new word to a language model corresponding to situation information. The speech recognition data updating device 1420 may update speech recognition data by re-determining appearance probability information included in the language model to which appearance probability information regarding a new word is added. A language model to which appearance probability information may be added may correspond to one application or a group including at least one application.

The speech recognition data updating device 1420 may update a language model in real time based on a user input. In relation to the speech recognition device 1430 according to an embodiment, a user may issue a voice command to an application or an application group according to a language defined by the user. If only an appearance probability regarding a command 'Play [Song]' exists in a language model, appearance probability information regarding a command 'Let me listen to [Song]' may be added to the language model based on a user definition.

However, if a language can be determined based on a user definition, an unexpected voice command may be performed as a language defined by another user is applied. Therefore, the speech recognition data updating device 1420 may set an application or a time for application of a language model as a range for applying a language model determined based on a user definition.

The speech recognition data updating device 1420 may update speech recognition data in real time based on situation information received from the situation information managing unit 1451 of the user device 1450. If the user device 1450 is located nearby a movie theater, the user device 1450 may transmit information regarding the corresponding movie theater to the speech recognition data updating device 1420 as situation information. Information regarding a movie theater may include information regarding movies being played at the corresponding movie theater, information regarding restaurants nearby the movie theater, traffic information, etc. The speech recognition data updating device 1420 may collect information regarding the corresponding movie theater via web crawling or from a content provider. Next, the speech recognition data updating device 1420 may update speech recognition data based on the collected information. Therefore, since the speech recognition device 1430 may perform speech recognition in consideration of location of the user device 1450, speech recognition efficiency may be further improved.

Second, a method of performing speech recognition and executing a module based on a result of the speech recognition at the speech recognition system 1400 will be described.

The user device 1450 may include various types of terminal devices that may be used by a user. For example, the user device 1450 may be a mobile phone, a smart phone, a laptop computer, a tablet PC, an e-book terminal, a digital broadcasting device, a personal digital assistant (PDA), a portable multimedia player (PMP), a navigation device, a MP3 player, a digital camera, or a wearable device (e.g., eyeglasses, a wristwatch, a ring, etc.). However, the present invention is not limited thereto.

The user device 1450 according to an embodiment may collect at least one of situation information related to speech data 1440 and the user device 1450 and perform a determined task based on a speech-recognized word that is speech-recognized based on the situation information.

The user device 1450 may include the situation information managing unit 1451, the module selecting and instructing unit 1452, and an application A 1453 for performing a task based on a result of speech recognition.

The situation information managing unit 1451 may collect situation information for selecting a language model during speech recognition at the speech recognition device 1430 and transmit the situation information to the speech recognition device 1430.

Situation information may include information regarding a module being currently executed on the user device 1450, a history of using modules, a history of voice commands, information regarding an application that may be executed on the user device 1450 and corresponds to an existing language model, information regarding a user currently using the user device 1450, etc. The history of using modules and the history of voice commands may include information regarding time points at which the respective modules are used and time points at which the respective voice commands are received, respectively.

Situation information according to an embodiment may be configured as shown in Table 1 below.

TABLE 1

| | Situation Information |
|---|---|
| Currently Used Module | Movie Player Module 1 |
| History of Module Usage | Music Player Module 1/1 Day Ago<br>Cable Broadcasting/1 Hour Ago<br>Music Player Module 1/30 Minutes Ago |
| History of Voice Command Application with Language | Home Theater Play [Singer 1] Song/10 Minutes Ago<br>Music Player Module 1/30 Minutes Ago<br>Broadcasting<br>Music Player Module 1<br>Movie Player Module 1<br>Music Player Module 2 |

The speech recognition device 1430 may select at least one language model to be used during speech recognition based on situation information. If situation information indicates that the speech data 1440 is obtained from the user device 1450 while the application A is being executed, the speech recognition device 1430 may select a language model corresponding to at least one of the application A and the user device 1450.

The module selecting and instructing unit 1452 may select a module based on a result of speech recognition performed by the speech recognition device 1430 and transmit a command to perform a task to the selected module. First, the module selecting and instructing unit 1452 may determine whether the result of speech recognition includes an identifier of a module and a keyword for a command. A keyword for a command may include identifiers indicating commands for requesting a module to perform respective tasks, e.g., play, pause, next, etc.

If a module identifier is included in the result of speech recognition, the module selecting and instructing unit 1452 may select a module corresponding to the module identifier and transmit a command to the selected module.

If a module identifier is not included in the result of speech recognition, the module selecting and instructing unit 1452 may obtain at least one of a keyword for a command included in the result of speech recognition and situation information corresponding to the result of speech recognition. Based on at least one of the keyword for a command and the situation information, the module selecting and instructing unit 1452 may determine a module for performing a task according to the result of speech recognition.

In detail, the module selecting and instructing unit 1452 may determine a module for performing a task based on a keyword for a command. Furthermore, the module selecting and instructing unit 1452 may determine a module that is the most suitable for performing the task based on situation information. For example, the module selecting and instructing unit 1452 may determine a module based on an execution frequency or whether the corresponding module is the most recently executed module.

Situation information that may be collected by the module selecting and instructing unit 1452 may include information regarding a module currently being executed on the user device 1450, a history of using modules, a history of voice commands, information regarding an application that corresponding to an existing language model, etc. The history of using modules and the history of voice commands may include information regarding time points at which the modules are used and time points at which the voice commands are received.

Even if a result of speech recognition includes a module identifier, the corresponding module may not be able to perform a task according to a command. The module selecting and instructing unit 1452 may determine a module to perform a task as in the case where a result of speech recognition does not include a module identifier.

Referring to FIG. 14, the module selecting and instructing unit 1452 may receive 'let me listen to Let it go' from the speech recognition device 1430 as a result of speech recognition. Since the result of speech recognition does not include an application identifier, an application A for performing a task based on the result of speech recognition may be determined based on situation information or a keyword for a command. The module selecting and instructing unit 1452 may request the application A to play back a song 'Let it go.'

Figure 15:
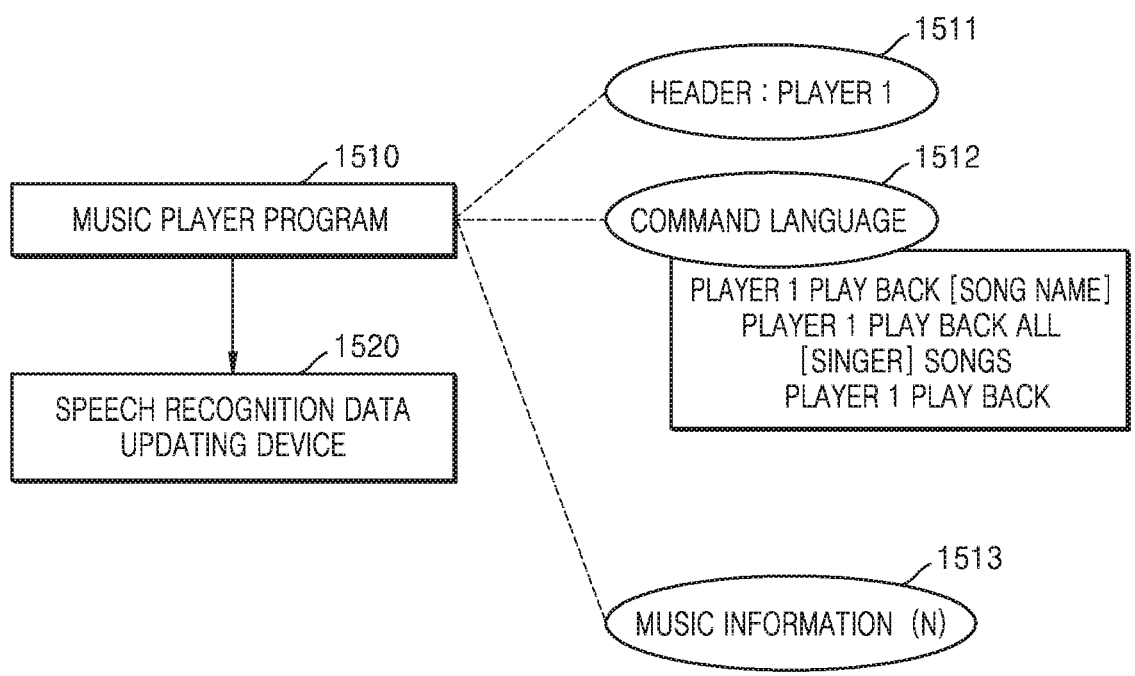
FIG. 15 is a diagram showing an example of situation information regarding a module, according to an embodiment.

FIG. 15 is a diagram showing an example of situation information regarding a module, according to an embodiment.

Referring to FIG. 15, an example of commands of a music player program 1510 for performing a task based on a voice command is shown. The speech recognition data updating device 1520 may correspond to the speech recognition data updating device 1420 of FIG. 14.

The speech recognition data updating device 1520 may receive situation information regarding the music player program 1510 from the user device 1450 and update speech recognition data based on the received situation information.

The situation information regarding the music player program 1510 may include a header 1511, a command language 1512, and music information 1513 as shown in FIG. 15.

The header 1511 may include information for identifying the music player program 1510 and may include information regarding type, storage location, and name of the music player program 1510.

The command language 1512 may include an example of commands regarding the music player program 1510. The music player program 1510 may perform a task when a speech-recognized sentence like the command language 1512 is received. A command of the command language 1512 may also be set by a user.

The music information 1513 may include information regarding music that may be played back by the music player program 1510. For example, the music information 1513 may include identification information regarding music files that may be played back by the music player program 1510 and classification information thereof, such as information regarding albums and singers.

The speech recognition data updating device 1520 may update a second language model regarding the music player program 1510 by using a sentence of the command language 1512 and words included in the music information 1513. For example, the speech recognition data updating device 1520 may obtain appearance probability information by including words included in the music information 1513 in a sentence of the command language 1512.

When a new application is installed, the user device 1450 according to an embodiment may transmit information regarding the application, which includes the header 1511, the command language 1512, and the music information 1513, to the speech recognition data updating device 1520. Furthermore, when a new event regarding an application occurs, the user device 1450 may update information regarding the application, which includes the header 1511, the command language 1512, and the music information 1513, and transmit the updated information to the speech recognition data updating device 1520. Therefore, the speech recognition data updating device 1520 may update a language model based on the latest information regarding the application.

When the speech recognition device 1430 performs speech recognition, the user device 1450 may transmit situation information for performing speech recognition to the speech recognition device 1430. The situation information may include information regarding the music player program shown in FIG. 5.

The situation information may be configured as shown in Table 2.

TABLE 2

| | Situation Information |
|---|---|
| Currently Used Module | Memo |
| Command History | Music Player Module 3 Play [Song Title] 1/10 Minutes Ago |
| | Music Player Module 3 Play [Singer 1] Song/15 Minutes Ago |
| History of Simultaneous Module Usage | Memo - Music Player Module 3/1 Day Ago |
| | Memo - Music Player Module 3/2 Days Ago |
| Module Information | Music Player Module 1 [Singers 1-3] N Songs |
| | Music Player Module 2 [Singers 3-6] N Songs |
| | Music Player Module 3 [Singers 6-8] N Songs |
| SNS History | Music Player Module 1 Stated Once |
| | Music Player Module 2 Stated Four Times |
| | Music Player Module N Stated Twice |

The speech recognition device 1430 may determine weights applicable to language models corresponding to respective music player programs based on a history of simultaneous module usages from among situation information shown in Table 2 If a memo program is currently being executed, the speech recognition device 1430 may perform speech recognition by applying a weight to a language model corresponding to a music player program that has been simultaneously used with the memo program. As a voice input is received from a user, if a result of speech recognition performed by the speech recognition device 1430 is output as 'Play all [Singer 3] songs,' the module selecting and instructing unit 1432 may determine a module to perform a corresponding task. Since a speech-recognized command does not include a module identifier, the module selecting and instructing unit 1432 may determine a module to perform a corresponding task based on the command and the situation information. In detail, the module selecting and instructing unit 1432 may select a module to play back music according to a command in consideration of various information including a history of simultaneous module usages, a history of recent module usages, and a history of SNS usages included in the situation information. Referring to Table 1, from between music player modules 1 and 2 capable of play back songs of [Singer 3], a number of times that the music player module 2 is mentioned on SNS is greater than the music player module 1, the module selecting and instructing unit 1432 may select the music player module 2. Since the command does not include a module identifier, the module selecting and instructing unit 1432 may finally decide whether to play music by using the selected music player module 2 based on a user input.

The module selecting and instructing unit 1432 may request to perform a plurality of tasks with respect to a plurality of modules according to a speech-recognized command. It is assumed that situation information is configured as shown in Table 3 below.

TABLE 3

| | Situation Information |
|---|---|
| Currently Used Module | Home Screen |
| Command History | Music Player Module 3 Play [Song]/10 Minutes Ago |
| | I Will Write Memo/20 Minutes Ago |
| History of Using Settings for Using Modules | Movie Player Module - Volume 1/1 Day Ago |
| | Movie Player Module - Increase Brightness/1 Day Ago |

If a speech-recognized command is 'show me [Movie],' the module selecting and instructing unit 1432 may select a movie player module capable of playing back the [Movie] as a module to perform a corresponding task. The module selecting and instructing unit 1432 may determine a plurality of modules to perform a command, other than the movie player module, based on information regarding a history of using settings for using modules from among situation information.

In detail, the module selecting and instructing unit 1432 may select a volume adjusting is module and an, illumination adjusting module for adjusting volume and illumination based on the information regarding the history of using settings for using modules. Next, the module selecting and instructing unit 1432 may transmit requests for adjusting volume and illumination to a module selected based on the information regarding the history of using settings for using modules.

Figure 16:
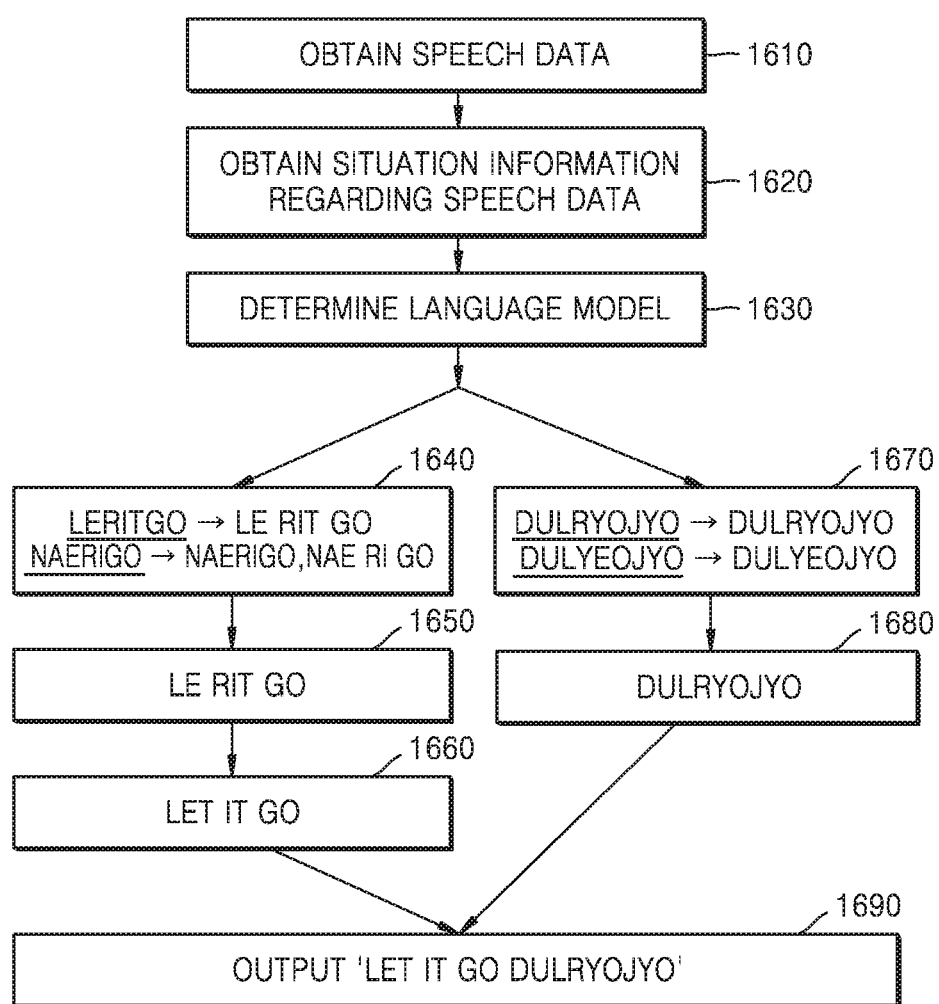
FIG. 16 is a flowchart showing an example of methods of performing speech recognition according to an embodiment.

FIG. 16 is a flowchart showing an example of methods of performing speech recognition according to an embodiment.

Referring to FIG. 16, in an operation 1610, the speech recognition device 1430 may obtain speech data to perform speech recognition.

In an operation 1620, the speech recognition device 1430 may obtain situation information regarding the speech data. If an application A for music playback is being executed on the user device 1450 at which the speech data is obtained, the situation information may include situation information indicating that the application A is being executed.

In an operation 1630, the speech recognition device 1430 may determine at least one language model based on the situation information obtained in the operation 1620.

In operations 1640 and 1670, the speech recognition device 1430 may obtain phoneme sequences corresponding to the speech data. Phoneme sequences corresponding to speech data including a speech 'Let it go' may include phoneme sequences 'leritgo' and 'naerigo.' Furthermore, phoneme sequences corresponding to speech data including a speech 'dulryojyo' may include phoneme sequences 'dulryojyo' and 'dulyeojyo.'

If a word corresponding to a pronunciation dictionary exists in the obtained phoneme sequences, the speech recognition device 1430 may convert the phoneme sequences to words. Furthermore, a phoneme sequence without a word corresponding to the pronunciation dictionary may be divided into predetermined unit components.

From among the phoneme sequences, since a word corresponding the phoneme sequence 'leritgo' does not exist in the pronunciation dictionary, the phoneme sequence 'leritgo' may be divided into predetermined unit components. Furthermore, regarding the phoneme sequence 'naerigo' from among the phoneme sequences, a correspond word 'naerigo' in the pronunciation dictionary and predetermined unit components 'nae ri go' may be obtained.

Since words corresponding to the phoneme sequences 'dulryojyo' and 'dulyeojyo' exist in the pronunciation dictionary, the phoneme sequences 'dulryojyo' and 'dulyeojyo' may be obtained.

In an operation 1650, the speech recognition device 1430 may determine 'le rit go' from among 'le rit go,' 'naerigo,' and 'nae ri go' based on appearance probability information. Furthermore, in an operation 1680, the speech recognition device 1430 may determine "dulryojyo' from between 'dulryojyo' and 'dulyeojyo' based on appearance probability information.

From among the phoneme sequences, there are two appearance probability information regarding the phoneme sequence 'naerigo,' and thus an appearance probability regarding the phoneme sequence 'naerigo' may be determined by combining language models as described above.

In an operation 1660, the speech recognition device 1430 may restore 'le rit go' to the original word 'Let it go' based on segment information. Since 'dulryojyo' is not a divided word and segment information does not include information regarding 'dulryojyo,' an operation like the operation 1660 may not be performed thereon.

In an operation 1690, the speech recognition device 1430 may output 'Let it go dulryojyo' as a final result of speech recognition.

Figure 17:
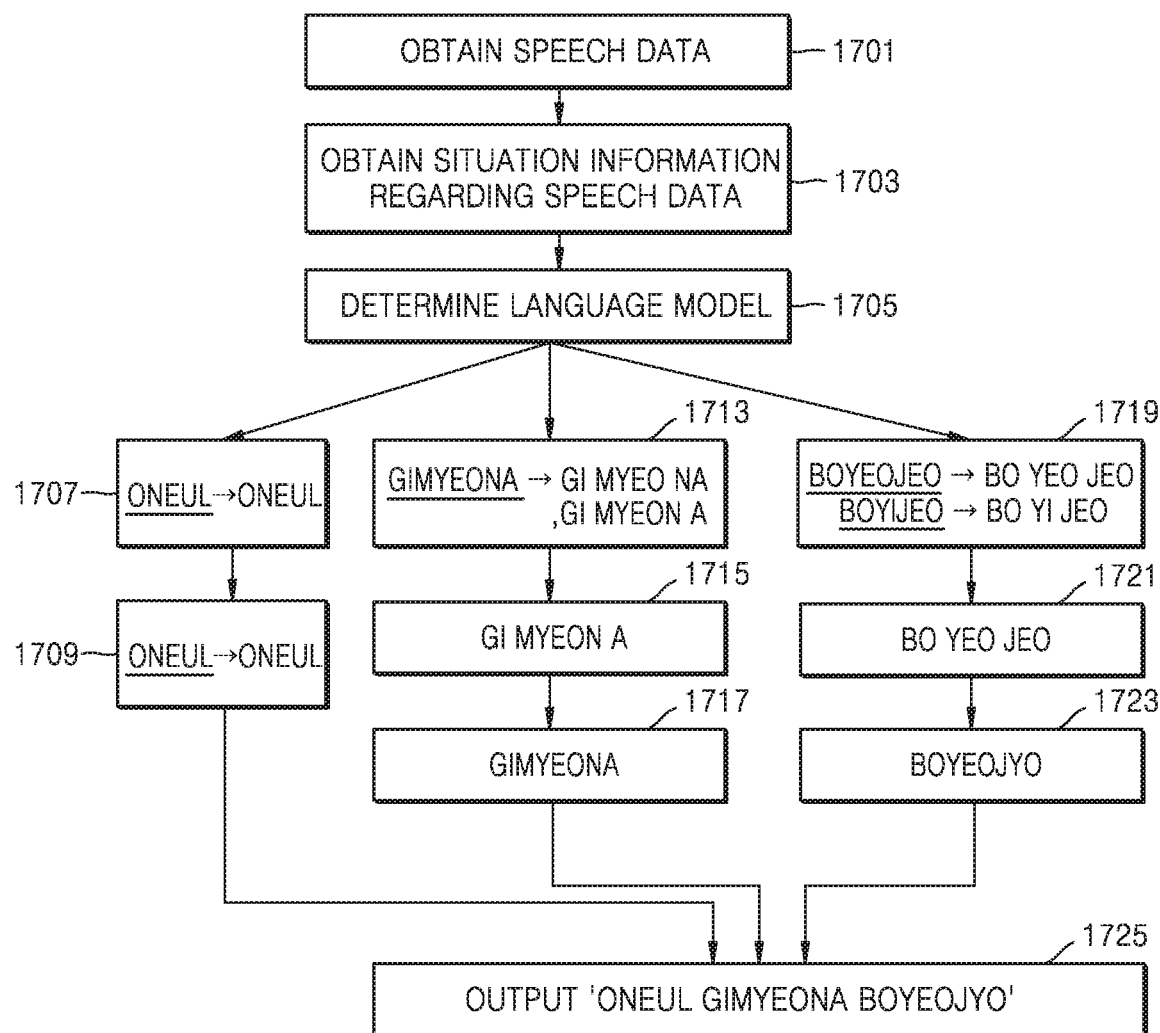
FIG. 17 is a flowchart showing an example of methods of performing speech recognition according to an embodiment.

FIG. 17 is a flowchart showing an example of methods of performing speech recognition according to an embodiment.

Referring to FIG. 17, in an operation 1710, the speech recognition device 1430 may obtain speech data to perform speech recognition.

In an operation 1703, the speech recognition device 1430 may obtain situation information regarding the speech data. In an operation 1730, the speech recognition device 1430 may determine at least one language model based on the situation information obtained in the operation 1720.

In operations 1707, 1713, and 1719, the speech recognition device 1430 may obtain phoneme sequences corresponding to the speech data. Phoneme sequences corresponding to speech data including speeches 'oneul' and 'gim yeon a' may include 'oneul' and 'gi myeo na,' respectively. Furthermore, phoneme sequences corresponding to speech data including a speech 'toyeojyo' may include 'boyeojeo' and 'toyeojyo.' However, not limited to the above-stated phoneme sequences, phoneme sequences different from the examples may be obtained according to speech data.

In an operation 1707, the speech recognition device 1430 may obtain a word 'oneul' corresponding to the phoneme sequence 'oneul' by using a pronunciation dictionary. In an operation 1713, the speech recognition device 1430 may obtain a word 'gim yeon a' corresponding to the phoneme sequence 'gi myeo na' by using the pronunciation dictionary.

Furthermore, in operations 1713 and 1719, the speech recognition device 1430 may divide 'gimyeona,' 'boyeojyo,' and 'boyeojeo' into designated unit components and obtain 'gi myeo na,' 'bo yeo jyo,' and 'bo yeo jeo,' respectively.

In operations 1709, 1715, and 1721, the speech recognition device 1430 may determine 'oneul,' 'gi myeo na,' and 'bo yeo jeo' based on appearance probability information. From among the phoneme sequences, two appearance probability information may exist in relation to 'gi myeo na,' and thus an appearance probability regarding 'gi myeo na' may be determined by combining language models as described above.

In operations 1717 and 1723, the speech recognition device 1430 may restore original words 'gimyeona' and 'boyeojyo' based on segment information. Since 'oneul' is not a word divided into predetermined unit components and segment information does not include 'oneul,' a restoration operation may not be performed.

In an operation 1725, the speech recognition device 1430 may output 'oneul gimyeona boyeojyo' as a final result of speech recognition.

Figure 18:
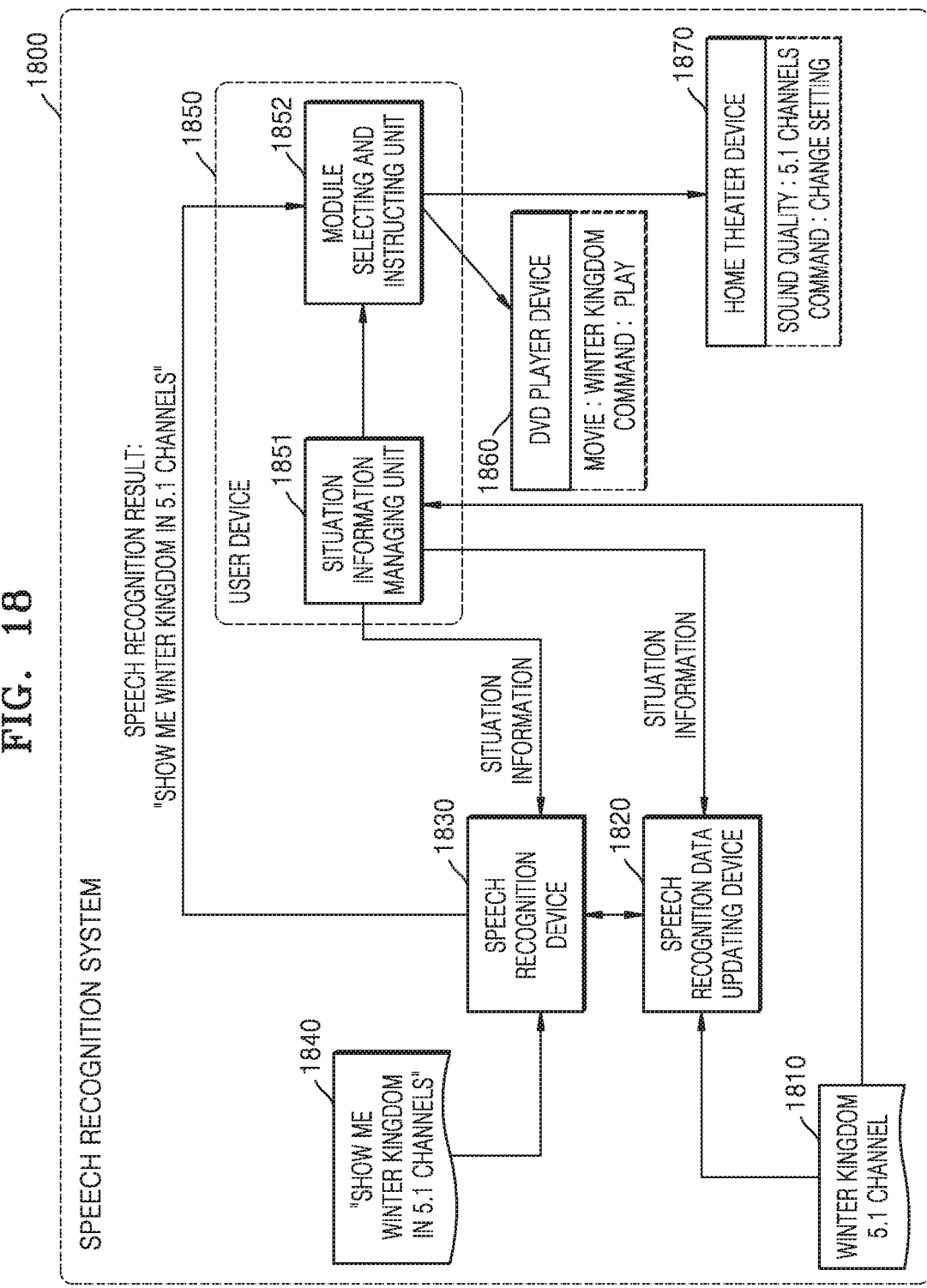
FIG. 18 is a block diagram showing a speech recognition system that executes a plurality of modules according to a result of speech recognition performed based on situation information, according to an embodiment.

FIG. 18 is a block diagram showing a speech recognition system that executes a plurality of modules according to a result of speech recognition performed based on situation information, according to an embodiment.

Referring to FIG. 18, the speech recognition system 1800 may include a speech recognition data updating device 1820, a speech recognition device 1830, a user device 1850, and external device 1860 and 1870. The speech recognition data updating device 1820, the speech recognition device 1830, and the user device 1850 may be embodied as independent devices as shown in FIG. 18. However, the present invention is not limited thereto, and the speech recognition data updating device 1820, the speech recognition device 1830, and the user device 1850 may be embedded in a single device as components of the device. The speech recognition data updating device 1820 and the speech recognition device 1830 of FIG. 18 may correspond to the speech recognition data updating devices 220 and 420 and the speech recognition devices 230 and 430 described above with reference to FIGS. 1 through 17, where repeated descriptions thereof will be omitted below.

First, a method of updating speech recognition data in consideration of situation information by using the speech recognition system 1800 shown in FIG. 18 will be described.

The speech recognition data updating device 1820 may obtain language data 1810 for updating speech recognition data. Furthermore, a situation information managing unit 1851 of the user device 1850 may obtain information regarding corresponding to the language data 1810 and transmit the obtained situation information to the speech recognition data updating device 1820. The speech recognition data updating device 1820 may determine a language model to add new words included in the language data 1810 based on the situation information received from the situation information managing unit 1851.

The speech recognition data updating device 1820 may detect new words 'winter kingdom' and '5.1 channels' included in the language data 1810. Situation information regarding the word 'winter kingdom' may include information regarding related to a digital versatile disc (DVD) player device 1860 for movie playback. Furthermore, situation information regarding the word '5.1 channels' may include information regarding a home theatre device 1870 for audio output.

The speech recognition data updating device 1820 may add appearance probability information regarding 'winter kingdom' and '5.1 channels' to at least one or more language models respectively corresponding to the DVD player device 1860 and the home theatre device 1870.

Second, a method that the speech recognition system 1800 shown in FIG. 18 performs speech recognition and each device performs a task based on a result of the speech recognition will be described.

The user device 1850 may include various types of terminals that may be used by a user.

The user device 1850 according to an embodiment may collect at least one of speech data 1840 and situation information regarding the user device 1850. Next, the user device 1850 may request at least one device to perform a task determined according to a speech-recognized language based on situation information.

The user device 1850 may include the situation information managing unit 1851 and a module selecting and instructing unit 1852.

The situation information managing unit 1851 may collect situation information for selecting a language model for speech recognition performed by the speech recognition device 1830 and transmit the situation information to the speech recognition device 1830.

The speech recognition device 1830 may select at least one language model to be used for speech recognition based on situation information. If situation information includes information indicating that the DVD player device 1860 and the home theatre device 1870 are available to be used, the speech recognition device 1830, the speech recognition device 1830 may select language model corresponding to the DVD player device 1860 and the home theatre device 1870. Alternatively, if a voice signal includes a module identifier, the speech recognition device 1830 may select a language model corresponding to the module identifier and perform speech recognition. A module identifier may include information for identifying not only a module, but also a module group or a module type.

The module selecting and instructing unit 1852 may determine at least one device to transmit a command thereto based on a result of speech recognition performed by the speech recognition device 1830 and transmit a command to the determined device.

If a result of speech recognition includes information for identifying a device, the module selecting and instructing unit 1852 may transmit a command to a device corresponding to the identification information.

If a result of speech recognition does not include information for identifying a device, the module selecting and instructing unit 1852 may obtain at least one of a keyword for a command included in the result of the speech recognition and situation information. The module selecting and instructing unit 1852 may determine at least one device for transmit a command thereto based on at least one of the keyword for a command and the situation information.

Referring to FIG. 18, the module selecting and instructing unit 1852 may receive 'show me winter kingdom in 5.1 channels' as a result of speech recognition from the speech recognition device 1830. Since the result of the speech recognition does not include a device identifier or an application identifier, the DVD player device 1860 and the home theatre device 1870 to transmit a command thereto may be determined based on situation information or a keyword for a command.

In detail, the module selecting and instructing unit 1852 may determine a plurality of devices capable of output sound in 5.1 channels and capable of output moving pictures from among currently available devices. The module selecting and instructing unit 1852 may finally determine a device for performing a command from among the plurality of determined devices based on situation information, such as a history of usages of the respective devices.

Situation information that may be obtained by the situation information managing unit 1851 may be configured as shown below in Table 4.

TABLE 4

| Situation Information | |
| --- | --- |
| Currently Used Module | TV Broadcasting Module |
| History of Simultaneous Module Usage | TV Broadcasting Module - Home Theater Device/20 Minutes Ago<br>DVD Player Device - Home Theater Device/1 Day Ago |
| History of Voice Command | Home Theater Play [Singer 1] Song/10 Minutes Ago<br>DVD Player Play [Movie 1]/1 Day Ago |
| Application having Language | TV Broadcasting Module<br>DVD Player Device<br>Movie Player Module 1<br>Home Theater Device |

Next, the module selecting and instructing unit 1852 may transmit a command to the finally determined device. In detail, based on a result of recognition of a speech 'show me winter kingdom in 5.1 channels,' the module selecting and instructing unit 1852 may transmit a command requesting to play back 'winter kingdom' to the DVD player device 1860. Furthermore, the module selecting and instructing unit 1852 may transmit a command requesting to output sound signal of the 'winter kingdom' in 5.1 channels to the home theatre device 1870.

Therefore, according to an embodiment, based on a single result of speech recognition, commands may be transmitted to a plurality of devices or modules, and the plurality of devices or modules may simultaneously perform tasks. Furthermore, even if a result of speech recognition does not include a module or device identifier, the module selecting and instructing unit 1852 according to an embodiment may determine the most appropriate module or device for performing a task based on a keyword for a command and situation information.

Figure 19:
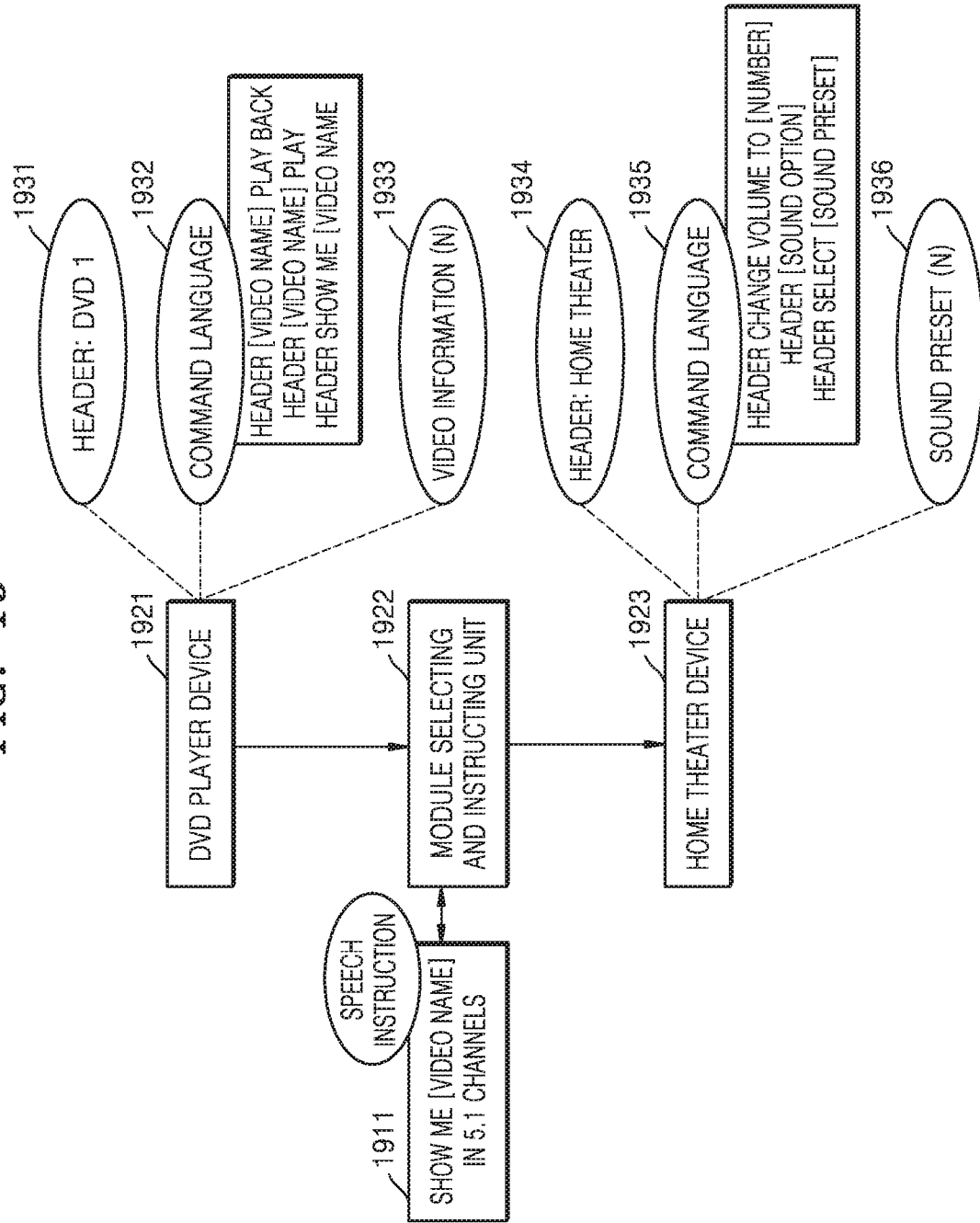
FIG. 19 is a diagram showing an example of a voice command with respect to a plurality of devices, according to an embodiment.

FIG. 19 is a diagram showing an example of a voice command with respect to a plurality of devices, according to an embodiment.

Referring to FIG. 19, based on the module selecting and instructing unit 1922, an example of commands for devices capable of performing tasks according to voice commands are shown. The module selecting and instructing unit 1922 may correspond to a module selecting and instructing unit 1952 of FIG. 17. Furthermore, a DVD player device 1921 and a home theatre device 1923 may correspond to the DVD player device 1860 and the home theatre device 1870 of FIG. 17, respectively.

A speech instruction 1911 is an example of a result of speech recognition that may be output based on a speech recognition according to an embodiment. If the speech instruction 1911 includes name of a video and 5.1 channels, the module selecting and instructing unit 1922 may select the DVD player device 1921 and the home theatre device 1923 capable of playing back the video as devices for transmitting commands thereto.

As shown in FIG. 19, the module selecting and instructing unit 1922 may include headers 1931 and 1934, command languages 1932 and 1935, video information 1933, and a sound preset 1936 in information regarding the DVD player device 1921 and the home theatre device 1923.

The headers 1931 and 1934 may include information for identifying the DVD player device 1921 and the home theatre device 1923, respectively. The headers 1931 and 1934 may include information including types, locations, and names of the respective devices.

The command languages 1932 and 1935 may include examples of commands with respect to the devices 1921 and the 1923. When voices identical to the command languages 1932 and 1935 are received, the respective devices 1921 and the 1923 may perform tasks corresponding to the received commands.

The video information 1933 may include information regarding a video that may be played back by the DVD player device 1921. For example, the video information 1933 may include identification information and detailed information regarding a video file that may be played back by the DVD player device 1921.

The sound preset 1936 may include information about available settings regarding sound output of the home theatre device 1923. If the home theatre device 1923 may be set to 7.1 channels, 5.1 channels, and 2.1 channels, the sound preset 1936 may include 7.1 channels, 5.1 channels, and 2.1 channels as information regarding available settings regarding channels of the home theatre device 1923. Other than channels, the sound preset 1936 may include an equalizer setting, a volume setting, etc., and may further include information regarding various available settings with respect to the home theatre device 1923 based on user settings.

The module selecting and instructing unit 1922 may transmit information 1931 through 1936 regarding the DVD player device 1921 and the home theatre device 1923 to the speech recognition data updating device 1820. The speech recognition data updating device 1820 may update second language models corresponding to the respective devices 1921 and 1923 based on the received information 1931 through 1936.

The speech recognition data updating device 1820 may update language models corresponding to the respective devices 1921 and 1923 by using words included in sentences of the command languages 1932 and 1935, the video information 1933, or the sound preset 1936. For example, the speech recognition data updating device 1820 may include words included in the video information 1933 or the sound preset 1936 in the sentences of the command languages 1932 and 1935 and obtain appearance probability information regarding the same.

Figure 20:
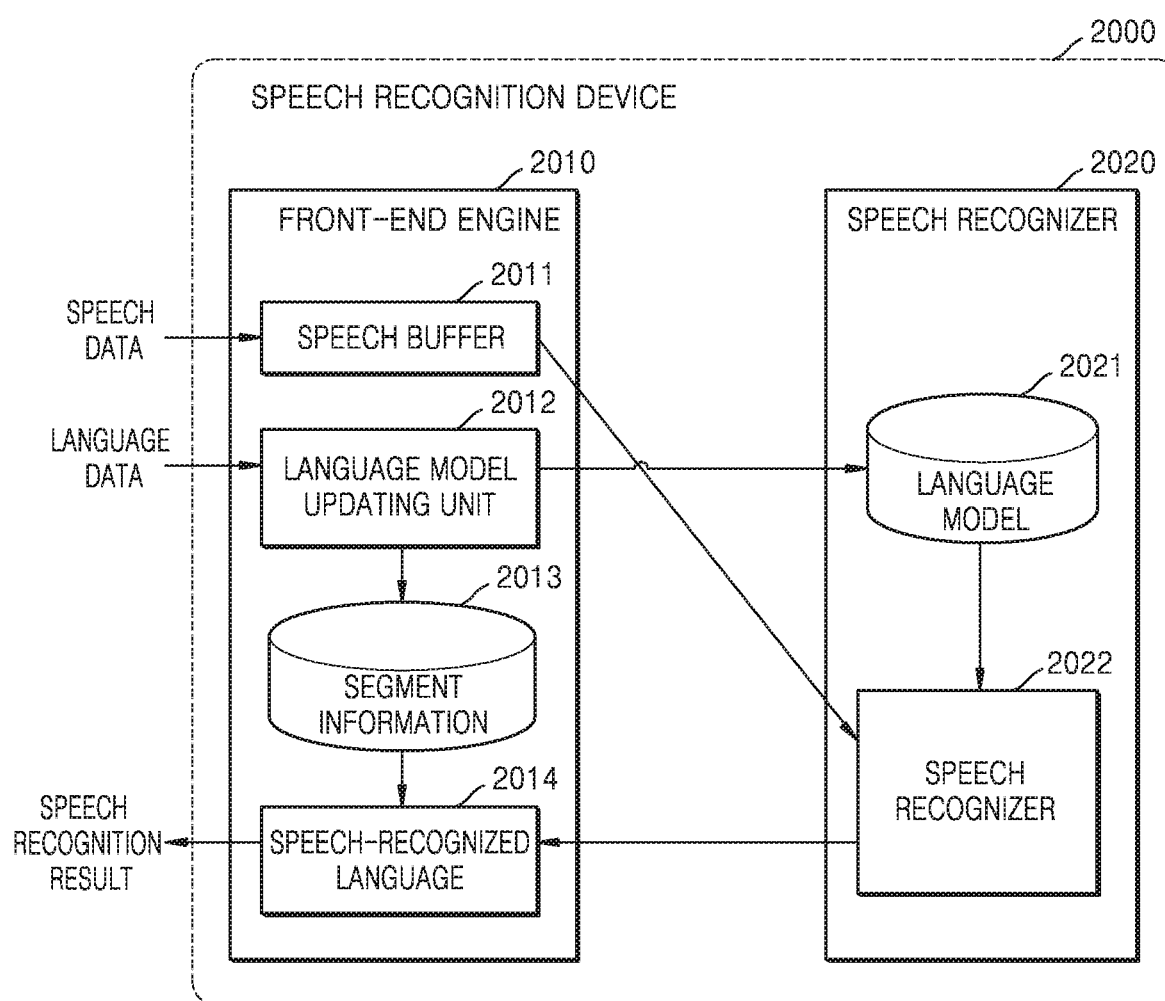
FIG. 20 is a block diagram showing an example of speech recognition devices according to an embodiment.

FIG. 20 is a block diagram showing an example of speech recognition devices according to an embodiment.

Referring to FIG. 20, a speech recognition device 2000 may include a front-end engine 2010 and a speech recognition engine 2020.

The front-end engine 2010 may receive speech data or language data from the speech recognition device 2000 and output a result of speech recognition regarding the speech data. Furthermore, the front-end engine 2010 may perform a pre-processing with respect to the received speech data or language data and transmit the pre-processed speech data or language data to the speech recognition engine 2020.

The front-end engine 2010 may correspond to the speech recognition data updating devices 220 and 420 described above with reference to FIGS. 1 through 17. The speech recognition engine 2020 may correspond to the speech recognition devices 230 and 430 described above with reference to FIGS. 1 through 18.

Since updating speech recognition data and speech recognition may be respectively performed by independent engines, speech recognition and updating speech recognition may be simultaneously performed in the speech recognition device 2000.

The front-end engine 2010 may include a speech buffer 2011 for receiving speech data and transmitting the speech data to a speech recognizer 2022 and a language model updating unit 2012 for updating the speech recognition. Furthermore, the front-end engine 2010 may include segment information 2013 including information for restoring speech-recognized subwords to a word, according to an embodiment. The front-end engine 2010 may restore subwords speech-recognized by the speech recognizer 2022 to words by using the segment information 2013 and output a speech-recognized language 2014 including the restored words as a result of speech recognition.

The speech recognition engine 2020 may include a language model 2021 updated by the language model updating unit 2012. Furthermore, the speech recognition engine 2020 may include the speech recognizer 2022 capable of performing speech recognition based on the speech data and the language model 2021 received from the speech buffer 2011.

When speech data is input as recording is performed, the speech recognition device 2000 may collect language data including new words at the same time. Next, as speech data including a recorded speech is stored in the speech buffer 2011, the language model updating unit 2012 may update a second language model of the language model 2021 by using the new words. When the second language model is updated, the speech recognizer 2022 may receive the speech data stored in the speech buffer 2011 and perform speech recognition. A speech-recognized language may be transmitted to the front-end engine 2010 and restored based on the segment information 2013. The front-end engine 2010 may output a result of speech recognition including restored words.

Figure 21:
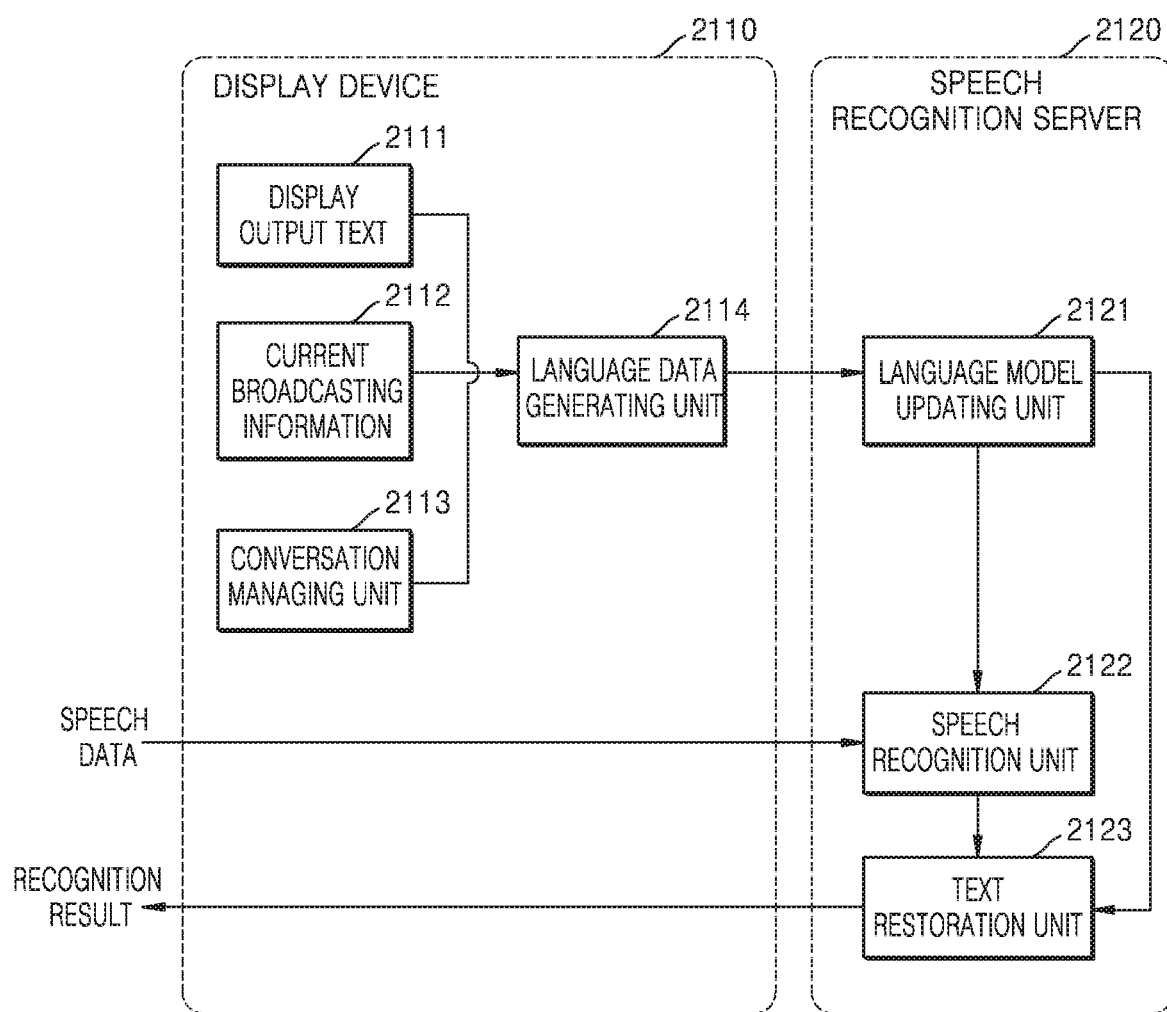
FIG. 21 is a block diagram showing an example of performing speech recognition at a display device, according to an embodiment.

FIG. 21 is a block diagram showing an example of performing speech recognition at a display device, according to an embodiment.

Referring to FIG. 21, a display device 2110 may receive speech data from a user, transmit the speech data to a speech recognition server 2120, receive a result of speech recognition from the speech recognition server 2120, and output the result of speech recognition. The display device 2110 may perform a task based on the result of speech recognition.

The display device 2110 may include a language data generating unit 2114 for generating language data for updating speech recognition data at the speech recognition server 2120. The language data generating unit 2114 may generate language data from information currently displayed on the display device 2110 or content information related to the information currently displayed on the display device 2110 and transmit the language data to the speech recognition server 2120. For example, the language data generating unit 2114 may generate language data from a text 2111 and a current broadcasting information 2112 included in content that is currently displayed, is previously displayed, or will be displayed. Furthermore, the language data generating unit 2114 may receive information regarding a conversation displayed on the display device 2110 from a conversation managing unit 2113 and generate language data by using the received information. Information that may be received from the conversation managing unit 2113 may include texts included in a social network service (SNS), texts included in a short message service (SMS), texts included in a multimedia message service (MMS), and information regarding a conversation between the display device 2110 and a user.

A language model updating unit 2121 may update a language model by using language data received from the language data generating unit 2114 of the display device 2110. Next, a speech recognition unit 2122 may perform speech recognition based on the updated language model. If a speech-recognized language includes subwords, a text restoration unit 2123 may perform text restoration based on segment information according to an embodiment. The speech recognition server 2120 may transmit a text-restored and speech-recognized language to the display device 2110, and the display device 2110 may output the speech-recognized language.

In the case of updating speech recognition data by dividing a new word into predetermined unit components according to an embodiment, the display device 2110 may update the speech recognition in a couple of ms. Therefore, the speech recognition server 2120 may immediately add a new word in a text displayed on the display device 2110 to a language model.

A user may not only speak a set command, but also speak name of a broadcasting program that is currently being broadcasted or a text displayed on the display device 2110. Therefore, the speech recognition server 2120 according to an embodiment may receive a text displayed on the display device 2110 or information regarding contents displayed on the display device 2110, which are likely to be spoken. Next, the speech recognition server 2120 may update speech recognition data based on the received information. Since the speech recognition server 2120 is capable of updating a language model in from a couple of ms to a couple of seconds, a new word that is likely to be spoken may be processed to be recognized as soon as the new word is obtained.

Figure 22:
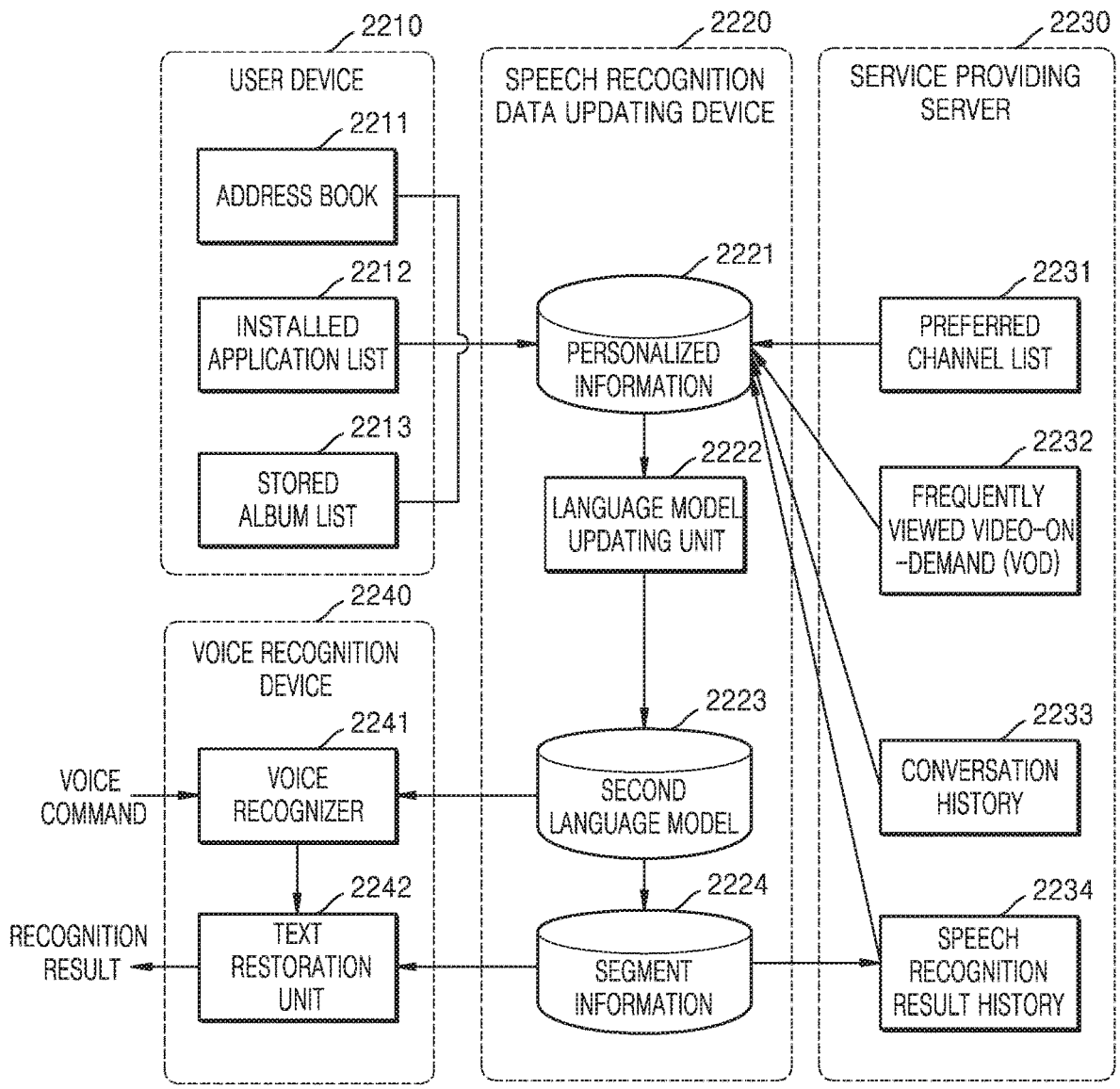
FIG. 22 is a block diagram showing an example of updating a language model in consideration of situation information, according to an embodiment.

FIG. 22 is a block diagram showing an example of updating a language model in consideration of situation information, according to an embodiment.

A speech recognition data updating device 2220 and a speech recognition device 2240 of FIG. 22 may correspond to the speech recognition data updating devices 220 and 420 and the speech recognition devices 230 and 430 shown in FIGS. 2 through 17, respectively.

Referring to FIG. 22, the speech recognition data updating device 2220 may obtain personalized information 2221 from a user device 2210 or a service providing server 2230.

The speech recognition data updating device 2220 may include information regarding a user from the user device 2210, the information including an address book 2211, an installed application list 2212, and a stored album list 2213. However, the present invention is not limited thereto, and the speech recognition data updating device 2220 may receive various information regarding the user device 2210 from the user device 2210.

Since individual users have different articulation patterns from one another, the speech recognition data updating device 2220 may periodically receive information for performing speech recognition for each of the users and store the information in the personalized information 2221. Furthermore, a language model updating unit 2222 of the speech recognition data updating device 2220 may update language models based on the personalized information 2221 of the respective users. Furthermore, the speech recognition data updating device 2220 may collect information regarding service usages collected in relation to the respective users from the service providing server 2230 and store the information in the personalized information 2221.

The service providing server 2230 may include a preferred channel list 2231, a frequently viewed video-on-demand (VOD) 2232, a conversation history 2233, and a speech recognition result history 2234 for each user. In other words, the service providing server 2230 may store information regarding services provided to the user device 2210, e.g., a broadcasting program providing service, a VOD service, a SNS service, a speech recognition service, etc. The collectable information is merely an example and is not limited thereto. The service providing server 2230 may collect various information regarding each of users and transmit the collected information to the speech recognition data updating device 2220. The speech recognition result history 2234 may include information regarding results of speech recognition performed by the speech recognition device 2240 with respect to the respective users.

In detail, the language model updating unit 2222 may determine a second language model 2223 corresponding to each user. In the speech recognition data updating device 2220, at least one second language model 2223 corresponding to each user may exist. If there is no second language model 2223 corresponding to a user, the language model updating unit 2222 may newly generate a second language model 2223 corresponding to the user. Next, the language model updating unit 2222 may update language models corresponding to the respective users based on the personalized information 2221. In detail, the language model updating unit 2222 may detect new words from the personalized information 2221 and update the second language models 2223 corresponding to the respective users by using the detected new words.

A voice recognizer 2241 of the speech recognition device 2240 may perform speech recognition by using the second language models 2223 established with respect to the respective users. When speech data including a voice command is received, the voice recognizer 2241 may perform speech recognition by using the second language model 2223 corresponding to a user who is issuing voice commands.

Figure 23:
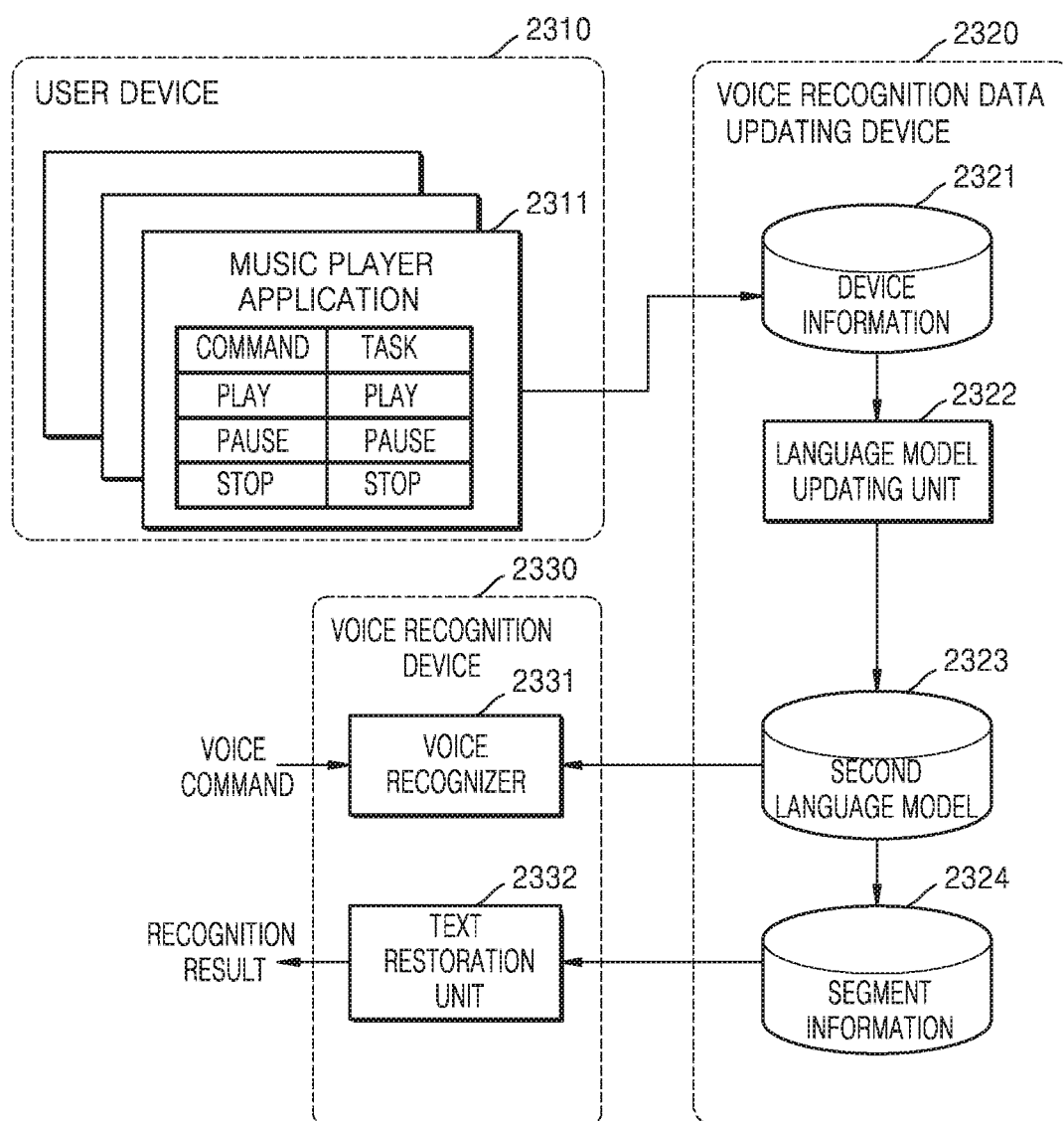
FIG. 23 is a block diagram showing an example of a speech recognition system including language models corresponding to respective applications, according to an embodiment.

FIG. 23 is a block diagram showing an example of a speech recognition system including language models corresponding to respective applications, according to an embodiment.

Referring to FIG. 23, a second language model 2323 of a voice recognition data updating device 2320 may be updated or generated based on device information 2321 regarding at least one application installed on a user device 2310. Therefore, each of applications installed in the user device 2310 may not perform speech recognition by itself, and speech recognition may be performed on a separate platform for speech recognition. Next, based on a result of performing speech recognition on the platform for speech recognition, a task may be requested to at least one application.

The user device 2310 may include various types of terminal devices that may be used by a user, where at least one application may be installed thereon. An application 2311 installed on the user device 2310 may include information regarding tasks that may be performed according to commands, For example, the application 2311 may include 'Play,' 'Pause,' and 'Stop' as information regarding tasks corresponding to commands 'Play,' 'Pause,' and 'Stop.' Furthermore, the application 2311 may include information regarding texts that may be included in commands. The user device 2310 may transmit at least one of information regarding tasks of the application 2311 that may be performed based on commands and information regarding texts that may be included in commands to the voice recognition data updating device 2320. The voice recognition data updating device 2320 may perform speech recognition based on the information received from the user device 2310.

The voice recognition data updating device 2320 may include the device information 2321, a language model updating unit 2322, the second language model 2323, and segment information 2324. The voice recognition data updating device 2320 may correspond to the speech recognition data updating devices 220 and 420 shown in FIGS. 2 through 20.

The device information 2321 may include information regarding the application 2311, the information received from the user device 2310. The voice recognition data updating device 2320 may receive at least one of information regarding tasks of the application 2311 that may be performed based on commands and information regarding texts that may be included in commands from the user device 2310. The voice recognition data updating device 2320 may store at least one of the information regarding the application 2311 received from the user device 2310 as the device information 2321. The voice recognition data updating device 2320 may store the device information 2321 for each of the user devices 2310.

The voice recognition data updating device 2320 may receive information regarding the application 2311 from the user device 2310 periodically or when a new event regarding the application 2311 occurs. Alternatively, when the speech recognition device 2330 starts performing speech recognition, the voice recognition data updating device 2320 may request information regarding the application 2311 to the user device 2310. Furthermore, the voice recognition data updating device 2320 may store received information as the device information 2321. Therefore, the voice recognition data updating device 2320 may update a language model based on the latest information regarding the application 2311.

The language model updating unit 2322 may update a language model, which may be used to perform speech recognition, based on the device information 2321. A language model that may be updated based on the device information 2321 may include a second language model corresponding to the user device 2310 from among the at least one second language model 2323. Furthermore, a language model that may be updated based on the device information 2321 may include a second language model corresponding to the application 2311 from among the at least one second language model 2323

The second language model 2323 may include at least one independent language model that may be selectively applied based on situation information. The speech recognition device 2330 may select at least one of the second language models 2323 based on situation information and perform speech recognition by using the selected second language model 2323.

The segment information 2324 may include information regarding predetermined unit components of a new word that may be generated when speech recognition data is updated, according to an embodiment. The voice recognition data updating device 2320 may divide a new word into subwords and update speech recognition data according to an embodiment to add new words to the second language model 2323 in real time. Therefore, when a new word divided into subwords is speech-recognized, a result of speech recognition thereof may include subwords. If speech recognition is performed by the speech recognition device 2330, the segment information 2324 may be used to restore speech-recognized subwords to an original word.

The speech recognition device 2330 may include a speech recognition unit 2331, which performs speech recognition with respect to a received voice command, and a text restoration device 2332, which restores subwords to an original word. The text restoration device 2332 may restore speech-recognized subwords to an original word and output a final result of speech recognition.

Figure 24:
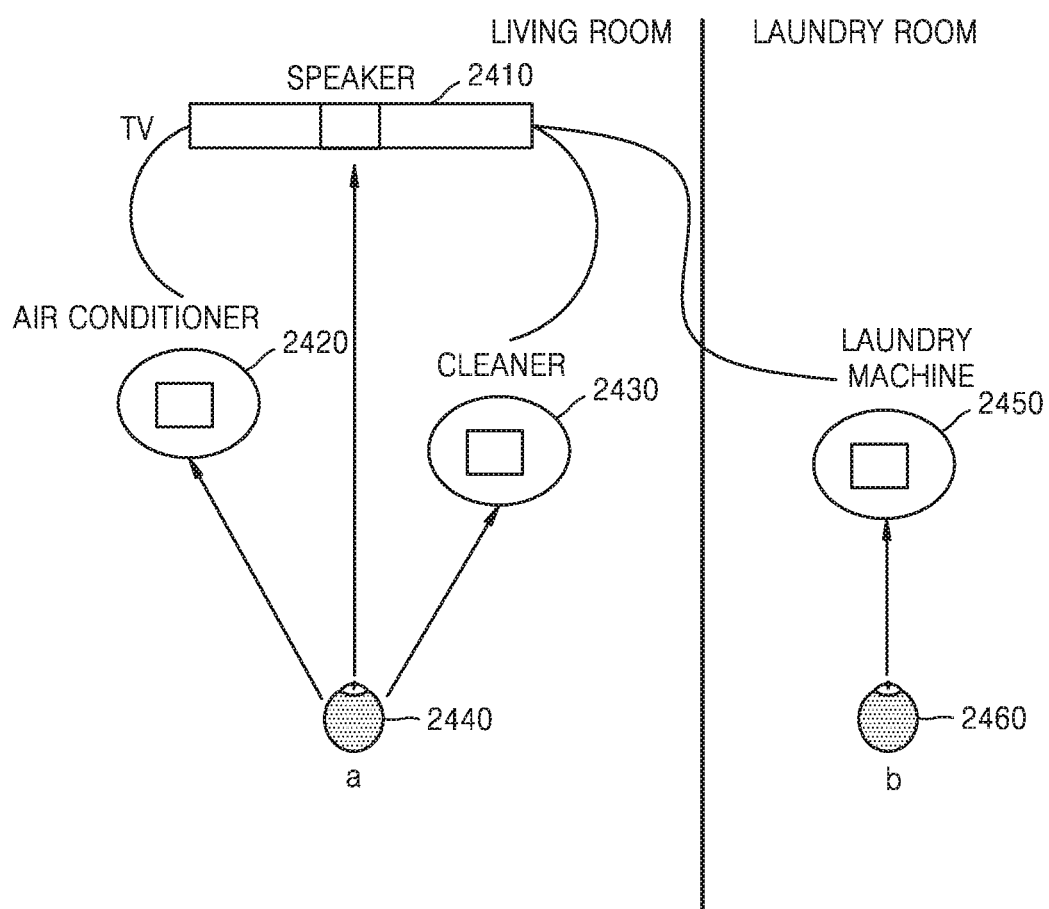
FIG. 24 is a diagram showing an example of a user device transmitting a request to perform a task based on a result of speech recognition, according to an embodiment.

FIG. 24 is a diagram showing an example of a user device transmitting a request to perform a task based on a result of speech recognition, according to an embodiment. A user device 2410 may correspond to the user device 1850, 2210, and 2310 of FIG. 18, 22, or 21.

Referring to FIG. 24, if the user device 2410 is a television (TV), a command based on a result of speech recognition may be transmitted via the user device 2410 to external devices including the user device 2410, that is, an air conditioner 2420, a cleaner 2430, and a laundry machine 2450.

When a user issues a voice command at a location a 2440, speech data may be collected by the air conditioner 2420, the cleaner 2430, and the user device 2410. The user device 2410 may compare speech data collected by the user device 2410 to speech data collected by the air conditioner 2420 and the cleaner 2430 in terms of a signal-to-noise ratio (SNR) or volume. As a result of the comparison, the user device 2410 may select speech data of the highest quality and transmit the selected speech data to a speech recognition device for performing speech recognition. Referring to FIG. 24, since the user is at a location closest to the cleaner 2430, speech data collected by the cleaner 2430 may be speech data of the highest quality.

According to an embodiment, speech data may be collected by using a plurality of devices, and thus high quality speech data may be collected even if a user is far from the user device 2410. Therefore, variation of success rates according to distances between a user and the user device 2410 may be reduced.

Furthermore, even if the user is at a location 2460 in a laundry room far from a living room in which the user device 2410 is located, speech data including a voice command of the user may be collected by the laundry machine 2450. The laundry machine 2450 may transmit the collected speech data to the user device 2410, and the user device 2410 may perform a task based on the received speech data. Therefore, the user may issue voice commands at a high success rate regardless a distance to the user device 2410 using various devices.

Hereinafter, a method of performing speech recognition regarding each user will be described in closer details.

Figure 25:
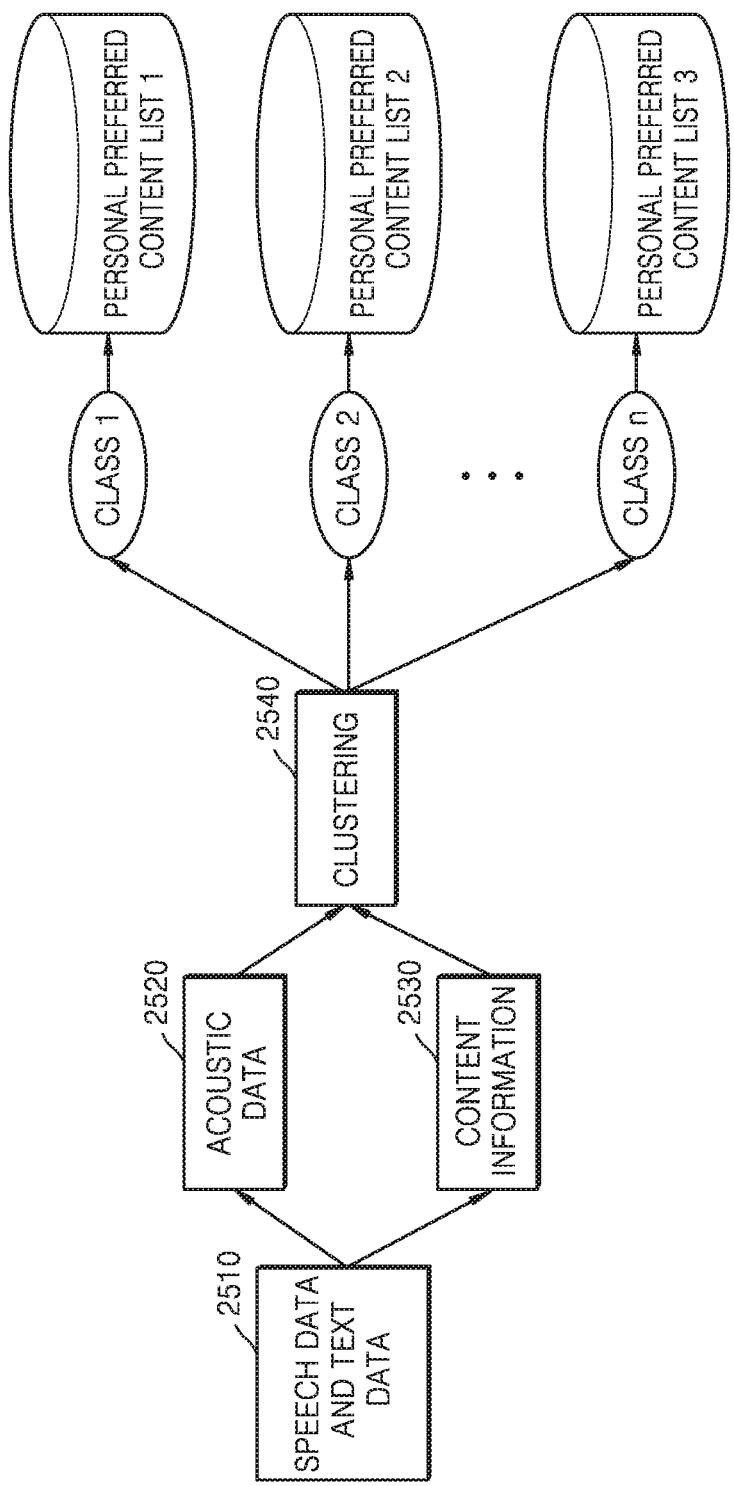
FIG. 25 is a block diagram showing a method of generating an personal preferred content list regarding classes of speech data, according to an embodiment.

FIG. 25 is a block diagram showing a method of generating an personal preferred content list regarding classes of speech data according to an embodiment.

Referring to FIG. 25, the speech recognition device 230 may receive acoustic data 2520 and content information 2530 from speech data and text data 2510. The text data and the acoustic data 2520 may correspond to each other, where the content information 2530 may be obtained from the text data, and the acoustic data 2520 may be obtained from the speech data. The text data may be obtained from a result of performing speech recognition to the speech data.

The acoustic data 2520 may include voice feature information for distinguishing voices of different persons. The speech recognition device 230 may distinguish classes based on the acoustic data 2520 and, if acoustic data 2520 differs with respect to a same user due to difference voice features according to time slots, the acoustic data 2520 may be classified into different classes. The acoustic data 2520 may include feature information regarding speech data, such as an average of pitches indicating how high or low a sound is, a variance, a jitter (change of vibration of vocal cords), a shimmer (regularity of voice waveforms), a duration, an average of Mel frequency cepstral coefficients (MFCC), and a variance.

The content information 2530 may be obtained based on title information included in the text data. The content information 2530 may include a title included in the text data as-is. Furthermore, the content information 2530 may further include words related to a title.

For example, if titles included in the text data are 'weather' and 'professional baseball game result,' 'weather information' related to 'weather', and 'sports news' and 'professional baseball replay' related to 'news' and 'professional baseball game result' may be obtained as the content information 2540.

The speech recognition device 230 may determine a class related to speech data based on the acoustic data 2520 and the content information 2540 obtained from text data, Classes may include acoustic data and personal preferred content lists corresponding to the respective classes. The speech recognition device 230 may determine a class regarding speech data based on acoustic data and a personal preferred content list regarding the corresponding class.

Since no personal preferred content list exists before speech data is initially classified or is initialized, the speech recognition device 230 may classify speech data based on acoustic data. Next, the speech recognition device 230 may extract the content information 2540 from text data corresponding to the respective classified speech data and generate personal preferred content lists corresponding to the respective classes. Next, weights that are applied to personal preferred content lists during classification may be gradually increased by adding the extracted content information 2540 to the personal preferred content lists during later speech recognition.

A method of updating a class may be performed based on Equation 3-4 below.

$$Class_{similarity} = W_a A_v + W_l L_v \quad \text{[Equation 4]}$$

In Equation 4, $A_v$ and $W_a$ respectively denote a class based on acoustic data of speech data and a weight regarding the same, whereas $L_v$ and $W_l$ respectively denote a class based on a personal preferred content list and a weight regarding the same.

Initially, the value of $W_1$ may be 0, and the value of $W_1$ may increase as an personal preferred content list is updated.

Furthermore, the speech recognition device 230 may generate language models corresponding to respective classes based on personal preferred content lists and speech recognition histories of the respective classes. Furthermore, the speech recognition device 230 may generate personalized acoustic models for the respective classes based on speech data corresponding to the respective classes and a global acoustic model by applying a speaker-adaptive algorithm (e.g., a maximum likelihood linear regression (MLLR), a maximum A posterior (MAP), etc.).

During speech recognition, the speech recognition device 230 may identify a class from speech data and determine a language model or an acoustic model corresponding to the identified class. The speech recognition device 230 may perform speech recognition by using the determined language model or acoustic model.

After the speech recognition is performed, the speech recognition data updating device 220 may update a language model and an acoustic model, to which speech-recognized speech data and text data respectively belong, by using a result of the speech recognition.

Figure 26:
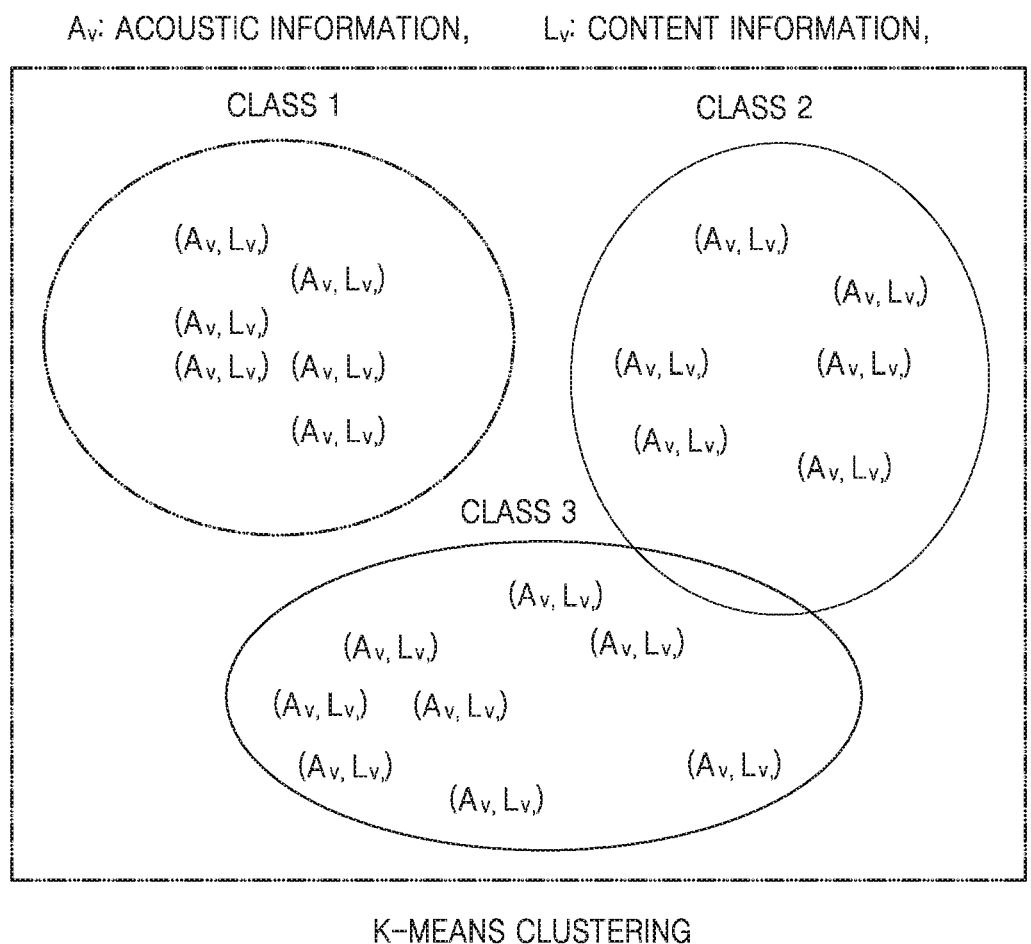
FIG. 26 is a diagram showing an example of determining a class of speech data, according to an embodiment.

FIG. 26 is a diagram showing an example of determining a class of speech data, according to an embodiment.

Referring to FIG. 26, each acoustic data may have feature information including acoustic information and content information. Each acoustic data may be indicated by a graph, in which the x-axis indicates acoustic information and the y-axis indicates content information. Acoustic data may be classified into n classes based on acoustic information and content information by using a K-mean clustering method.

Figure 27:
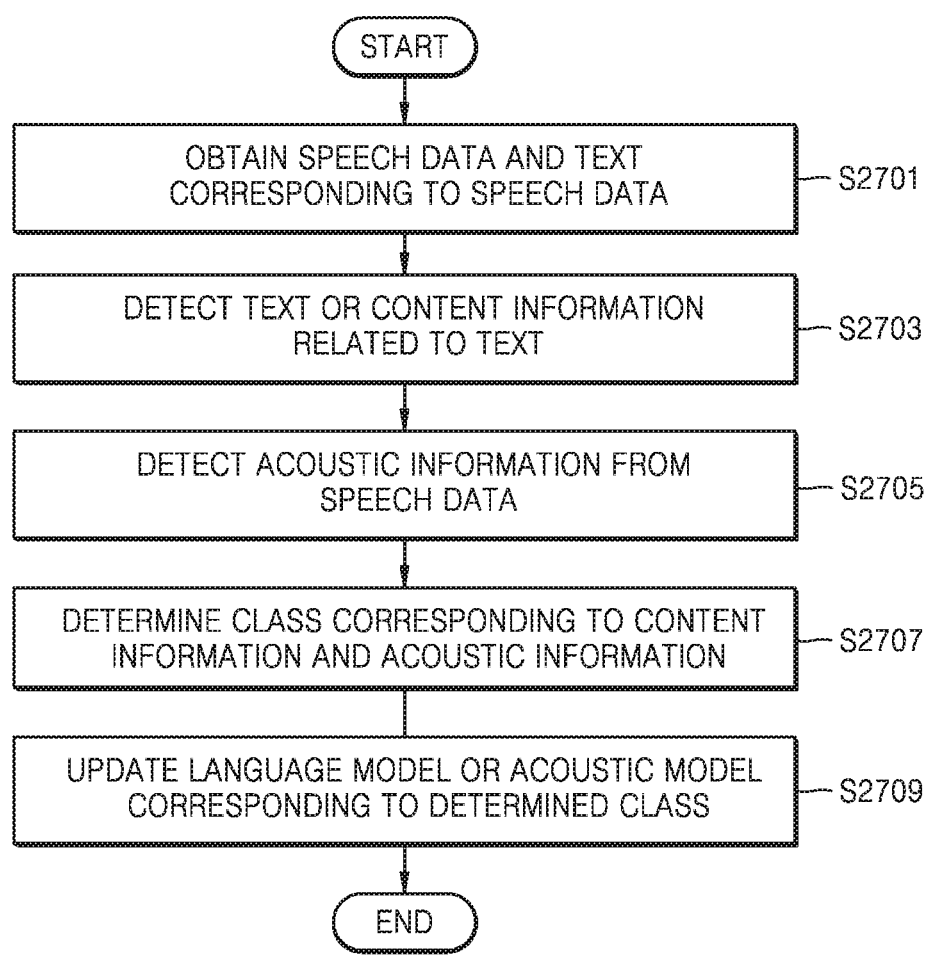
FIG. 27 is a flowchart showing a method of updating speech recognition data according to classes of speech data, according to an embodiment.

FIG. 27 is a flowchart showing a method of updating speech recognition data according to classes of speech data, according to an embodiment.

Referring to FIG. 27, in an operation S2701, the speech recognition data updating device 220 may obtain speech data and a text corresponding to the speech data. The speech recognition data updating device 220 may obtain a text corresponding to the speech data as a result of speech recognition performed by the speech recognition device 230.

In an operation S2703, the speech recognition data updating device 220 may detect the text obtained in the operation S2701 or content information related to the text. For example, content information may further include words related to the text.

In an operation S2705, the speech recognition data updating device 220 may extract acoustic information from the speech data obtained in the operation S2701. The acoustic information that may be extracted in the operation S2705 may include information regarding acoustic features of the speech data and may include the above-stated features information like a pitch, jitter, and shimmer.

In an operation S2707, the speech recognition data updating device 220 may determine a class corresponding to the content information and the acoustic information detected in the operation S2703 and the operation S2705.

In an operation S2709, the speech recognition data updating device 220 may update a language model or an acoustic model corresponding to the class determined in the operation S2707, based on the content information and the acoustic information. The speech recognition data updating device 220 may update a language model by detecting a new word included in the content information. Furthermore, the speech recognition data updating device 220 may update an acoustic model by applying the acoustic information, a global acoustic model, and a speaker-adaptive algorithm.

Figure 28:
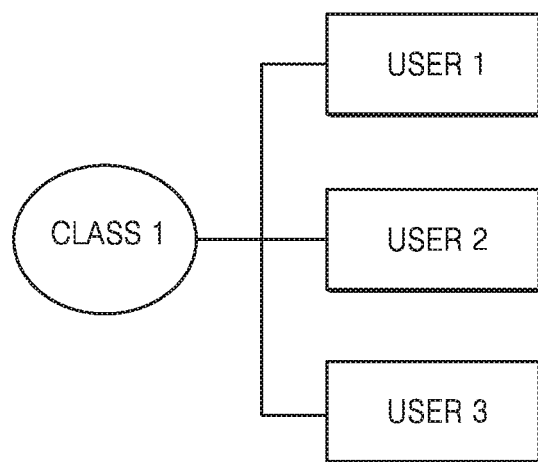
FIGS. 28 and 29 are diagrams showing examples of acoustic data that may be classified according to embodiments.
Figure 29:
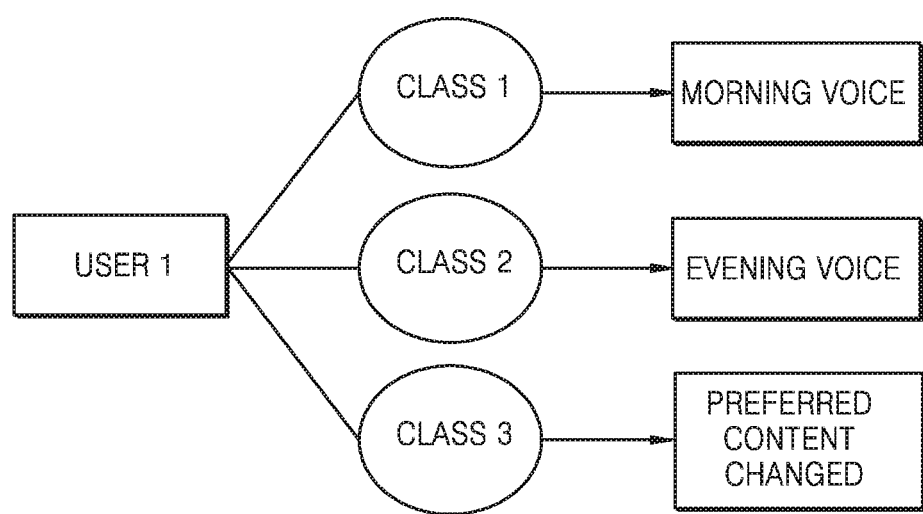

FIGS. 28 and 29 are diagrams showing examples of acoustic data that may be classified according to embodiments.

Referring to FIG. 28, speech data regarding a plurality of users may be classified into a single class. It is not necessary to classify users with similar acoustic characteristics and similar content preferences into different classes, and thus such users may be classified into a single class.

Referring to FIG. 29, speech data regarding a same user may be classified into different classes based on characteristics of the respective speech data. In the case of a user whose voice differs in the morning and in the evening, acoustic information regarding speech data may be detected differently, and thus speech data regarding the voice in the morning and speech data regarding the voice in the evening may be classified into different classes.

Furthermore, if content information of speech data regarding a same user differs, the speech data may be classified into different classes. For example, a same user may use 'baby-related' content for nursing a baby. Therefore, if content information of speech data differs, speech data including voices of a same user may be classified into different classes.

According to an embodiment, the speech recognition device 230 may perform speech recognition by using second language models determined for respective users. Furthermore, in the case where a same device ID is used and users cannot be distinguished with device IDs, users may be classified based on acoustic information and content information of speech data. The speech recognition device 230 may determine an acoustic model or a language model based on the determined class and may perform speech recognition.

Furthermore, if users cannot be distinguished based on acoustic information only due to similarity of voices of the users (e.g., brothers, family members, etc.), the speech recognition device 230 may distinguish classes by further considering content information, thereby performing speaker-adaptive speech recognition.

Figure 30:
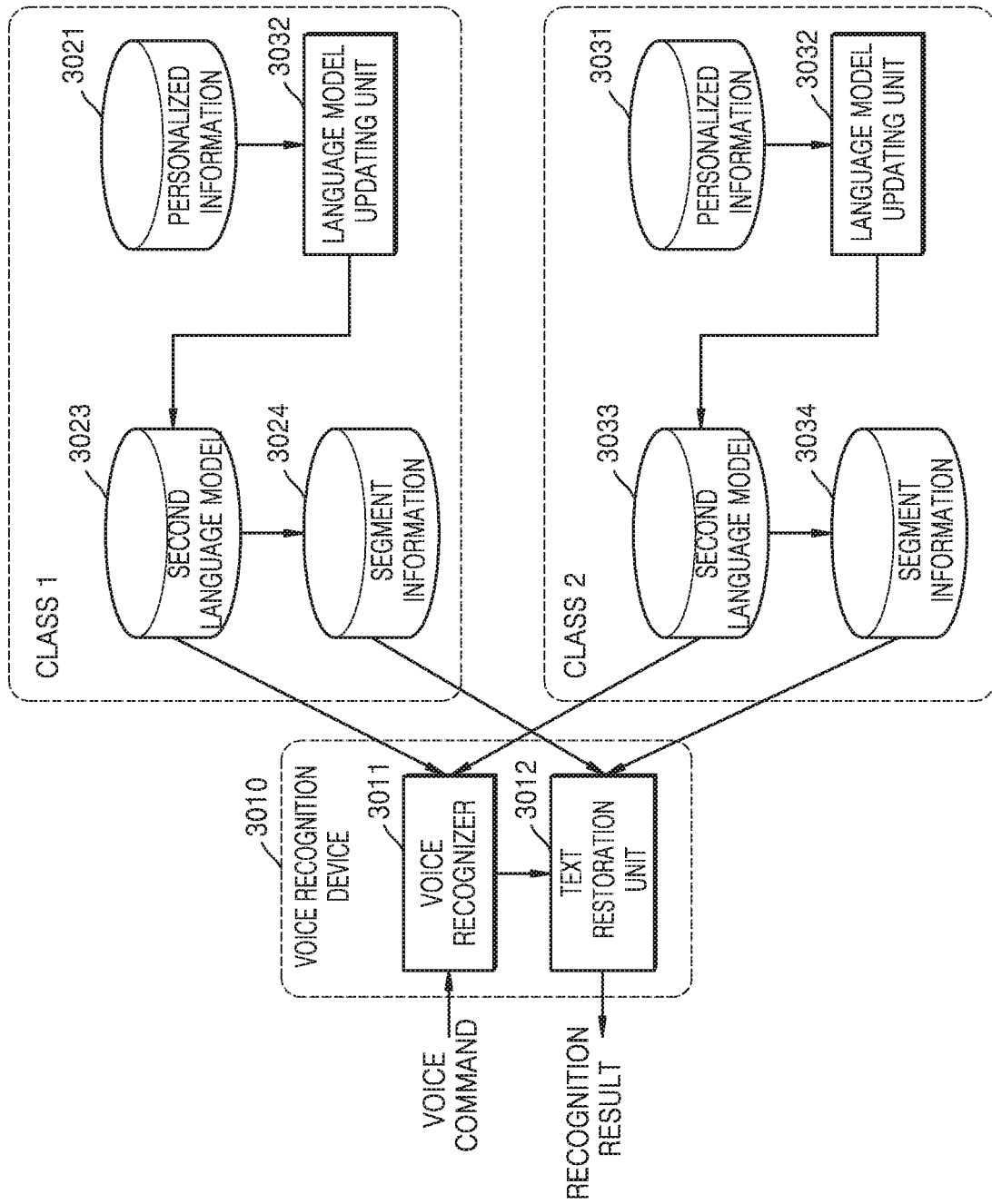
FIGS. 30 and 31 are block diagrams showing an example of performing a personalized speech recognition method according to an embodiment.
Figure 31:
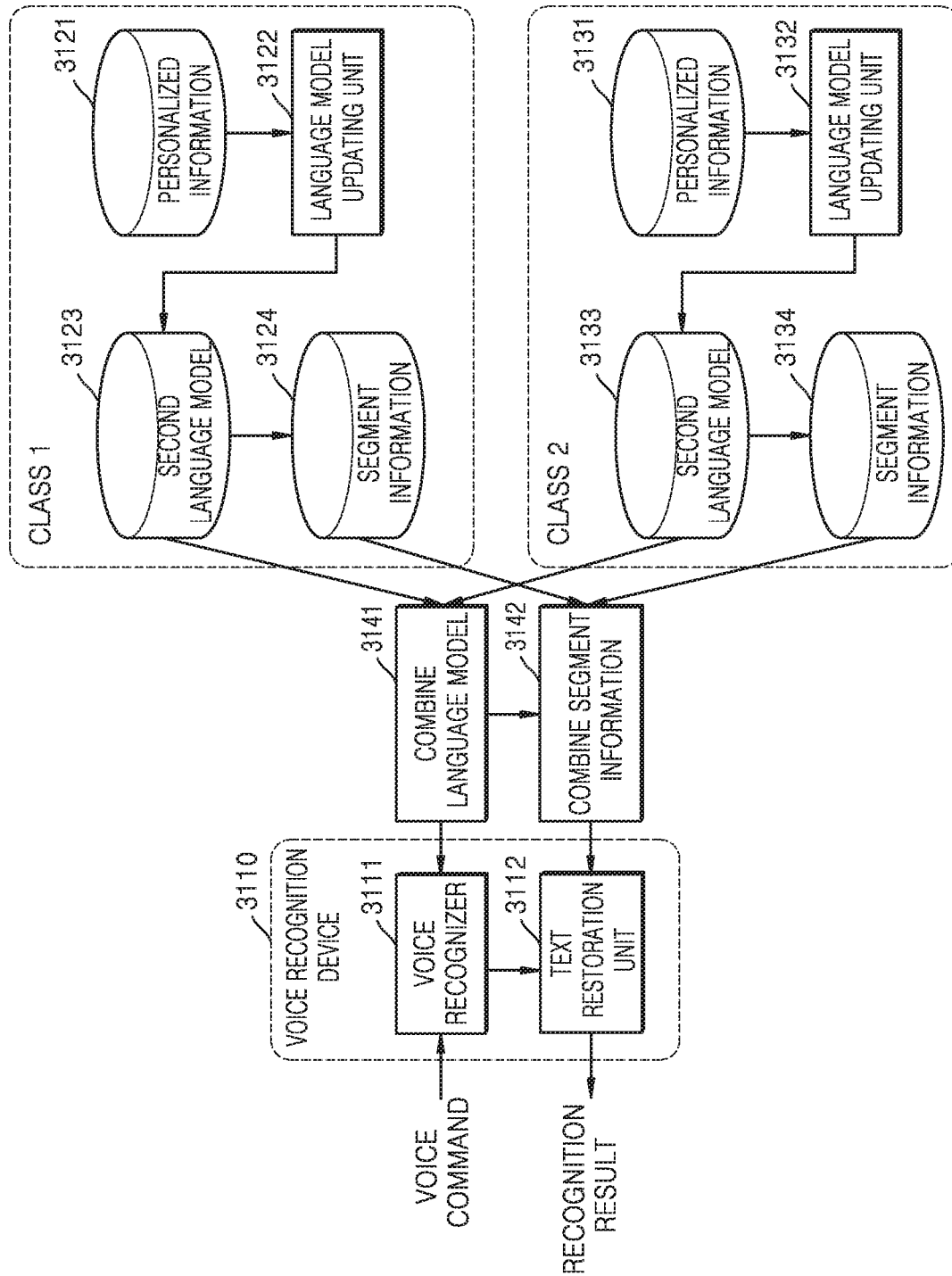

FIGS. 30 and 31 are block diagrams showing an example of performing a personalized speech recognition method according to an embodiment.

Referring to FIGS. 30 and 31, information for performing personalized speech recognition for respective classes may include language model updating units 3022, 3032, 3122, and 3132 that update second language models 3023, 3033, 3123, and 3133 based on the personalized information 3021, 3031, 3121, and 3131 including information regarding individuals, and segment information 3024, 3034, 3124, and 3134 that may be generated when the second language models 3023, 3033, 3123, and 3133 are updated. The information for performing personalized speech recognition for respective classes may be included in a speech recognition device 3010, which performs speech recognition, or the speech recognition data updating device 220.

When a plurality of persons are articulating, the speech recognition device 3010 may interpolate language model for the respective individuals for speech recognition.

Referring to FIG. 30, an interpolating method using a plurality of language models may be the method as described above with reference to Equations 1 through 3. For example, the speech recognition device 3010 may apply higher weight to a language model corresponding to a person holding a microphone. If a plurality of language models are used according to Equation 1, a word commonly included in the language models may have a high probability. According to Equations 2 and 3, words included in the language model for the respective individuals may be simply combined.

Referring to FIG. 30, if sizes of language models for respective individuals are not large, speech recognition may be performed based on a single language model 3141, which is a combination of the language models for a plurality of persons. As language models are combined, an amount of probabilities to be calculated for speech recognition may be reduced. However, in the case of combining language models, it is necessary to generate a combined language model by re-determining respective probabilities. Therefore, if sizes of language models for respective individuals are small, it is efficient to combine the language models. If a group consisting of a plurality of individuals may be set up in advance, the speech recognition device 3010 may obtain a combined language model regarding the group before a time point at which speech recognition is performed.

Figure 32:
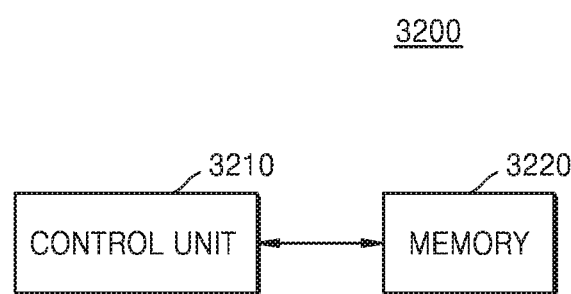
FIG. 32 is a block diagram showing an internal configuration of a speech recognition data updating device according to an embodiment.

FIG. 32 is a block diagram showing the internal configuration of a speech recognition data updating device according to an embodiment. The speech recognition data updating device of FIG. 32 may correspond to the speech recognition data updating device of FIGS. 2 through 23.

The speech recognition data updating device 3200 may include various types of devices that may be used by a user or a server device that may be connected to a user device via a network.

Referring to FIG. 32, the speech recognition data updating device 3200 may include a controller 3210 and a memory 3220.

The controller 3210 may detect new words included in collected language data and update a language model that may be used during speech recognition. In detail, the controller 3210 may convert new words to phoneme sequences, divide each of the phoneme sequences into predetermined unit components, and determine appearance probability information regarding the components of the phoneme sequences. Furthermore, the controller 3210 may update a language model by using the appearance probability information.

The memory 3220 may store the language model updated by the controller 3210.

Figure 33:
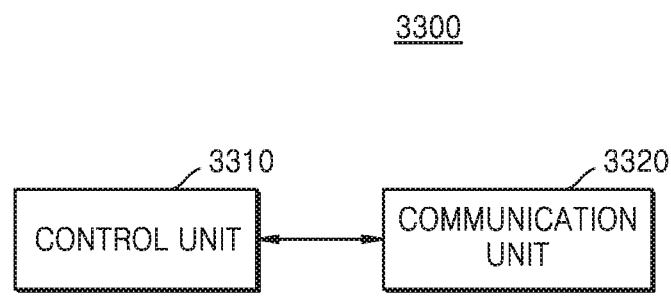
FIG. 33 is a block diagram showing an internal configuration of a speech recognition device according to an embodiment.

FIG. 33 is a block diagram showing the internal configuration of a speech recognition device according to an embodiment. The speech recognition device of FIG. 33 may correspond to the speech recognition device of FIGS. 2 through 31.

The speech recognition device 3300 may include various types of devices that may be used by a user or a server device that may be connected to a user device via a network.

Referring to FIG. 33, the speech recognition device 3300 may include a controller 3310 and a communication unit 3320.

The controller 3310 may perform speech recognition by using speech data. In detail, the controller 3310 may obtain at least one phoneme sequence from speech data and obtain appearance probabilities regarding predetermined unit components obtained by dividing the phoneme sequence. Next, the controller 3310 may obtain one phoneme sequence based on the appearance probabilities and output a word corresponding to the phoneme sequence as a speech-recognized word based on segment information regarding the obtained phoneme sequence.

A communication unit 3320 may receive speech data including articulation of a user according to a user input. If the speech recognition device 3300 is a server device, the speech recognition device 3300 may receive speech data from a user device. Next, the communication unit 3320 may transmit a word speech-recognized by the controller 3310 to the user device.

Figure 34:
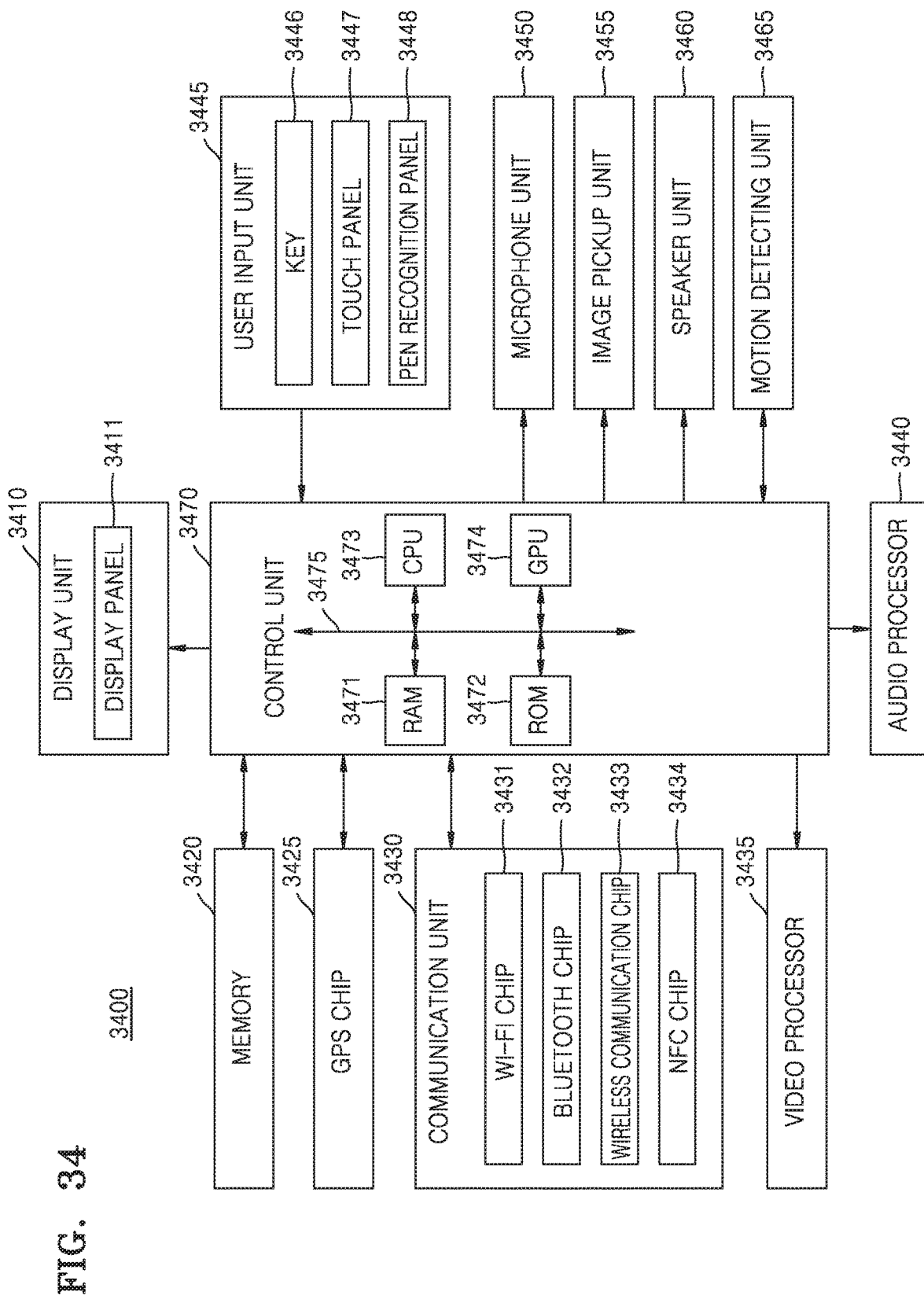
FIG. 34 is a block diagram for describing a configuration of a user device according to an embodiment.

FIG. 34 is a block diagram for describing the configuration of a user device 3400 according to an embodiment.

As shown in FIG. 34, the user device 3400 may include various types of devices that may be used by a user, e.g., a mobile phone, a tablet PC, a PDA, a MP3 player, a kiosk, an electronic frame, a navigation device, a digital TV, and a wearable device, such as a wristwatch or a head mounted display (HMD).

The user device 3400 may correspond to the user device of FIGS. 2 through 24, may receive a user's articulation, transmit the user's articulation to a speech recognition device, receive a speech-recognized language from the speech recognition device, and output the speech-recognized language.

For example, as shown in FIG. 34, the user device 3400 according to embodiments may include not only a display unit 3410 and a controller 3470, but also a memory 3420, a GPS chip 3425, a communication unit 3430, a video processor 3435, an audio processor 3440, a user inputter 3445, a microphone unit 3450, an image pickup unit 3455, a speaker unit 3460, and a motion detecting unit 3465.

Detailed descriptions of the above-stated components will be given below.

The display unit 3410 may include a display panel 3411 and a controller (not shown) for controlling the display panel 3411. The display panel 3411 may be embodied as any of various types of display panels, such as a liquid crystal display (LCD) panel, an organic light emitting diode (OLED) display panel, an active-matrix organic light emitting diode (AM-OLED) panel, and a plasma display panel (PDP). The display panel 3411 may be embodied to be flexible, transparent, or wearable. The display unit 3410 may be combined with a touch panel 3447 of the user inputter 3445 and provided as a touch screen. For example, the touch screen may include an integrated module in which the display panel 3411 and the touch panel 3447 are combined with each other in a stack structure.

The display unit 3410 according to embodiments may display a result of speech recognition under the control of the controller 3470.

The memory 3420 may include at least one of an internal memory (not shown) and an external memory (not shown).

For example, the internal memory may include at least one of a volatile memory (e.g., a dynamic random access memory (DRAM), a static RAM (SRAM), a synchronous dynamic RAM (SDRAM), etc.), a non-volatile memory (e.g., an one time programmable read-only memory (OTPROM), a programmable ROM (PROM), an erasable/programmable ROM (EPROM), an electrically erasable/programmable ROM (EEPROM), a mask ROM, a flash ROM, etc.), a hard disk drive (HDD), or a solid state disk (SSD). According to an embodiment, the controller 3470 may load a command or data received from at least one of a non-volatile memory or other components to a volatile memory and process the same. Furthermore, the controller 3470 may store data received from or generated by other components in the non-volatile memory.

The external memory may include at least one of a compact flash (CF), a secure digital (SD), a micro secure digital (Micro-SD), a mini secure digital (Mini-SD), an extreme digital (xD), and a memory stick.

The memory 3420 may store various programs and data used for operations of the user device 3400. For example, the memory 3420 may temporarily or permanently store at least one of speech data including articulation of a user and result data of speech recognition based on the speech data.

The controller 3470 may control the display unit 3410 to display a part of information stored in the memory 3420 on the display unit 3410. In other words, the controller 3470 may display a result of speech recognition stored in the 3420 on the display unit 3410. Alternatively, when a user gesture is performed at a region of the display unit 3410, the controller 3470 may perform a control operation corresponding to the user gesture.

The controller 3470 may include at least one of a RAM 3471, a ROM 3472, a CPU 3473, a graphic processing unit (GPU) 3474, and a bus 3475. The RAM 3471, the ROM 3472, the CPU 3473, and the GPU 3474 may be connected to one another via the bus 3475.

The CPU 3473 accesses the memory 3420 and performs a booting operation by using an OS stored in the memory 3420. Next, the CPU 3473 performs various operations by using various programs, contents, and data stored in the memory 3420.

A command set for booting a system is stored in the ROM 3472. For example, when a turn-on command is input and power is supplied to the user device 3400, the CPU 3473 may copy an OS stored in the memory 3420 to the RAM 3471 according to commands stored in the ROM 3472, execute the OS, and boot a system. When the user device 3400 is booted, the CPU 3473 copies various programs stored in the memory 3420 and performs various operations by executing the programs copied to the RAM 3471. When the user device 3400 is booted, the GPU 3474 displays a UI screen image in a region of the display unit 3410. In detail, the GPU 3474 may generate a screen image in which an electronic document including various objects, such as contents, icons, and menus, is displayed. The GPU 3474 calculates property values like coordinates, shapes, sizes, and colors of respective objects based on a layout of the screen image. Next, the GPU 3474 may generate screen images of various layouts including objects based on the calculated property values. Screen images generated by the GPU 3474 may be provided to the display unit 3410 and displayed in respective regions of the display unit 3410.

The GPS chip 3425 may receive GPS signals from a global positioning system (GPS) satellite and calculate a current location of the user device 3400. When a current location of a user is needed for using a navigation program or other purposes, the controller 3470 may calculate the current location of the user by using the GPS chip 3425. For example, the controller 3470 may transmit situation information including a user's location calculated by using the GPS chip 3425 to a speech recognition device or a speech recognition data updating device. A language model may be updated or speech recognition may be performed by the speech recognition device or the speech recognition data updating device based on the situation information.

The communication unit 3430 may perform communications with various types of external devices via various forms of communication protocols. The communication unit 3430 may include at least one of a Wi-Fi chip 3431, a Bluetooth chip 3432, a wireless communication chip 3433, and a NFC chip 3434. The controller 3470 may perform communications with various external device by using the communication unit 3430. For example, the controller 3470 may receive a request for controlling a memo displayed on the display unit 3410 and transmit a result based on the received request to an external device, by using the communication unit 3430.

The Wi-Fi chip 3431 and the Bluetooth chip 3432 may perform communications via the Wi-Fi protocol and the Bluetooth protocol. In the case of using the Wi-Fi chip 3431 or the Bluetooth chip 3432, various connection information, such as a service set identifier (SSID) and a session key, are transmitted and received first, communication is established by using the same, and then various information may be transmitted and received. The wireless communication chip 3433 refers to a chip that performs communications via various communication specifications, such as IEEE, Zigbee, 3rd generation (3G), 3rd generation partnership project (3GPP), and long term evolution (LTE). The NFC chip 3434 refers to a chip that operates according to the near field communication (NFC) protocol that uses 13.56 MHz band from among various RF-ID frequency bands; e.g., 135 kHz band, 13.56 MHz band, 433 MHz band, 860-960 MHz band, and 2.45 GHz band.

The video processor 3435 may process contents received via the communication unit 3430 or video data included in contents stored in the memory 3420. The video processor 3435 may perform various image processing operations with respect to video data, e.g., decoding, scaling, noise filtering, frame rate conversion, resolution conversion, etc.

The audio processor 3440 may process audio data included in contents received via the communication unit 3430 or included in contents stored in the memory 3420. The audio processor 3440 may perform various audio processing operation with respect to audio data, e.g., decoding, amplification, noise filtering, etc. For example, the audio processor 3440 may play back speech data including a user's articulation.

When a program for playing back multimedia content is executed, the controller 3470 may operate the user inputter 3445 and the audio processor 3440 and play back the corresponding content. The speaker unit 3460 may output audio data generated by the audio processor 3440.

The user inputter 3445 may receive various commands input by a user. The user inputter 3445 may include at least one of a key 3446, the touch panel 3447, and a pen recognition panel 3448. The user device 3400 may display various contents or user interfaces based on a user input received from at least one of the key 3446, the touch panel 3447, and the pen recognition panel 3448.

The key 3446 may include various types of keys, such as a mechanical button or a wheel, formed at various regions of the outer surfaces, such as the front surface, side surfaces, or the rear surface, of the user device 3400.

The touch panel 3447 may detect a touch of a user and output a touch event value corresponding to a detected touch signal. If a touch screen (not shown) is formed by combining the touch panel 3447 with the display panel 3411, the touch screen may be embodied as any of various types of touch sensors, such as an capacitive type, a resistive type, and a piezoelectric type. When a body part of a user touches a surface of a capacitive type touch screen, coordinates of the touch is calculated by detecting a micro-electricity induced by the body part of the user. A resistive type touch screen includes two electrode plates arranged inside the touch screen and, when a user touches the touch screen, coordinates of the touch are calculated by detecting a current that flows as an upper plate and a lower plate at the touched location touch each other. A touch event occurring at a touch screen may usually be generated by a finger of a person, but a touch event may also be generated by an object formed of a conductive material for applying a capacitance change.

The pen recognition panel 3448 may detect a proximity pen input or a touch pen input of a touch pen (e.g., a stylus pen or a digitizer pen) operated by a user and output a detected pen proximity event or pen touch event. The pen recognition panel 3448 may be embodied as an electromagnetic resonance (EMR) type panel, for example, and is capable of detecting a touch input or a proximity input based on a change of intensity of an electromagnetic field due to an approach or a touch of a pen. In detail, the pen recognition panel 3448 may include an electromagnetic induction coil sensor (not shown) having a grid structure and an electromagnetic signal processing unit (not shown) that sequentially provides alternated signals having a predetermined frequency to respective loop coils of the electromagnetic induction coil sensor. When a pen including a resonating circuit exists near a loop coil of the pen recognition panel 3448, a magnetic field transmitted by the corresponding loop coil generates a current in the resonating circuit inside the pen based on mutual electromagnetic induction. Based on the current, an induction magnetic field is generated by a coil constituting the resonating circuit inside the pen, and the pen recognition panel 3448 detects the induction magnetic field at a loop coil in signal reception mode, and thus a proximity location or a touch location of the pen may be detected. The pen recognition panel 3448 may be arranged to occupy a predetermined area below the display panel 3411, e.g., an area sufficient to cover the display area of the display panel 3411.

The microphone unit 3450 may receive a user's speech or other sounds and convert the same into audio data. The controller 3470 may use a user's speech input via the microphone unit 3450 for a phone call operation or may convert the user's speech into audio data and store the same in the memory 3420. For example, the controller 3470 may convert a user's speech input via the microphone unit 3450 into audio data, include the converted audio data in a memo, and store the memo including the audio data.

The image pickup unit 3455 may pick up still images or moving pictures under the control of a user. The image pickup unit 3455 may be embodied as a plurality of units, such as a front camera and a rear camera.

If the image pickup unit 3455 and the microphone unit 3450 are arranged, the controller 3470 may perform a control operation based on a user's speech input via the microphone unit 3450 or the user's motion recognized by the image pickup unit 3455. For example, the user device 3400 may operate in a motion control mode or a speech control mode. If the user device 3400 operates in the motion control mode, the controller 3470 may activate the image pickup unit 3455, pick up an image of a user, trace changes of a motion of the user, and perform a control operation corresponding to the same. For example, the controller 3470 may display a memo or an electronic document based on a motion input of a user that is detected by the image pickup unit 3455. If the user device 3400 operates in the speech control mode, the controller 3470 may operate in a speech recognition mode to analyze a user's speech input via the microphone unit 3450 and perform a control operation according to the analyzed speech of the user.

The motion detecting unit 3465 may detect motion of the main body of the user device 3400. The user device 3400 may be rotated or tilted in various directions. Here, the motion detecting unit 3465 may detect motion characteristics, such as a rotating direction, a rotating angle, and a tilted angle, by using at least one of various sensors, such as a geomagnetic sensor, a gyro sensor, and an acceleration sensor. For example, the motion detecting unit 3465 may receive a user's input by detecting a motion of the main body of the user device 3400 and display a memo or an electronic document based on the received input.

Furthermore, although not shown in FIG. 34, according to embodiments, the user device 3400 may further include a USB port via which a USB connector may be connected into the user device 3400, various external input ports to be connected to various external terminals, such as a headset, a mouse, and a LAN, a digital multimedia broadcasting (DMB) chip for receiving and processing DMB signals, and various other sensors.

Names of the above-stated components of the user device 3400 may vary. Furthermore, the user device 3400 according to the present embodiment may include at least one of the above-stated components, where some of the components may be omitted or additional components may be further included.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, etc.

While the present invention has been particularly shown and described with reference to preferred embodiments thereof, it will be understood by those skilled in the art that various changes in form and details may be made therein without departing from the spirit and scope of the present invention as defined by the appended claims. The preferred embodiments should be considered in descriptive sense only and not for purposes of limitation. Therefore, the scope of the present invention is defined not by the detailed description of the invention but by the appended claims, and all differences within the scope will be construed as being included in the present invention.

What is claimed:

1. A method of performing speech recognition of a voice spoken by a user, the method comprising:
   obtaining first audio data based on the voice spoken by the user detected by a first electronic device;
   obtaining second audio data based on the voice spoken by the user detected by a second electronic device;
   determining first audio quality of the first audio data;
   determining second audio quality of the second audio data;
   selecting audio data from among the first audio data and the second audio data, based on the first audio quality and the second audio quality;
   selecting an electronic device that obtained the audio data from among the first electronic device and the second electronic device;
   performing speech recognition of the voice spoken by the user, based on the audio data; and
   outputting a result of the speech recognition at the electronic device.

2. The method of claim 1, wherein the first audio quality comprises a first volume of the first audio data, and
   wherein the second audio quality comprises a second volume of the second audio data.

3. The method of claim 1, wherein the first audio quality comprises a first signal to noise ratio of the first audio data, and
   wherein the second audio quality comprises a second signal to noise ratio of the second audio data.

4. The method of claim 1, wherein the first audio data comprises at least one of a first volume of the first audio data and a first signal to noise ratio of the first audio data, and
   wherein the second audio data comprises at least one of a second volume of the second audio data and a second signal to noise ratio of the second audio data.

5. An electronic device for performing speech recognition of a voice spoken by a user, the electronic device comprising:
   a memory storing computer-readable instructions; and
   at least one processor when executing the computer-readable instructions configured to obtain first audio data based on the voice spoken by the user detected by the electronic device, obtain second audio data based on the voice spoken by the user detected by a second electronic device, determine first audio quality of the first audio data, determine second audio quality of the second audio data, select the first audio data from among the first audio data and the second audio data, based on the first audio quality and the second audio quality, select the electronic device that obtained the first audio data from among the electronic device and the second electronic device, perform speech recognition of the voice spoken by the user, based on the audio data, and output a result of the speech recognition at the electronic device.

6. The electronic device of claim 5, wherein the first audio quality comprises a first volume of the first audio data, and
   wherein the second audio quality comprises a second volume of the second audio data.

7. The electronic device of claim 5, wherein the first audio quality comprises a first signal to noise ratio of the first audio data, and
   wherein the second audio quality comprises a second signal to noise ratio of the second audio data.

8. The electronic device of claim 5, wherein the first audio data comprises at least one of a first volume of the first audio data and a first signal to noise ratio of the first audio data, and
   wherein the second audio data comprises at least one of a second volume of the second audio data and a second signal to noise ratio of the second audio data.

9. A method of performing speech recognition of a voice spoken by a user, the method comprising:
   obtaining first audio data based on the voice spoken by the user detected by a first electronic device;
   obtaining second audio data based on the voice spoken by the user detected by a second electronic device;
   determining first audio quality of the first audio data;
   determining second audio quality of the second audio data;
   selecting a closest electronic device that is closest to the user from among the first electronic device and the second electronic device, based on the first audio quality and the second audio quality;
   performing speech recognition of the voice spoken by the user based on the closest electronic device; and
   outputting a result of the speech recognition at the closest electronic device.

10. The method of claim 9, wherein the first audio quality comprises a first volume of the first audio data, and
    wherein the second audio quality comprises a second volume of the second audio data.

11. The method of claim 9, wherein the first audio quality comprises a first signal to noise ratio of the first audio data, and
    wherein the second audio quality comprises a second signal to noise ratio of the second audio data.

12. The method of claim 9, wherein the first audio data comprises at least one of a first volume of the first audio data and a first signal to noise ratio of the first audio data, and
    wherein the second audio data comprises at least one of a second volume of the second audio data and a second signal to noise ratio of the second audio data.

13. An electronic device for performing speech recognition of a voice spoken by a user, the electronic device comprising:
    a memory storing computer-readable instructions; and
    at least one processor when executing the computer-readable instructions configured to obtain first audio data based on the voice spoken by the user detected the electronic device, obtain second audio data based on the voice spoken by the user detected by a second electronic device, determine first audio quality of the first audio data, determine second audio quality of the second audio data, select the electronic device as a closest electronic device that is closest to the user from among the electronic device and the second electronic device, based on the first audio quality and the second audio quality, perform speech recognition of the voice spoken by the user based on the closest electronic device, and output a result of the speech recognition at the electronic device that is the closest electronic device closest to the user.

14. The electronic device of claim 13, wherein the first audio quality comprises a first volume of the first audio data, and
   wherein the second audio quality comprises a second volume of the second audio data.

15. The electronic device of claim 13, wherein the first audio quality comprises a first signal to noise ratio of the first audio data, and
   wherein the second audio quality comprises a second signal to noise ratio of the second audio data.

16. The electronic device of claim 13, wherein the first audio data comprises at least one of a first volume of the first audio data and a first signal to noise ratio of the first audio data, and
   wherein the second audio data comprises at least one of a second volume of the second audio data and a second signal to noise ratio of the second audio data.

* * * * *